US005758314A

United States Patent [19]

McKenna

[11] Patent Number: 5,758,314

[45] Date of Patent: May 26, 1998

[54] CLIENT/SERVER DATABASE SYSTEM WITH METHODS FOR IMPROVED SOUNDEX PROCESSING IN A HETEROGENEOUS LANGUAGE ENVIRONMENT

[75] Inventor: Michael G. McKenna, Oakland, Calif.

[73] Assignee: Sybase, Inc., Emeryville, Calif.

[21] Appl. No.: 646,782

[22] Filed: May 21, 1996

[51] Int. Cl.[6] .................... G06F 17/27

[52] U.S. Cl. .................... 704/8

[58] Field of Search .................... 704/1–2, 8–9; 707/534–535, 102, 100–101; 364/280.4, 280.6, 283.1

[56] References Cited

U.S. PATENT DOCUMENTS

| | | | |
|---|---|---|---|
| 5,416,903 | 5/1995 | Malcolm | 704/1 |
| 5,526,477 | 6/1996 | McConnell et al. | 395/150 |
| 5,535,120 | 7/1996 | Chong et al. | 704/3 |
| 5,640,214 | 6/1997 | Bruso et al. | 704/2 |
| 5,675,818 | 10/1997 | Kennedy | 395/758 |
| 5,678,039 | 10/1997 | Hinks et al. | 395/604 |
| 5,708,462 | 1/1998 | Matousek | 395/445 |

OTHER PUBLICATIONS

Hall, W., "*Adapt Your Program for Worldwide Use with Windows Internationalization Support*," Microsoft Systems Journal, Nov./Dec. 1991, pp. 29–58.

Van Camp, D., "*Unicode and Software Globalization*," Dr. Dobb's Journal, Mar. 1994, pp. 46, 48–50.

*Primary Examiner*—David R. Hudspeth

*Assistant Examiner*—Patrick N. Edouard

*Attorney, Agent, or Firm*—John A. Smart

[57] ABSTRACT

A system providing improved National Language Support (NLS) in application programs is described. The system employs normalized Unicode data with generic transformation structures having locale overlays. Methods are described for navigating the structures during system operation, for effecting various transformation processes using locale-specific information. The locale-specific information is maintained in the structures as external data files. Since the data files are read in at runtime, the underlying binary files which comprise the program need not be modified for updating the program to support a new locale. The approach provides extensibility to applications with National Language Support. Additionally, increased portability is provided, since manipulation of the underlying data remains unchanged regardless of the underlying platform. Program maintenance is also decreased, since engineers need only maintain a single core.

1 Claim, 12 Drawing Sheets

150

CS_TRANSFORM STRUCTURE

CLIENT/SERVER DATABASE SYSTEM WITH METHODS FOR IMPROVED SOUNDEX PROCESSING IN A HETEROGENEOUS LANGUAGE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates in general to the field of data processing and, more particularly, to the processing of culturally-sensitive information.

For software publishers, overseas markets comprise an ever-growing percentage of revenues for all major PC applications. Traditionally, however, software products have been designed with little or no thought toward portability, let alone translating software products for overseas markets. As non-English speaking countries are buying more and more software from U.S. publishers, there is keen interest in improving the process of enabling or "internationalization," that is, designing and coding a software product so that it can be made to function for international use.

In the past, the process of providing National Language Support (i.e., accommodating a specific country's language, conventions, and culture) was done on a more or less ad hoc basis—essentially retrofitting software to accommodate a particular locale. Merely separating the text in a user interface from one's program is not an acceptable solution, however. Even after translating software prompts, help messages, and other textual information to the target language, one still has to address basic issues of displaying and printing characters in the target language.

For instance, a target language will often include characters which are not defined by the default character set provided by the computer's operating system. IBM-compatible PCs running MS-DOS, for example, can display and print up to 256 different characters, the first 128 characters of which include the well-known 7-bit ASCII character set. This, of course, is not enough characters to support all languages. Some languages will obviously require a different character set; thus, sufficient means must be provided for switching character sets.

Other issues to consider when developing a system for foreign users include various format conventions applicable for a particular country. Any use of currency, date, time, and the like within one's software must take into account these factors. For example, systems sold for European languages must accomodate additional characters, such as letters with diacritics, and symbols, such as the British pound (£) sign.

Modern-day operating systems, such as Microsoft Windows NT, support international sorting strings using language-independent tables. For an introduction of Microsoft Windows' internationalization support, see e.g., Hall, W., *Adapt Your Program for Worldwide Use with Windows Internationalization Support*, Microsoft Systems Journal, Vol 6, No. 6, November/December 1991, pp. 29–45, the disclosure of which is incorporated by reference herein.

Today, there exists great interest in providing portable multi-threaded locales for data processing. Specifically, this entails a data processing environment that is multi-threaded—multiple processes operating simultaneously for handling multiple users at the same time. Such environments typically comprise a database server (e.g., Sybase SQL Server), a programmatic open server (e.g., Sybase Open Server), a terminal server, or the like. Generally, such an environment includes some type of server application operating in a client/server environment.

A problem exists outside of English environments, however. In particular, situations arise where different users of a system may be speaking different languages (i.e., employing different locale-specific character sets, collation sequences, and/or data attributes). Here, "locale" refers to a total-user environment set up for the system to determine which language to use for messages, what formatting to use for various cultural strings (e.g., date, time, and currency), or the like. The particular problem which exists is that each user may have a different locale requirement despite the fact that the system itself is oriented towards a single locale for a single process. Using existing utilities supplied by the underlying operating system (e.g., UNIX), the many users which may simultaneously use the system are all forced to use a single locale (i.e., the locale for which the system has been set up).

Another problem which exists is that each one of the users may be using a different character set. This is particularly the case when users are accessing the system from various locations around the world. A Japanese user might, for instance, be using a vendor-specific version of the Japanese Industrial Standard (such as shift JIS) character set. European users, on the other hand, might employ ISO 8859-1 character set, or such users might be using the Roman-8 character set from a Hewlett-Packard platform. Still further, a user might be employing the KOI-8 character set from a Russian environment. Here, a "character set" comprises the "character repertoire"—that is, the actual characters being used in a coded character set. The "coded" character set comprises the set of numeric codes employed to represent those characters. The actual numeric value used to represent a particular character may, in fact, vary from one character set to another.

Consider, further, the difficulties faced by an automobile manufacturer trying to deploy a customer information database for various automobile distributors, located in eleven different European countries speaking nine different languages. Each dealer who logs into the database system will do so from a host system which has been set up for a particular national language. Each dealer has the need for information to be returned from the database in a specific language. Also, each dealer has a need for the information to be correctly formatted, according to the dealer's local currency and date/time requirements. For such a database system, it is possible to perform conversions between the various character sets. Nevertheless, such an approach quickly becomes impractical as the company grows to include additional countries. In this all-too-common scenario, there exists a need to treat information from the various users in a consistent manner, with integrity across all applications.

To date, efforts to address these problems have been in the form of vendor-specific solutions. Such an approach is in itself problematic. For instance, such an approach is not easily portable across different platforms. Further, such an approach is typically not interoperable across heterogeneous environments. A solution fashioned in Windows NT, for instance, is not easily ported to a UNIX environment.

Even if one were to attempt to maintain multiple locales within a system (e.g., Windows NT), the approach is inefficient. Often, locale-specific information overlaps from one locale to another. For instance, many different locales employ a character set which is the same or very similar. It is an inefficient use of resources (e.g., system memory, storage, and the like) to maintain separate sets of locale-specific information for each individual locale.

For UNIX platforms, a set of standardized locale interfaces have been defined, for example, by the X-Open Consortium and Posix Group. These interfaces are oriented towards a single locale for a single process. Once one selects a particular locale, it serves as a global attribute employed for all processing which occurs in the application. For the system employed by the abovementioned international company, when a German user accesses the server, the server must stop all processing and transition over to German. Here, processing for all other users stops until the German user is finished. The other processes would have to either be suspended or use the locale which the whole global environment has been set up for, with potentially incorrect results.

As one changes from one platform to another, the character sets underlying each platform change; thus, the way in which one processes data changes. Simply put, there is no canonical representation of the data. Here, "canonical" refers to the ability to take any representation of the data and condense it down into one representation; for example, Roman number two, Arabic number two, and Hindi number two all canonically condense down to "2." A canonical representation assists with the goal of processing data in a consistent manner across all platforms and all locales. The Unicode Consortium and the ISO 10646 standard have provided a means for defining a canonical interface.

During operation, the system takes data from any source and converts it into canonical Unicode which, in turn, is used for all internal processing. Canonical Unicode does not, by itself, provide multi-threaded, multi-locale processing. For canonical Unicode, every time one migrates to a new platform or adds a new character set, it is necessary to create a new definition of that character set in order to get all the proper attributes for parsing (e.g., for determining whether the character is alphabetic, numeric, and so forth and so on).

What is needed is a system providing National Language Support (NLS) in application programs which is portable yet flexible. Such a solution should be suited for use on multiple platforms, yet be easily modified for accommodating additional attributes as culturally-sensitive information within the system grows. Such systems should be thread safe and should be able to handle multiple languages simultaneously. The present invention fulfills this and other needs.

GLOSSARY

ASCII: American Standard Code for Information Interchange; a sequence of 128 standard characters.

Code page: A character set, such as available in MS-DOS versions 3.3 and later, that provides a table for relating the binary character codes used by a program to keys on a keyboard or to the appearance of characters on a display.

Database: An organized collection of information.

Database Management System (DBMS): A system that controls the organization, storage, and retrieval of information in a database.

Enabling or Internationalization: Designing and coding a product so that it can be made to function for international use. A product is enabled if a national language version can be created at minimal expense and if it does not interfere with current or planned national language support of other products.

File: A collection of information stored under one name on a disk. For example, the system tables are stored in files.

Index: A file that determines an order in which the system can access the records in a able.

Localization: Translating and adding functions to an enabled product to accommodate a country's languages, conventions, and cultures.

National Language: A language or dialect spoken by any group of people.

National Language Support: The features of a product that accommodate a specific country, national language, local convention, culture, and the like.

Table: A structure made up of rows (records) and columns (fields) that contains information.

Unicode: A particular 16-bit character set, as defined by the Unicode Consortium. The term "Unicode," when used generally herein, refers to an encoded representation of a character in the Unicode character set; the encoding is fixed two bytes in length, with a variable-width encoding known as "UTF-8" (8-bit Unicode Transformation Format) available which may vary from one to three bytes in length. Different formats are available. One standard, ISO 10646, defines an international standard representation of Unicode.

SUMMARY OF THE INVENTION

A Client/Server Database System of the present invention comprises one or more clients connected to server(s) via a network. Each of the clients, which communicates with the server via the network, can be in a separate locale and employ locale-specific data (e.g., character sets, date and currency formats, and the like).

The server, which includes Sybase SQL Server™ database server (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The network may be any one of a number of conventional network systems, including a Local Area Network (LAN) or Wide Area Network (WAN), as is known in the art (e.g., using Ethernet, IBM Token Ring, or the like). The network includes functionality for packaging client SQL calls and its parameters into a format (of one or more packets) suitable for transmission across a cable or wire, for delivery to the server.

In general operation, the client(s) store data in or retrieve data from one or more database tables. Typically resident on the server, each table itself comprises one or more horizontal rows or "records" (tuples) together with vertical columns or "fields." A database record includes information which is most conveniently represented as a single unit.

The server includes a conversion engine for processing locale-specific data. In operation, the conversion engine receives as its input locale-specific text or data from the clients. The conversion engine, in turn, emits Unicode as its output. Specifically, the locale-specific textual data is tagged with a locale identifier for allowing the conversion engine to propagate it into appropriate Unicode. After conversion into Unicode, the data from the clients generally undergoes further processing. Specifically, the Unicode output is provided to transformation process(es).

Examples of transformations include case mapping, Soundex mapping, lexical attribute determination, code set conversion, and character metric determination. Case mapping entails converting a character from lower case to upper case and vice versa. Soundex mapping includes generating Soundex weightings for both Latin and non-Latin languages (i.e., Asian, Cyrillic, and Arabic alphabetics). Lexical attribute determination includes determining whether a character is an alphabetic character, a digit, and the like. Code set conversion includes converting from any character set, including Unicode, into any other character set (including Unicode). Character metric determination includes determining how wide a character is in terms of data (storage) and in terms of column length (display).

The system provides data structures and processing methods for improving transformation processes. Specifically, base attributes for a default locale (e.g., U.S. English) are stored by the system in base attributes structure. Hanging off of this structure is a linked list of locale base structures. Depending on what is required for a given task at hand, any one of the locale base structures can be pointed to (i.e., de-referenced) during processing. Each of the locales can, in turn, point to various "trie" structures. A trie is a well-accepted mechanism for storing a sparse data set in a structure which only contains the information needed, and at the same time comprises information (i.e., pointers) about information which does not fit within the specific range of characters (i.e., trie entries). Each trie structure stores attribute information which is required. Sub-attribute structures can be shared or omitted, as needed, to preserve systems resources when processing. In the event that an attribute structure is not represented, the system employs the corresponding default attribute—that is, a default attribute contained within (or referenced by) the base attribute structure.

The "trie" structures represent a "stack of values," each one of which can have a set of attributes assigned to it. In particular, the character value of an incoming character (i.e., the character code point) is used to index into a first array. Based on the value stored thereat in the array, the system determines whether the value is an attribute or whether the value is instead a pointer to yet another array. The mechanism can also be employed for indexes other than character code points. For example, the values of 1 through 7 can be used to index into an array listing days of the week for a locale.

Given a base locale (i.e., a base reference point), multiple threads can be employed in a process, with each thread using as its root the same default locale or data structure which has been created (i.e., for the whole process). From the default locale, additional pointers are employed to access a locale-specific item. Each thread can point to its own default locale. During processing, each thread will look at its thread-specific locale for the information which is required. If the information cannot be located, the thread then reverts or falls back to the default locale for the final information. With this approach, redundancy of data is dramatically reduced. Additionally, the approach only requires one or two accesses to determine if locale-specific information exists.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone (client) system

Figure 1A:
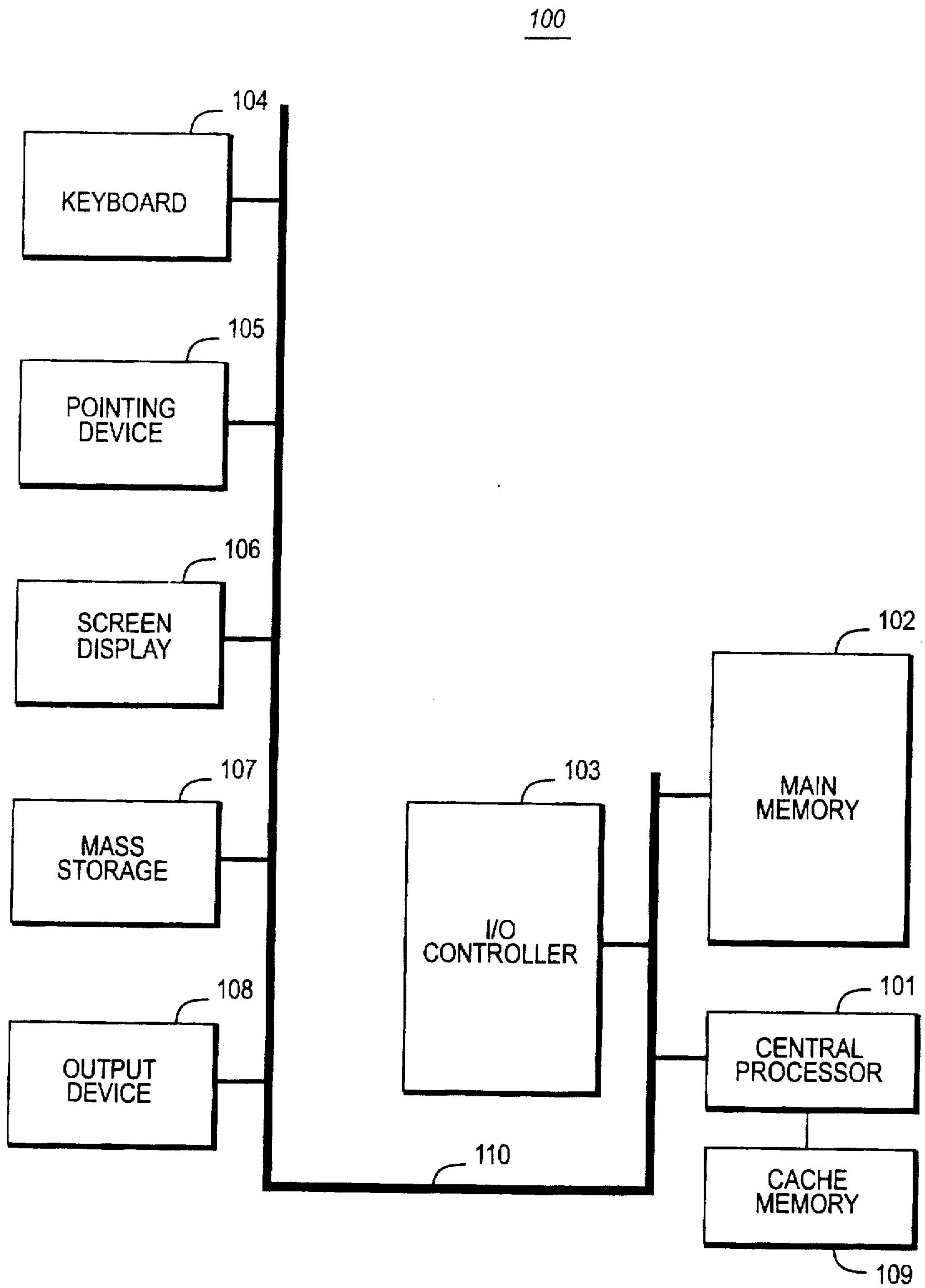
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Figure 1B:
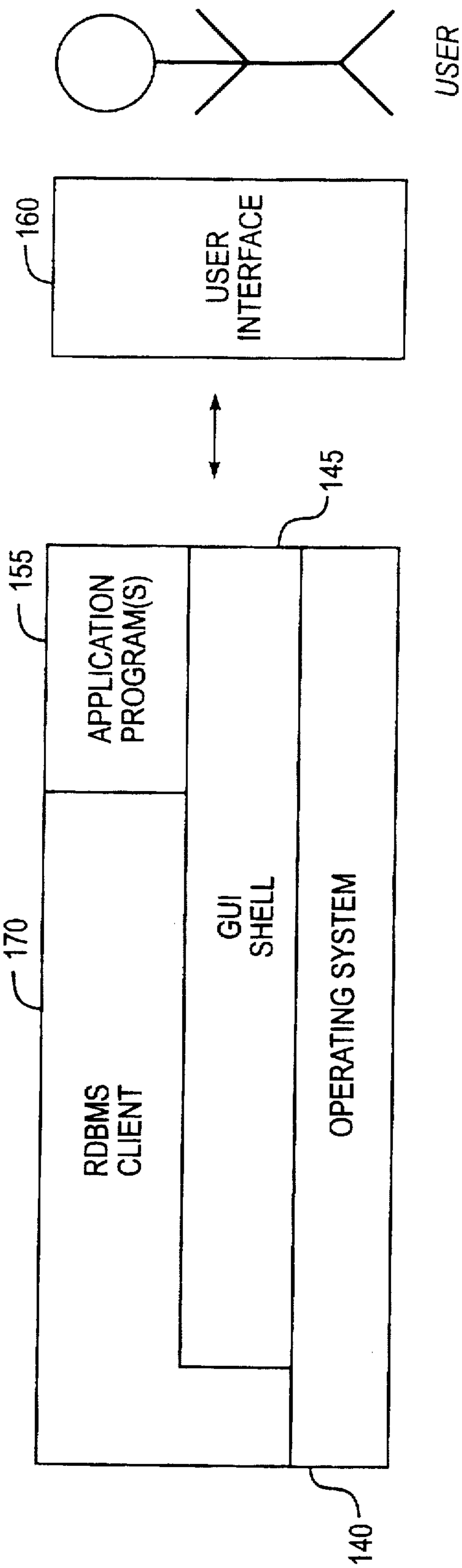
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/server system providing multi-threaded data processing in a heterogeneous language environment A. General design considerations A particular problem with prior art attempts has been the tendency of engineers to focus their development efforts on the environment which one is working within. As a result, prior art attempts have included limitations dictated by platform-specific considerations. A better approach is to instead employ a "conversion envelope." For purposes of encoding data, all character-based processing occurs inside an application in Unicode. A "conversion envelope" is in effect placed on the exterior of the application in order to normalize all of the data into a canonical format—Unicode. In this manner, one can use data from any platform from any source, yet be able to use the data in a single consistent manner. By processing information in a consistent, canonical format, a system achieves consistency for maintenance, upgrading, debugging, and customer support, across all platforms.

B. Client/server database system

Figure 2:
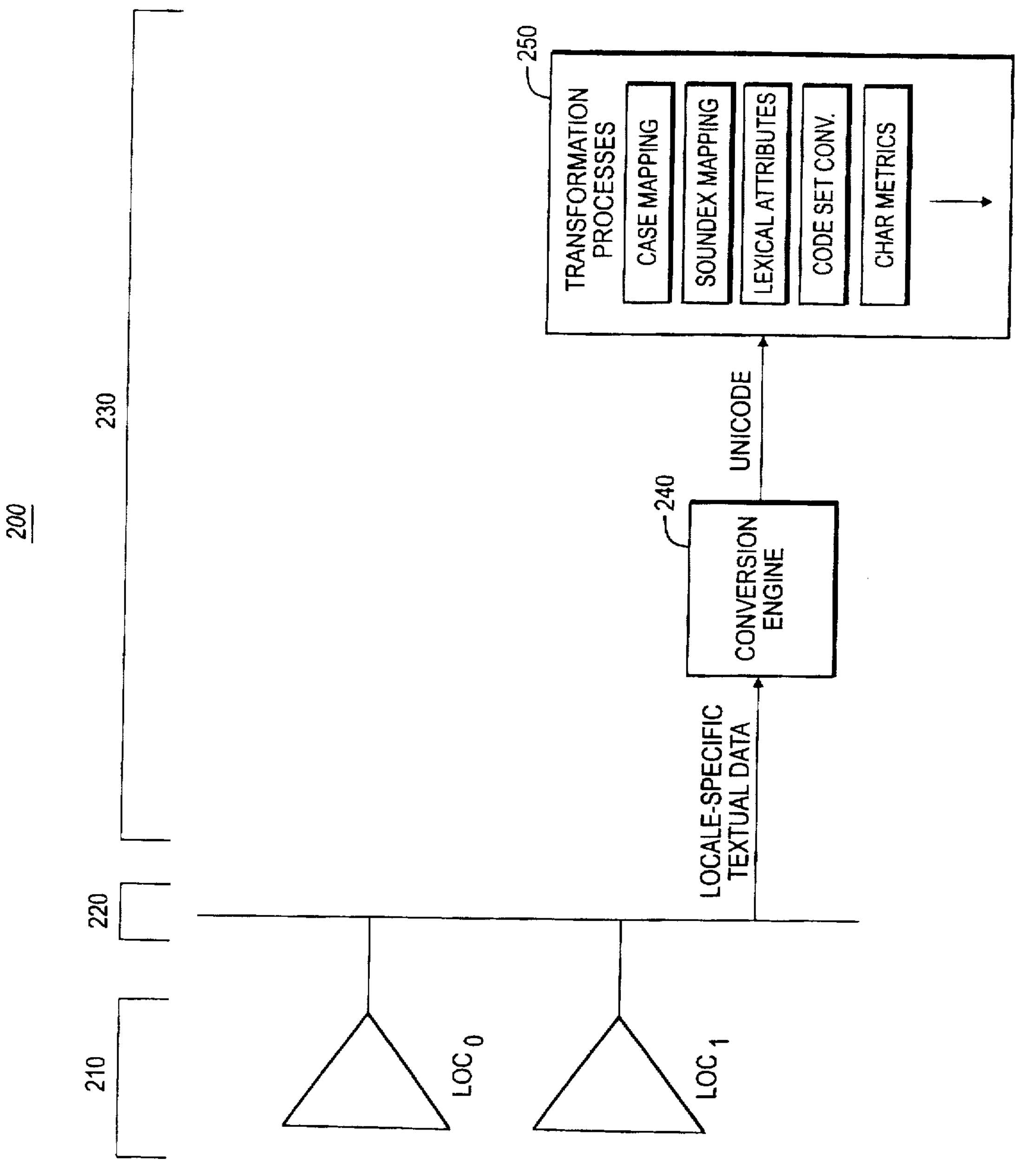
FIG. 2 is a block diagram of a client/server system in which the present invention is preferably embodied.

While the present invention may operate within a single (standalone) computer (e.g., system 100), the present invention is preferably embodied in a multi-user computer system, such as a client/server system. FIG. 2 illustrates the general structure of a Client/Server Database System 200 which is preferred for implementing the present invention. The system 200 comprises one or more clients 210 connected to server(s) 230 via a network 220. Each of the clients 210, which communicates with the server 230 via the network 220, can be in a separate locale, such as $Loc_0$ and $Loc_1$, and employ locale-specific data (e.g., character sets, date and currency formats, and the like).

The server 230, which includes Sybase SQL Server™ database server (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The network 220 may be any one of a number of conventional network systems, including a Local Area Network (LAN) or Wide Area Network (WAN), as is known in the art (e.g., using Ethernet, IBM Token Ring, or the like). The network includes functionality for packaging client SQL calls and its parameters into a format (of one or more packets) suitable for transmission across a cable or wire, for delivery to the server 230.

In general operation, the client(s) 210 store data in or retrieve data from one or more database tables. Typically resident on the server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

During a database session or "connection" with the server, each client issues one or more SQL commands to the Server. SQL commands may specify, for instance, a query for retrieving particular data (i.e., data records meeting the query condition) from a database table. The syntax of SQL (Structured Query Language) is well documented; see, e.g., Date, C., *An Introduction to Database Systems*, Volume I and II, Addison Wesley, 1990; the disclosure of which is hereby incorporated by reference. In addition to retrieving the data from database server tables, the clients also include the ability to insert new rows of data records into the table; clients can also modify and/or delete existing records in the table.

Client/server environments, database servers, and networks in general are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

As shown, the server 230 of system 200 includes a conversion engine 240, for processing locale-specific data. In operation, the conversion engine 240 receives as its input locale-specific text or data from the clients 210. The conversion engine 240, in turn, emits Unicode as its output. Specifically, the locale-specific textual data is tagged with a locale identifier for allowing the conversion engine 240 to propagate it into appropriate Unicode. After conversion into Unicode, the data from the clients generally undergoes further processing. As shown in the figure, the Unicode output is, for this purpose, provided to transformation process(es) 250.

C. Transformations

Examples of transformations include case mapping, Soundex mapping, lexical attributes determination, code set conversion, and character metrics determination. Case mapping entails converting a character from lower case to upper case and vice versa. Soundex mapping includes generating Soundex weightings for both Latin and non-Latin languages (i.e., Asian, Cyrillic, and Arabic alphabetics). Lexical attribute determination includes determining whether a character is an alphabetic character, a digit, and the like. Code set conversion includes converting from any character set into Unicode, and from Unicode back into any character set. Character metric determination includes determining how wide a character is in terms of data (storage) and in terms of column length (display).

Another transformation is transliteration. Transliteration is the process of transforming a character from one script into another script. For instance, the Spanish "ñ" can be transliterated into the English "n." Alternatively, the character could be transliterated into a Russian character. The process of transliterating from a Russian character, on the other hand, to a Latin character, is different depending on which language is the target language. For instance, transliteration of a Russian character to English, French, or Swedish might yield three different characters all from the same character set, since the process is operating based on phonetic quantities. Therefore, a separate transliteration map might be required for each language. Regardless of the particular transformation employed, the processing usually entails transforming the data from one state to another, such as converting one string of characters into another string of characters. The transformation might comprise transforming the data into a new character set, or transforming a phonetic quantity into a sound value.

Transformations can be divided into static and dynamic transformations. In Unicode, for instance, there exists the notion of decomposition and precomposition. For example, a character which includes an accent mark would have a precomposed view with the accent mark and a decomposed view of a character plus an accent mark (i.e., two separate entities). Such an attribute is a "static" attribute in the sense that it remains unchanged. Transformation of a character with an accent mark into Unicode is a "static transformation" process. After transforming into Unicode, such a character can undergo a wide variety of transformations.

Other transformations may not be static. Examples of these non-static or "dynamic transformations" include case mapping. For French used in Canada, when a character having an accent mark is converted to upper case, the accent mark is preserved or carried over to the upper case letter. In France, in contrast, the accent mark would be dropped. Upper casing in this instance is not static. It is, instead, locale specific. In a similar manner, the way in which data is sorted typically varies from one locale to another and, hence, represents a "dynamic transformation." Similarly, encoded sound or "Soundex" tends to change on a locale-by-locale basis and, therefore, also represents a dynamic transformation.

D. Preferred representation of attribute information

Figure 3:
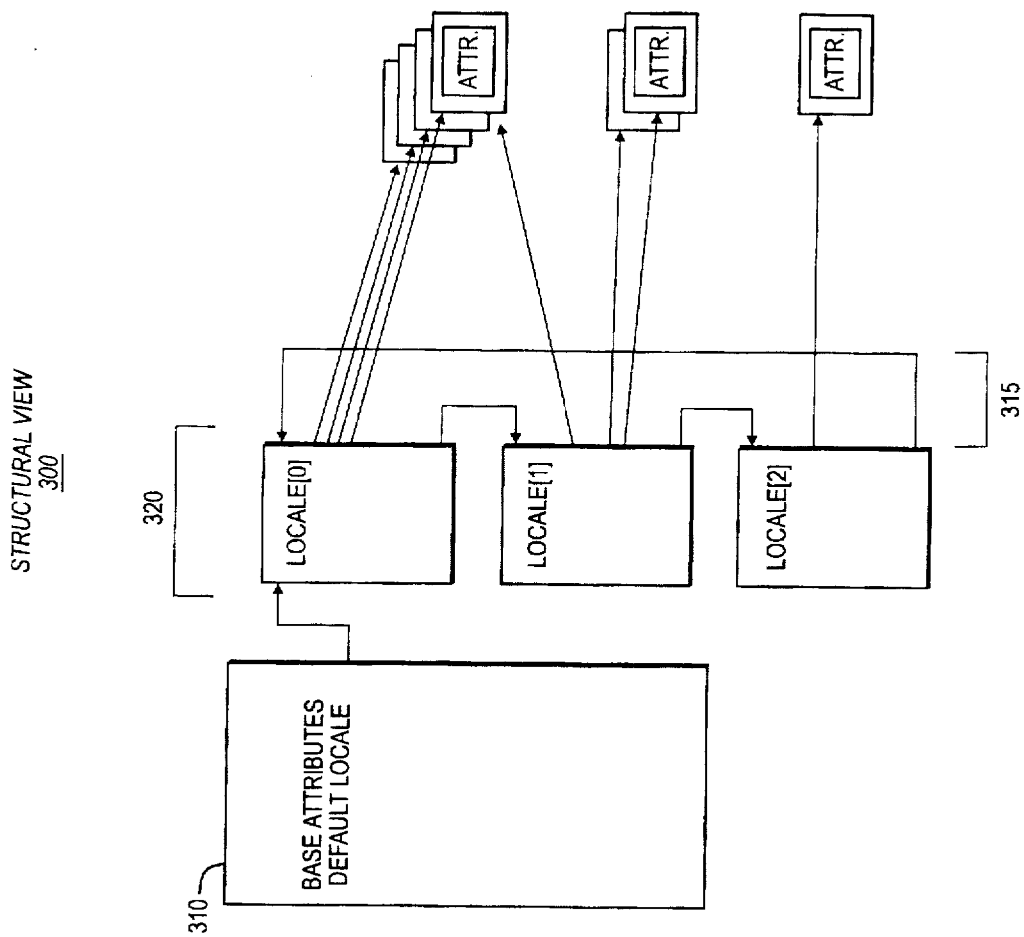
FIG. 3 is a block diagram showing a structural representation or view of static and locale-specific (dynamic) attributes.

At the outset, it is helpful to first examine certain data structures employed by the system of present invention. Specifically, the system employs a structural representation or view 300 of static and locale-specific (dynamic) attributes, as shown in FIG. 3. Here, base attributes for a default locale (e.g., U.S. English) are stored in base attributes structure 310. Hanging off of structure 310 is a linked list 315 of locale base structures 320. Depending on what is required for a given task at hand, any one of the locale base structures can be pointed to (i.e., de-referenced) during processing. Each of the locales can, in turn, point to various "trie" structures. A trie is a well-accepted mechanism for storing a sparse data set in a structure which only contains the information needed, and at the same time comprises information (i.e., pointers) about information which does not fit within the specific range of characters (i.e., trie entries).

Each trie structure stores attribute information which is required. The structural view 300 represents, therefore, a base default locale having a number of specific, sparsely populated locale structures hanging off of it. Sub-attribute structures can be shared or omitted, as needed, to preserve systems resources when processing. In the event that an attribute structure is not represented, the system employs the corresponding default attribute—that is, a default attribute contained within (or referenced by) the base attribute structure 310. This design encourages a high degree of sharing, such as between slightly different versions of the same language (e.g., Canadian French and "French" French).

F. Tries: stack of values

As described above, the system of the present invention employs sparsely-populated arrays or "trie" structures for representing attribute information. These structures represent a "stack of values," each one of which can have a set of attributes assigned to it. In particular, the character value of an incoming character (i.e., the character code point) is used to index into a first array. Based on the value stored thereat in the array, the system determines whether the value is an attribute or whether the value is instead a pointer to yet another array. The mechanism can also be employed for indexes other than character code points. For example, the values of 1 through 7 can be used to index into an array listing days of the week.

Given a base locale (i.e., a base reference point), multiple threads can be employed in a process, with each thread using as its root the same default locale or data structure which has been created (i.e., for the whole process). From the default locale, additional pointers are employed to access a locale-specific item. Each thread can point to its own default locale. During processing, each thread will look at its thread-specific locale for the information which is required. If the information cannot be located, the thread then reverts or falls back to the default or base locale for the final information. If the information cannot be found in the base locale, then the condition is communicated back to the calling thread or application. With this approach, redundancy of data is dramatically reduced. Additionally, the approach only requires one or two accesses to determine if locale-specific information exists.

G. Trie-based transformation method

1. Traversing trie structures

Figure 4:
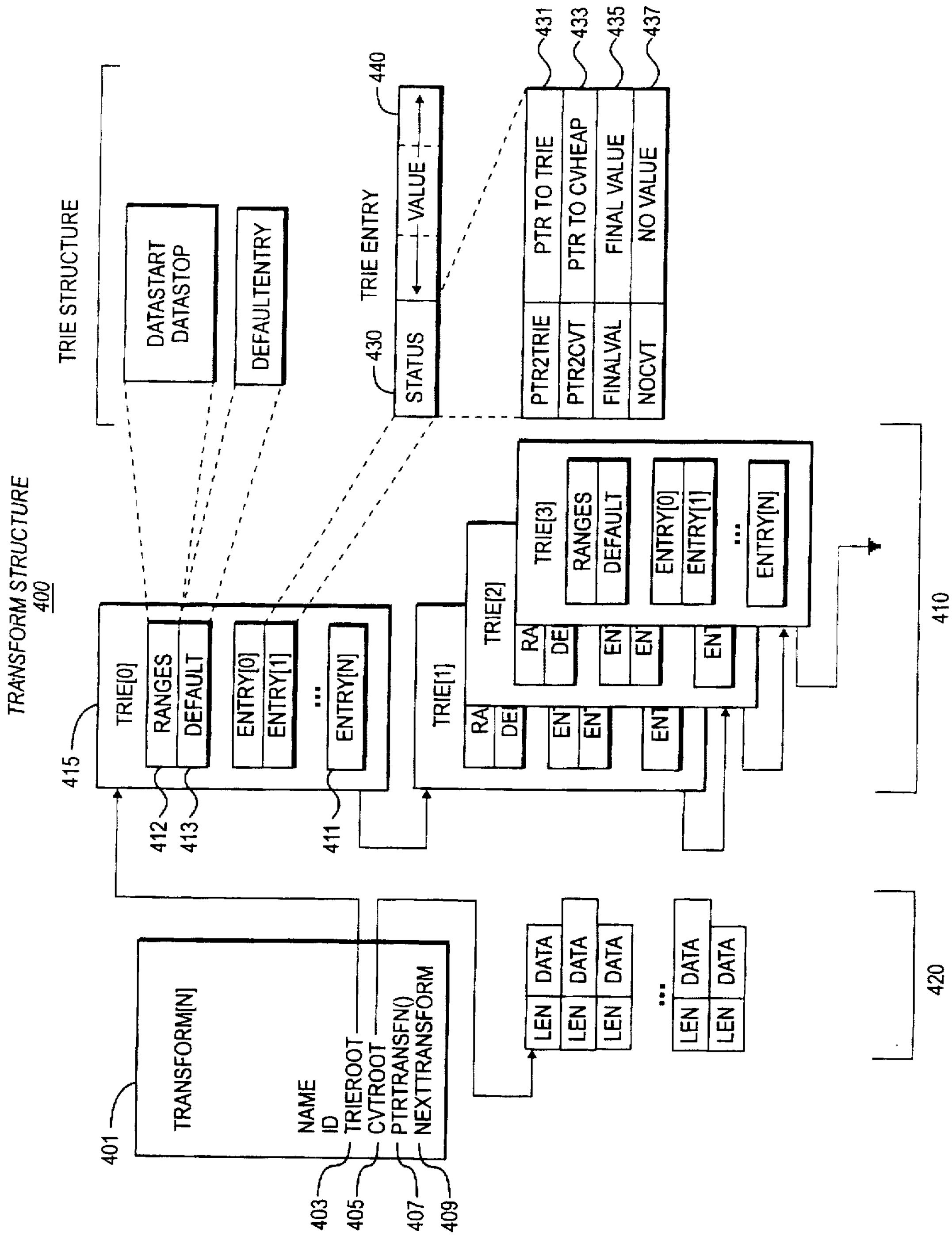
FIG. 4 illustrates a generic transform structure 400, which is loaded at runtime (e.g., from external files), for transforming from one character set to another.

Transformation, in accordance with the present invention, is perhaps best illustrated by describing a transformation from one character set to another. FIG. 4 illustrates a generic transform structure 400, which is loaded at runtime (e.g., from external files), for transforming from one character set to another, such as transforming an incoming character from a Unicode value to a new value (which is not necessarily Unicode). The generic structure 400 itself comprises at least one transform record or structure 401 which, in turn, references other nested structures via a trie root 403 pointing to a linked list of trie structures 410, a conversion root 405 pointing to a conversion heap 420, a pointer-to-transform function 407, and a pointer-to-next transformation 409 (i.e., next transform structure). The remaining elements of structure 400 are described in conjunction with FIG. 5.

Figure 5:
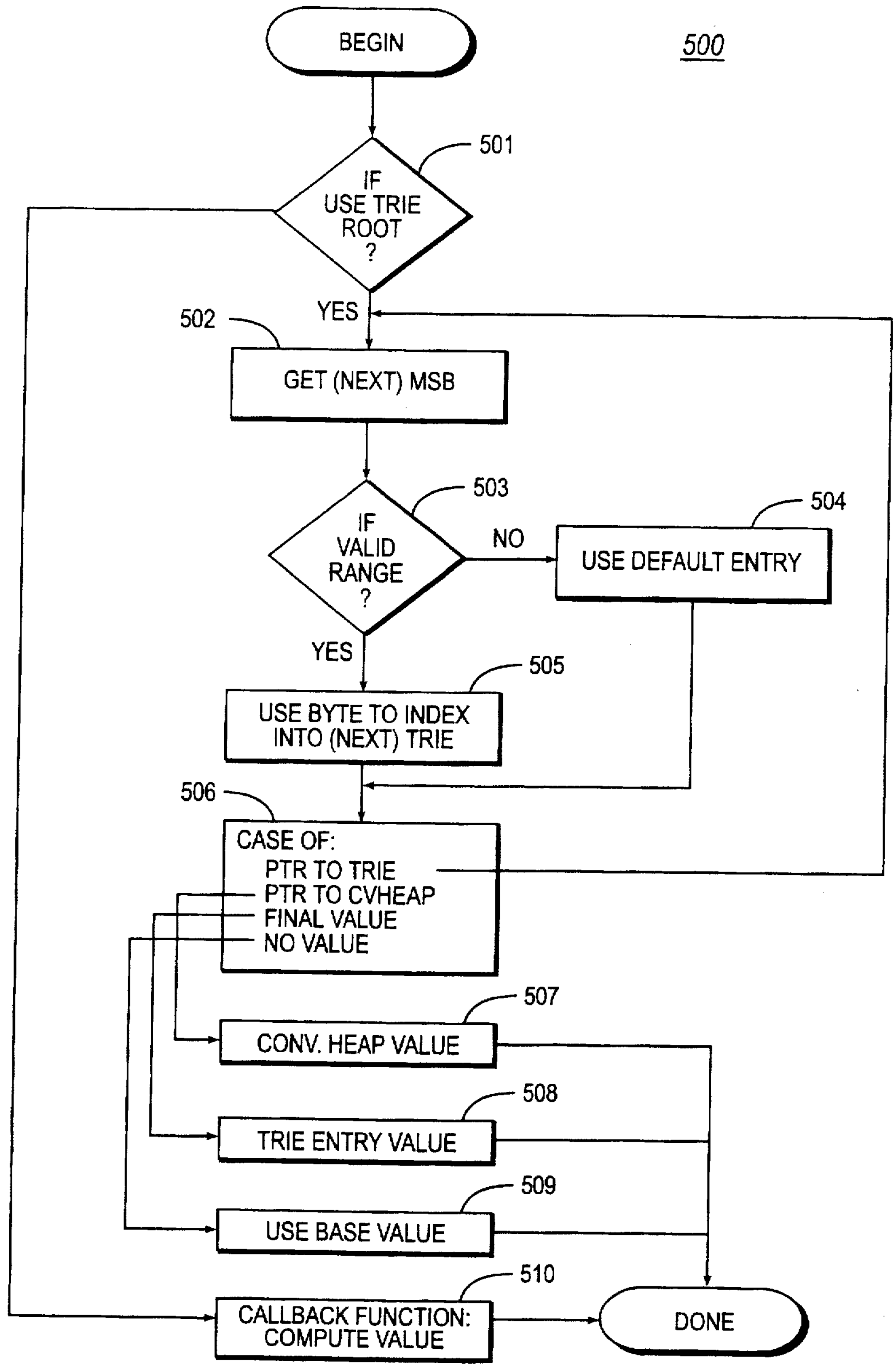
FIG. 5 illustrates a method of the present invention for navigating trie structures.

FIG. 5 illustrates a method 500 of the present invention for navigating trie structures. Step 501 represents a determination of whether a valid trie root entry exists in the transform structure 401. If a valid trie root does not exist, the system employs a transform callback function, which is accessed via pointer-to-transform function 407, as shown at step 510. After executing the callback function, the method is done.

In typical operation, the method employs the trie root (i.e., "yes" at step 501) and proceeds as follows. Starting from the most significant byte (MSB), each successive byte of the incoming character (e.g., a multi-byte character) is successively employed to point into subsequent tries, and so forth and so on until the ultimate value desired is retrieved. For processing a Unicode character, for example, the MSB of the incoming Unicode character is initially employed. Step 502 represents the extraction of the (next) MSB from the character. At step 503, method checks to make sure that the byte is within the acceptable range of byte values. The range is defined by stored ranges (datastart and datastop) 412, which are stored in the trie 415. If the MSB is not within the acceptable range, the default entry or value 413 for the trie is simply used instead, as shown by step 504; in such a case, step 505 is skipped.

The range and default entries are followed by an array of trie entries which, in a preferred embodiment, comprises 256 entries. The method uses the incoming MSB byte value for indexing into a particular one of these entries, at step 505. This step corresponds to indexing into entry 411 of the trie 415. Each trie entry itself stores status flags or bits 430 followed by a trie entry value 440.

Step 506 illustrates that the next action taken depends on the setting of the status bits. As shown by status entries 431, 433, 435, 437 of FIG. 4, the status bits can store the following values:

1. PTR2TRIE: Pointer to trie (431);
2. PTR2CVT: Pointer to conversion heap (433);
3. FINALVAL: Final value (435); and
4. NOCVT: No value (437).

The status found at the trie entry, therefore, allows the method to determine whether the entry stores a pointer to another trie, a pointer to a conversion heap, a final value, or no value.

If the status bits indicate that the final value is present at this point, the value is read from the trie entry at step 508 and used accordingly. Note that the final value is, in this instance, being employed without further checking of the value of the remaining byte(s) (i.e., least significant byte(s)). An example of such an instance would be a Unicode character which requires determination of character attributes of Chinese or Japanese ideographs. In other words, when processing Asian ideographic characters, for instance, the system can determine by looking at the first byte (indexing into a trie structure) that the character is in fact an ideographic character, despite the fact that the character is a multi-byte character (e.g., 2-byte Unicode character). Here, one finds the same lexical properties—ideographs—regardless of the value of the subsequent byte.

If the entry stored a pointer-to-trie entry, on the other hand, the method would continue to the next trie as pointed to by the pointer-to-trie (i.e., PTR2TRIE), looping back to step 502 as shown. The process can continue to an arbitrary level of nesting, thereby extending a chain of trie entries indefinitely. The method continues to "walk down" the chain of trie entries until the desired entry is finally reached.

Step 509 indicates that no value is found in the tries. In such a case, the method can use the base attributes from the default locale, as previously described. Step 507, on the other hand, indicates a case where the status bits indicate that the conversion heap is to be used. Both this case and the callback function case are treated as "exception processing"—that is, each represents an exception to the general approach of storing attributes as trie entries. These will now be described in further detail.

2. Exception processing a. Conversion heap

Ordinarily the transformation data itself—that is, the final result which is sought—can be stored as an item or entry in a trie structure. Certain attribute information cannot be stored within a trie entry or slot, however. Thus, the trie structures also operates in conjunction with a transform or "conversion" heap. The conversion heap is employed for results which are too big to be stored within a trie structure, such as a long string result. Such a result can be easily stored in the conversion heap where it is "pointed to" by a trie structure entry (i.e., a conversion heap pointer). Typically, short, fixed-length items are stored in the trie entry slots; larger, variable length items are stored in the conversion heap. Thus, the conversion or transform heap is employed for transforms where the result may be longer than that of the fixed-length trie entry (e.g., longer than three bytes, for a UTF-8 embodiment).

Figure 6:
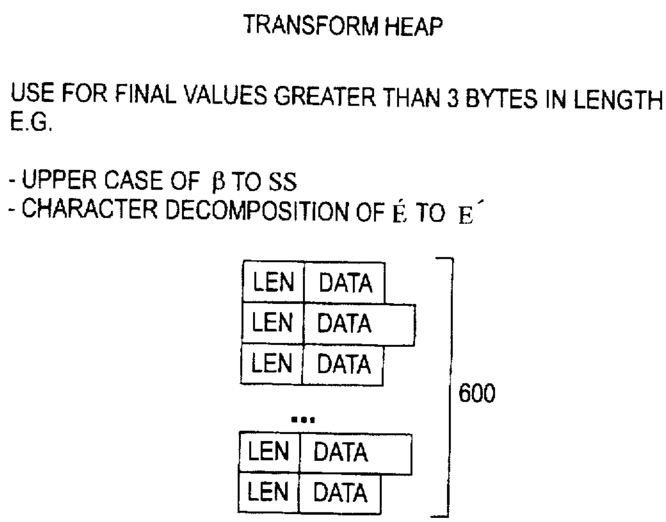
FIG. 6 is a block diagram showing a transform or conversion heap used in the system of the present invention.

As shown in FIG. 6, a conversion heap 600 comprises a heap list of variable length values. Specifically, the heap comprises a plurality of length/data entries, each storing a length followed by actual data. This is useful, for instance, in the upper casing of the German β (pronounced "ess-zet"). Upper casing of the β character yields SS—a value which requires four bytes in Unicode (two bytes for each S). Such a result will not fit in a three-byte trie entry (i.e., the currently-preferred embodiment). Therefore, the corresponding trie entry is used instead to point into the conversion heap to an entry comprising a length of four for storing SS in Unicode.

Figure 7:
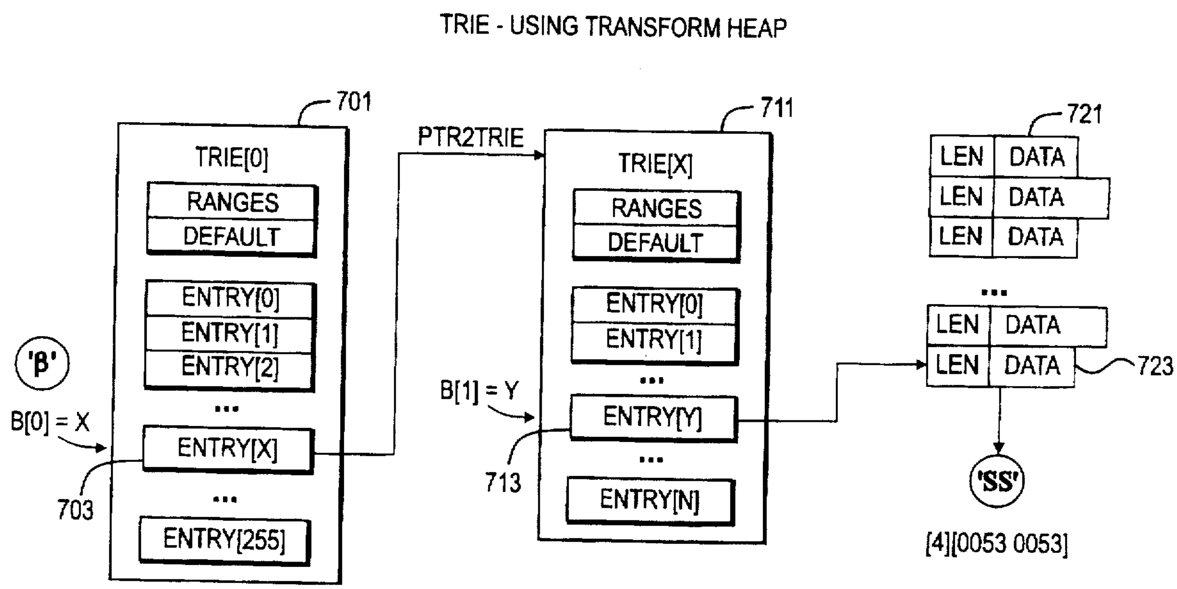
FIG. 7 is a block diagram showing use of the transform or conversion heap of FIG. 6.

FIG. 7 illustrates this process. The first byte is used to index into the first trie 701. From the corresponding entry 703, the system indexes into a second trie 711. Specifically, a pointer-to-trie is found at entry 703; its value is used to get to the next trie (i.e., trie 711). Then, the next byte of the character is then used to index into the second trie 711. The indexed-into trie entry 713 which is found stores a pointer which points to conversion element 723 in conversion heap 721. The transform or conversion element 723 itself stores the actual data: SS.

b. Callback function

Figure 8:
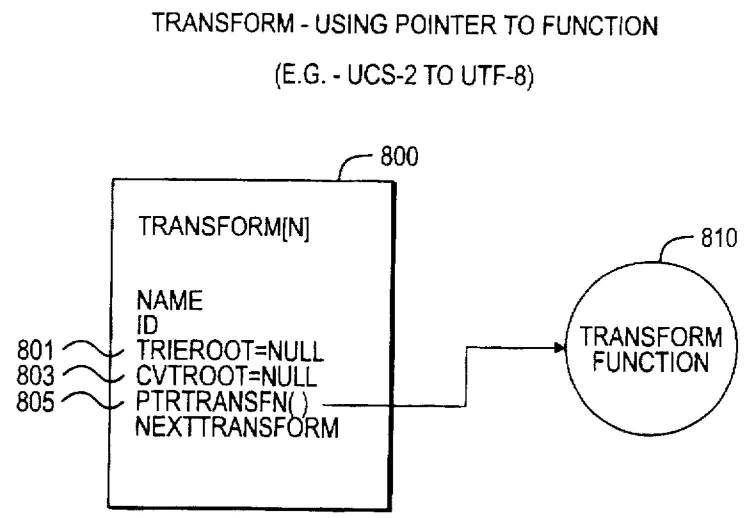
FIG. 8 is a block diagram showing a generic transform structure used in the system of the present invention.

The system of the present invention allows a specific transformation function to be registered with the system via a callback mechanism. This would be employed, for example, in instances where the linked list of trie structures and the conversion heap cannot provide the needed transformation, such as when the transformation must be computed. As previously shown in FIG. 4, the transform structure 400 stores a transform function pointer 407 for referencing a "callback" function. In such an instance, the callback function is invoked instead for effecting the required transformation, such as illustrated in FIG. 8. As shown by transform structure 800, both trie root 801 and conversion root 803 are set to NULL. Transform function pointer 805, however, stores a value—a pointer to transform function 810. In this manner, the user/developer supplied function can be called for effecting the transformation.

3. Advantages of trie-based transformation method

Use of trie structures is particularly advantageous. These data structures, which are loaded at runtime (e.g., from external files), can be created by an external utility. This allows one to supply trie structures in the field (i.e., at customer sites) without having to change or otherwise modify the executable binaries. Each locale-specific trie structure can then be loaded in by an executing program on a locale-by-locale basis. Since manipulation of the underlying data remains unchanged regardless of the underlying platform, increased portability is achieved.

H. Application of trie-based transformation method to Soundex

Soundex is a method for coding words, mainly surnames in English, so that names that sound alike have the same code. According to Don Knuth in *The Art of Computer Programming*—Vol. 3: *Sorting and Searching*, the Soundex method was originally developed by Margaret Odell and Robert Russell and was patented (U.S. Pat. Nos. 1,261,167 (1918) and 1,435,663 (1922)). The general approach is as follows:

1) Retain the first letter of the name. Drop all occurrences of A, E, H, I, O, U, W, and Y in other positions.
2) Assign the following numbers to the remaining letters after the first:

| | | |
|---|---|---|
| Labials | B, F, P, V | 1 |
| Gutterals and sibilants | C, G, J, K, Q, S, X, Z | 2 |
| Dentals | D, T | 3 |
| Long liquids | L | 4 |
| Nasals | M, N | 5 |
| Short liquids | R | 6 |

3) If two or more letters with the same code are adjacent in the original name, omit all but the first.
4) Convert to the form "letter, digit, digit, digit" by adding trailing zeros or dropping rightmost digits.

With some minor changes to the weighting scheme used, Soundex has been applied to languages other than English.

Traditional Soundex has inherent problems. Since the first letter always stays the same, strings like "Kathy" and "Cathy" yeild very different Soundex values. As another problem, Soundex is primarily designed for use with English; it is not particularly well suited for use with non-English languages. Moreover, there has been little or no effort to date to use Soundex for providing summary phonetic representations of non Latin-based languages (e.g., Russian, Japanese Kana, and the like).

According to the present invention, the trie-based transformation approach is employed to adapt the Soundex method for non Latin-based languages. In particular, one additional element is added to the trie-based data structure. For a locale, the element takes the phonetic letters A through Z, with a Soundex quantity assigned to it. Using the above-described trie structure, a value can be resolved in the range of A to Z, thus yielding a value which is valid for Soundex. In essence, the approach is one of performing a transliteration from one character set (e.g., script) into a non-accented Latin character repertoire, on a locale-by-locale basis. Once the transliteration to the Latin equivalents has been performed, conventional Soundex methodology can be applied for further processing (e.g., matching).

Consider, for example, the following Japanese Kana syllables: しょはん

These four characters would be transliterated into the following strings: "sho", "yo", "ha", and "n". Based on those quantities, the resulting string is mapped into Latin characters to which traditional Soundex can be applied.

The approach allows phonetic matching across locales. In Japan, for instance, a customer's name could be entered into a database in Kana, in Kanji, or in Latin (Roman) characters, depending on whether the worker who entered the particular name was a Japanese worker or a visiting worker. Using the trie-based Soundex approach, one can look up a customer's name despite the fact that it is stored in a particular locale-specific format. By adding a Soundex extension to locale attributes, the trie-based, thread-safe locale mechanism allows Soundex to be applied successfully to other languages and scripts as well.

Detailed construction and operation of data structures

A. Multi-threaded transformation data structures

1. General approach

Figure 9:
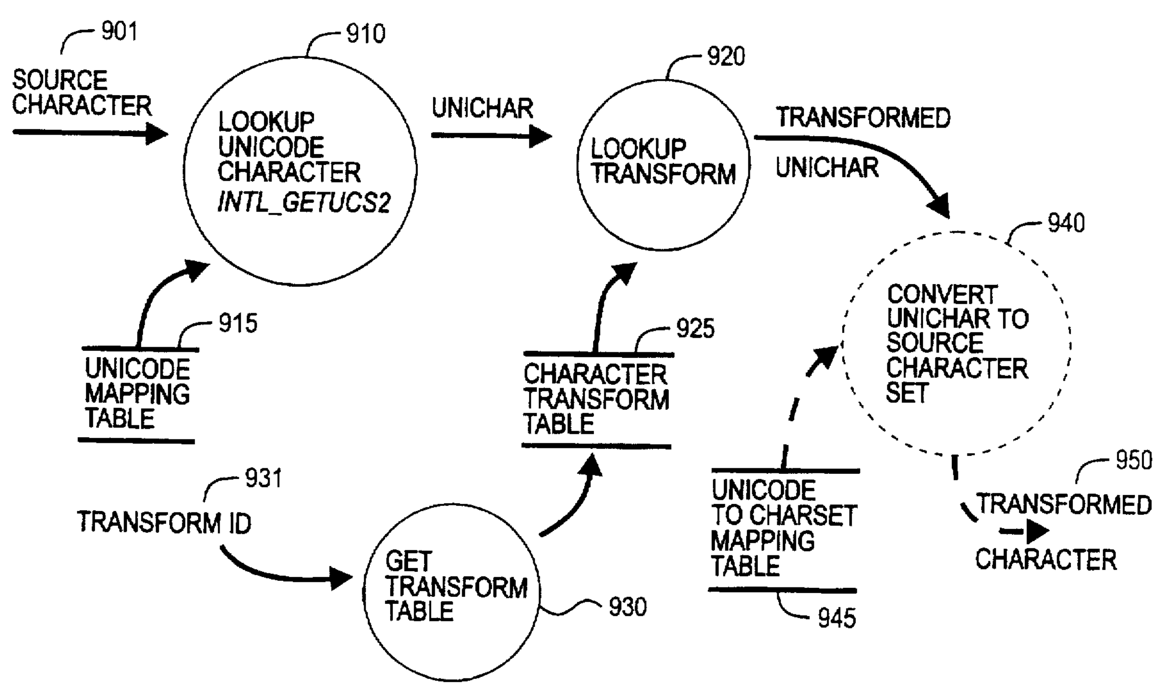
FIG. 9 illustrates an overall approach of the present invention for performing transformations.

FIG. 9 illustrates an overall approach of the present invention for performing transformations. Initially, a source character 901 enters a first process 910 which performs a Unicode character lookup. The process 910 performs the lookup using a Unicode mapping table 915, as shown. The Unicode mapping table is itself pointed to by a CHAR_ATTRIB structure, which serves as the root. The CHAR_ATTRIB structure functions as the central repository of character set information, including information about character width, attributes, case mapping, Soundex information, SQL language character normalization, and other transformations/conversion to and from other character sets.

Once the Unicode character ("unichar") is retrieved, the character can be employed to lookup various transformations, by indexing into the CHAR_structure. In this manner, the system can lookup various transformations and character attributes, perform mapping into another character, determining a Soundex quantity, or the like. Here, the code point of the character is used as an index into the table. The actual lookup is performed by a generic lookup transform function, shown at 920. The lookup transform process 920 employs a character transform table 925. Another process, get transform table process 930 provides a transform ID 931 (i.e., a context). The character transform table 925 returns a transformed unichar, in a consistent format.

Process 940 represents conversion from Unicode back into a platform-specific character set (i.e., source character set). The process is shown in dashed line, however, since conversion back to the source character set may not be required (depending on application). The process 940 employs a Unicode to platform-specific character set mapping table 945, for performing the conversion. Ultimately, a transformed character 950 is emitted.

2. Construction of character attribute data structure

The character attribute or CHAR_structure, in conjunction with various in-memory mapping tables, is employed to transform character strings into other elements. In an exemplary embodiment, the structure may be constructed as follows (using the familiar C programming language).

```
CHAR_ATTRIB Structure
typedef struct char_attrib
{
short  cs_status;          /* Status flags              */
BYTE   cs_class;           /* Type of character set     */
BYTE   cs_id;              /* Character set ID          */
short  cs_namelen;         /* Length of the name        */
BYTE   cs_name[MAXNAME];   /* Name of characters        */
BYTE   cs_maxcharlen;      /* Max char length           */
BYTE   cs_ncharsize;       /* Average nchar len         */
BYTE   cs_nnorm;           /* No. of Class 2 norm maps  */
BYTE   cs_ntype;           /* No. of Class 1 or 2 type maps */
```

-continued

```
BYTE  cs_nsoundex;           /* No. of Class 1 or 2 soundex maps            */
short cs_uniconv_cid;        /* UIL Character Set ID for conversion         */
                             /* UNICONV_CID_UNKNOWN if not in               */
                             /* UIL core set                                */
BYTE  spare[1];              /* Word boundry padding                        */
BYTE              *cs_width_map;   /* Width of chars                        */
CS_NORM_MAP       *cs_norm_map;    /* Class 2 Normalization maps            */
CS_TYPE_MAP       *cs_type_map;    /* Class 1 or 2 Type maps                */
CS_SOUNDEX        *cs_soundex;     /* Class 1 or 2 Soundex maps             */
/* Class3 specific structure starts here to allow for backward compat. */
CS_TRANSFORM      *cs_CharToUCS2;  /* Map to two-byte Unicode (USC2) */
CS_TRANSFORM      *cs_UCS2toChar;  /* Mapping from Unicode back */
CS_SOUNDMAP       *cs_toSound;     /* Class 3 Soundex Mapping   */
CS_TRANSFORM      *cs_toQtMatch;   /* Right-of-Pair match quote */
CS_TRANSFORM      *cs_locToUpper;  /* Localized Upper Case Mapping */
CS_TRANSFORM      *cs_locToLower;  /* Localized Lower Case Mapping */
CS_SOUNDMAP       *cs_locToSound;  /* Localized Soundex Mapping    */
CS_TRANSFORM      *cs_transNext;   /* Pointer to more Transforms   */
} CHAR_ATTRIB;
```

The CHAR_ATTRIB structure stores attribute information helpful for mapping from a given source character set into Unicode.

Figure 10:
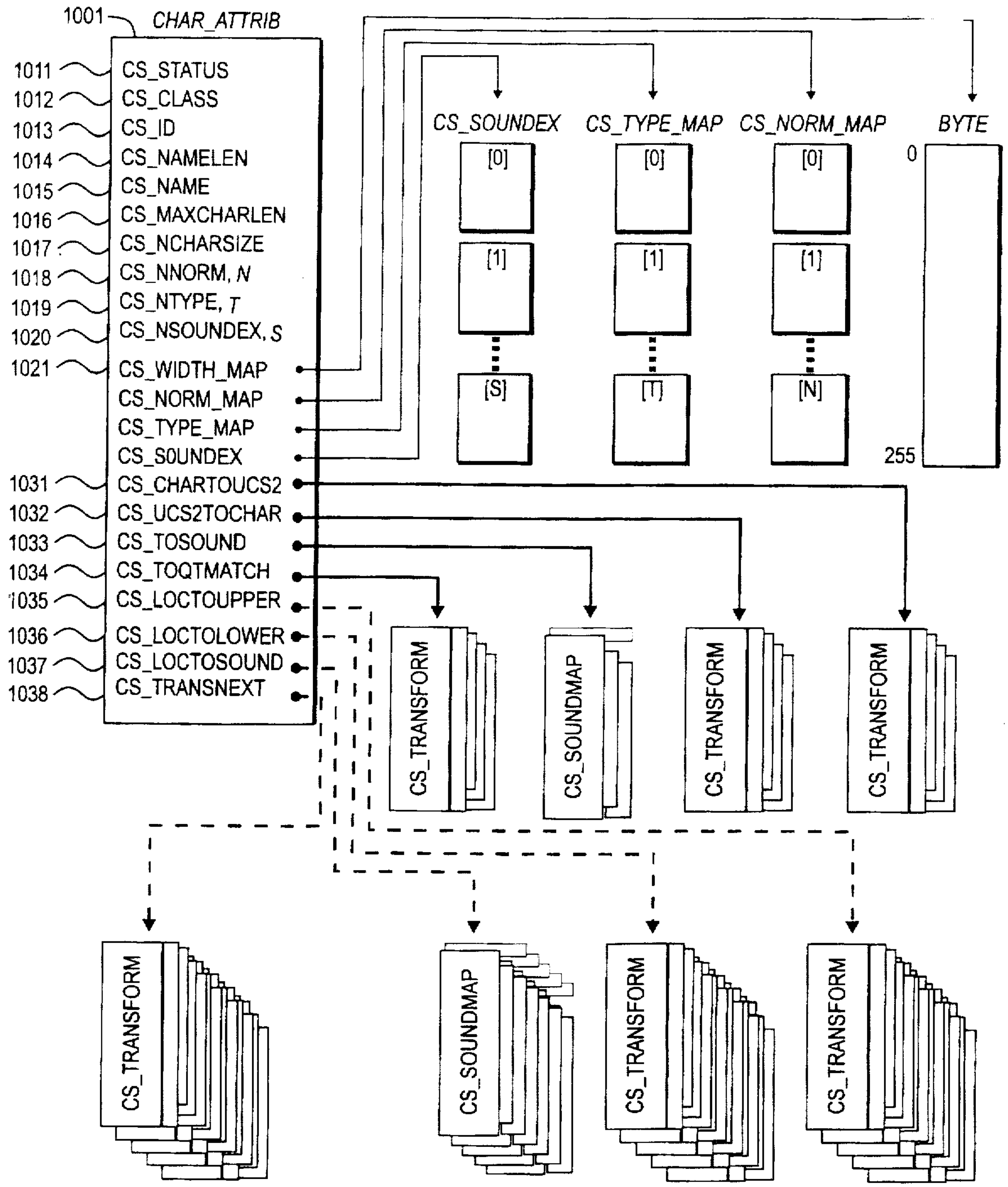
FIG. 10 illustrates diagramatically the layout of a character attribute structure.

FIG. 10 illustrates diagramatically the layout of this structure. The initial entries in the CHAR_ATTRIB structure 1001 store housekeeping/compatibility information, providing information about the source character set. Status information 1011, cs_status, stores status information which facilitates improving performance of processing. For a multi-byte character set, for instance, status information indicates whether this system recognizes white space as being only single-byte spaces or, on the other hand, as both single-byte and double-byte spaces. For Unicode character sets, status information can store a Unicode level (e.g., level 1, 2, or 3). Status information 1011, therefore, stores status information about generic attributes for the character set which is being processed.

The class field 1012, cs_class, indicates whether the character set is class 1 (single-byte only), class 2 (multi-byte Sybase character set), or class 3 (multi-byte Unicode with enhanced attributes). Character ID 1013, cs_id, is a unique ID for the character set. This enables the system to identify a particular source character set (e.g., Eastern European version of a Microsoft Windows character set—code page 1256). The field is an integer field for facilitating this identification.

The next two fields, name length 1014 (cs_namelen) and name 1015 (cs_name), store the human-readable name which is given to the character set. Maximum character length 1016, cs_maxcharlen, stores the maximum length that any single character can have in the set. For American and most European character sets, this stores a value of 1—that is, 1-byte width. For several Asian character sets, on the other hand, the maximum character length can span 3 or 4 bytes, or more. National character size 1017, cs_ncharsize, is employed for the SQL programming language. This stores the size of the average character used for the national character set; it is employed for backwards compatibility.

Number of normalization maps 1018, cs_nnorm, indicates the number of normalization maps. Normalization maps, which are used for class 2 character sets, allow the system to normalize multi-byte character sets to ASCII. For example, a double-byte character "A" can be normalized into a single-byte ASCII character "A." For class 3 character sets, this field stores a NULL value (as the character set would instead use the above-described transformations).

Number of type maps 1019, cs_ntype, stores the number of type maps. Type maps, which are employed for class 2 character sets, comprise linked structures employed for indicating particular character attributes (e.g., alphabetic determination, upper and lower casing, and the like). Class 3 character sets, in contrast, depend on an underlying Unicode library. Determination of normalization maps for class 3 character sets are based on Unicode rules. See e.g., *Unicode Standard Worldwide Encoding*, version 2.0, by the Unicode Consortium, Inc., 1965 Charleston Road, Mountain View, Calif. 94043 (unicode-inc@HQ.M4.metaphor.com). By using a single underlying library, one can avoid adding character attribute maps for every character set. For a class 3 character set, the type maps are employed for determining special attributes which are not covered by the Unicode Consortium's mapping tables.

Number of Soundex maps 1020, cs_nsoundex, stores the number of Soundex maps in place, for a class 2 character set. As previously described, a limitation with older character sets is that Soundex values were available only for Latin characters. The width map 1021, cs_width_map, points to a 256-byte long table which, based on the first byte of any character, indicates the data width of the character. Given a character which is 3-bytes long, for instance, the first byte of the character is used as an index into the table. The value stored thereat is equal to 3, for indicating that two additional bytes follow.

Fields 1031 and 1032 reference mapping tables. In particular, this allows the system to transform from the present character set to a two-byte Unicode (UCS-2) character and vice versa. cs_CharToUCS2 maps from the character set to Unicode. cs_UCS2toChar maps back from Unicode to the character set.

The "to Sound" field 1033, cs_toSound, points to a set of structures based on the transform structure, for determining a Soundex value. The approach is flexible in that the character can be mapped into a string to get the Soundex value, for both English and non-English characters. The "to Quote Match" field 1034, cs_toQtMatch, is employed for finding matching quotes. Given a delimited quote at the beginning of a string, the field 1034 can be employed to determining a string of all possible closing quotes.

Next, the CHAR_ATTRIB structure includes (optionally) pointers to locale-specific structures for upper case mapping, lower case mapping, and Soundex mapping, as shown at 1035, 1036, and 1037. Each drops into a linked list of structures; one which is unique based on a locale identifier. This allows additional locale-specific layers to be placed on the route.

Finally, the CHAR_ATTRIB structure terminates in a pointer 1038, cs_transNext, to a linked list of generic transform structures, each of which has a named value within it. If needed, an application can load at runtime a new transform structure, without having to change the binary of the program itself. Using the same generic procedures as previously described (i.e., trie navigation), new transformations can be added as desired, thus providing enhanced extensibility.

3. Construction of transform data structure

As shown in FIG. 10, the CHAR_ATTRIB structure references (i.e., points to) various transform structures. In an exemplary embodiment, a transform structure may be constructed as follows.

```
typedef struct cs_transform
{
 short    cstf_status;       /* Status flags          */
 short    cstf_type;         /* Type of transform     */
 short    cstf_id;           /* Transform ID          */
 short    cstf_localeID;     /* ID for locale, zero is default */
 short    cstf_namelen;      /* Length of the name    */
 BYTE     cstf_name[MAXNAME]; /* Name of Transform, e.g. "CharToUCS2"   */
 short    cstf_frommlen;      /* length of "from" name                  */
 BYTE     cstf_fromname [MAXNAME];     /* name of "from" state          */
 short    cstf_tonmlen;       /* length of "to" state name              */
 BYTE     cstf_toname[MAXNAME];    /* name of "to" state                */
 CSTF_TRIE *cstf_trieRoot;         /* Root trie structure               */
 CSTF_CVT  *cstf_cvtRoot;          /* Root of transform heap            */
 short    cstf_fouConvNameLen;  /* Length of name of cvt fn to use      */
 BYTE     cstf_fouConvName [MAXNAME] ;
 (CS_RESULT *) () cstf_fouConv;   /* Conversion function to use */
 CS_TRANSFORM *cstf_nextTransform; /* Pointer to next struct. */
}CS_TRANSFORM;
```

Figure 11:
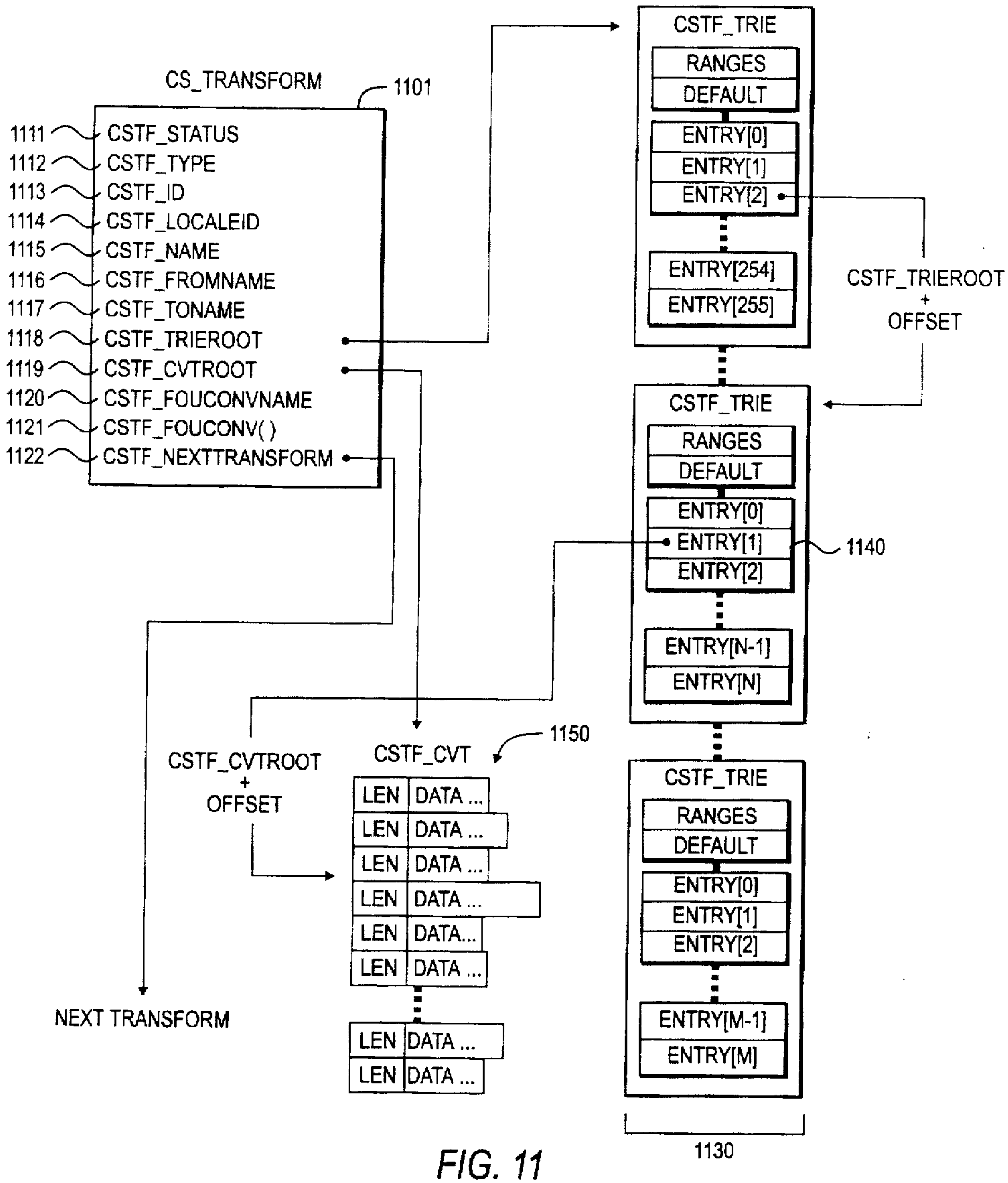
FIG. 11 illustrates diagramatically the detailed layout of a transform structure.

FIG. 11 diagramatically illustrates the detailed layout of a transform structure 1101. Here, each member of the structure includes the prefix "cstf"—"character set transformation." The entries function as follows. Status field 1111, cstf_status, stores status information for the transformation. The status flag 1111 stores an enumerated value. In an exemplary embodiment, the value is one of the following:

- CSTFSTAT_8BIT: -1-to-1, 8-bit base, trie defaults to 256 byte array holding 8-bit characters in byte[0] of each entry.
- CSTFSTAT_256ROOT: 256 byte master trie, with indirection through a second level of tries.
- CSTFSTAT_VARROOT: Variable length master trie, with pointers to more tries.
- CSTFSTAT_CVTROOT: cvtRoot is used to get variable length results.
- CSTFSTAT_FNONLY: User supplied function only, no tables (e.g., UTF8-to-USC-2).

The first status flag, CSTFSTAT_8BIT, indicates an 8-bit transform from one character to one character, where the character itself indexes into a single 256-byte array holding 8-bit quantities. CSTFSTAT_256ROOT indicates that the first trie (master trie) has 256 entries, where the first byte of a character quantity is used to index into the master trie and indirection through a second level of tries, depending on the value in each trie. CSTFSTAT_VARROOT indicates a variable-length root. In other words, the master trie can have any length, with additional pointers to more tries (or indefinite indirection). CSTFSTAT_CVTROOT is a status flag indicating that the conversion root field is in use, for getting variable length results. Finally, CSTFSTAT_FNONLY is a status flag indicating that the supplied function should be used; no tables are used.

The type field 1112, cstf_type, stores the type of transformation. Valid types in an exemplary embodiment, are as follows.

1003: Class 1 8-bit to 8-bit conversion table

3003: Class 3 multibyte to many conversion table

4003: Case and quotes mapping tables

6003: Miscellaneous transformation tables

Type 1003 is for class 1 (single-byte) characters using only an 8-bit conversion table. Type 3003 represents a class 3 (single and multi-byte) character set with a transform allowing one to convert from multi-byte characters to any number of characters. Type 4003 indicates a transform table employed for mapping between upper and lower case and for matching quote characters. Finally, type 6003 indicates miscellaneous transform tables. Note that these correlate to previously-described entries in the CHAR_ATTRIB structure. Types 1003 and 3003, for instance, can be employed for ChartoUCS2 and UCS2toChar entries. Type 4003 can be used for case and quotes mapping entries. Type 6003 can be used for the transNext entry, which points to transformation structures which follow (for any number of generic transformation values).

The ID field 1113, cstf_id, stores a unique ID for the transformation. The transform ID is a 2-byte quantity which is composed of IDs for the transformation and the character set. Locale ID field 1114, cstf_localeID, stores the locale ID associated with this transform. Locale ID is an implementation-defined numeric value used for indicating a locale currently being employed.

Name field 1115, cstf_name, stores the name for the transform. From name field 1116 and to name field 1117, cstf_fromname and cstf_toname, respectively, are employed for storing names of a from/to conversion. The from name and to name are typically used for diagnostic and status messages. Examples include a name for the source character set and one for the destination character set. Trie root field 1118, cstf_trieRoot, stores a pointer to the root structure of tries employed for performing transformations. This is followed by conversion root field 1119, cstf_cvtRoot, which stores a pointer to a conversion heap. As previously described, the conversion heap is employed for target pieces of data of varying size which are not stored within the tries.

The next two elements in the transform structure are optional. Form of use conversion name field 1120, cstf_fouConvName, is employed for conversions by name, based on an algorithm. If using a table structure is not applicable, for instance, this field allows the system to call by name to a configurable conversion function. This is followed by form of use conversion (function) pointer field 1121, cstf_fouConvO, which stores a pointer to a conversion function.

The final data member, next transform pointer 1122, cstf_nextTransform, stores a pointer to the next transform structure or record, in a chain of transform records.

The trie root 1118 points to a linked list 1130 of tries (i.e., structures of type cstf_trie). As previously described, the trie structures are sparsely populated structures which give an indication to the transformation process—that is, "how to" do the transformation process itself. In other words, it provides information about how a character entity is transformed into some other entity, which is not necessarily a character.

In an exemplary embodiment, a trie structure itself may be constructed as follows.

```
typedef structcstf_trie
{
        BYTE validStart;  /* Start of Valid data              */
        BYTE validEnd;    /* Last valid data                  */
        BYTE dataStart;   /* Start of specific data           */
        BYTE dataEnd;     /* Last of specific data            */
        int32 default;    /* Default values for data between validStart and
                             dataStart, and between dataEnd and validEnd    */
        int32 entry[256]; /* Data between dataStart and dataEnd       */
} CSTF_TRIE;
```

As shown, each trie record or structure comprises an 8-byte quantity. Accordingly, the tries exist as a virtual structure of 8-byte quantities.

The first two members of the record are employed for indicating a valid range, as previously described. Specifically, the first two members indicate the range of valid data. For UTF8, for instance, there exists a range for legal characters; any character outside that range is considered illegal. The next two members, dataStart and dataEnd, indicate the start and end of specific data, respectively. If the trie entry being indexed into does not fall within this range, the default value (i.e., "default" member) is employed instead.

Once the system has determined that it has a valid character within the specific data range, it subtracts the dataStart value from the character and uses the result to index into the entry array. For instance, an example pseudocode fragment to get an entry would appear as follows (where *cp is the character pointer for our search item).

```
if (*cp < cstf_trie->validStart
    | | *cp > cstf_trie->validEnd)
    then process illegal character
else
    entry       =       (*cp<cstf_trie->dataStart | |
                      *cp > cstf_trie->dataEnd)
                      ? cstf trie->default
                      : cstf_trie->entry[*cp-dataStart];
```

In this manner, the proper trie entry may be determined.

Each trie entry itself comprises a single-byte header followed by a 3-byte entry. Based on the single-byte header (i.e., the previously-described status flags), the system can determine whether the final value has been located, or whether the entry in the trie field is actually a pointer to another trie array. In the latter case, the next byte in the character stream is employed as an index into the next trie. In the event of a final value, the entry may in fact be a pointer into the conversion heap (for indefinite-length data). At a particular entry point, therefore, the system may have to go "farther" for completing the transformation. On the other hand, the system may have found a final value based on the first byte alone of a multi-byte character, such as previously described for Asian ideographic characters.

4. Construction of conversion heap

Indexing into the first trie structure might require indexing into yet another trie structure (e.g., using the second byte of the character being processed). As shown at 1140, an entry in the second trie may yield an entry pointing to the conversion heap, shown at 1150. The conversion heap itself comprises an array of variable length data. In an exemplary embodiment, a convert structure or record may be constructed as follows (using the C programming language).

```
typedef struct cstf_cvt
{
        BYTE cvtlen
        BYTE cvtdata[255]
} CSTF_CVT;
```

Example entries for the conversion heap are as follows.

Upper case German <ess-zet>, 'β'->"SS" in Unicode cvtlen|—S—| |—S—| padding [0×04] [0×00] [0×53] [0×00] [0×53] [0] [0] [0]

Lowercase Turkish dotless 'I' ->'1' in Unicode cvtlen |—1—| padding [0×02] [0×01] [0×31] [0]

Zenkaku Katakana Japanese "GA" to hankaku katakana "KA"+"voice-mark" [0×04] [0XFF] [0×67] [0XFF] [0X9E] [0] [0] [0]

Unicode Chinese U+4E5C to EUC-CNS 0×8EA2A1A2 [0×04] [0X8E] [0XA2] [0×A1] [0×A2] [0] [0] [0]

For performance reasons (e.g., data alignment), each entry is padded to lie on a 4-byte boundary. In essence, the conversion heap is employed as an exception mechanism, in order to keep the conversion data structures at a minimum size. Note particularly that if variable length entries were employed in the trie structures themselves, one would not be able to index directly into a trie; as a result, performance would likely suffer. By breaking these out separately, the system maintains performance and flexibility.

B. Soundex transformation data structures

One problem which exists with using Soundex is alphabets exist where each unique graphical element has an associated phonetic element, but they are not representable in the Roman alphabet. Another problem, within the Roman alphabet itself, is the use of accents and diacritic marks. For instance, "aardvark" spelled as "årdvark" yields a completely different Soundex value than the "aardvark" spelling.

The previously-described transforms neatly fit into a pattern of traversing trie structures, with exception handling into a conversion heap. In addition to the foregoing transformations, the system of the present invention also provides transform which determines a Soundex value for any alpha character. According to the present invention, characters are normalized to fit within the A through Z range, with locale-specific associations.

In an exemplary embodiment, the Soundex transform structure may be constructed as follows.

```
typedef struct cs_tosound
{
  short   csnd_status;      /*   Status flags        */
  short   csnd_type;        /*   Type of soundex map       */
  short   csnd_id;          /*   Sound Map ID       */
  short   csnd_localeID;    /*   ID for locale, zero is default    */
  short   csnd_namelen;     /*   Length of the name        */
  BYTE   csnd_name[MAXNAME];   /*   Name of character set     */
  unichar   csnd_map[26];   /*   Soundex values for A-Z   */
  CSTF_TRIE *      csnd_trieRoot;   /*   Root trie structure     */
  long   csnd_lastTrie;     /*   index to last Trie structure      */
  CSTF_CVT*   csnd_cvtRoot;   /*   Root of transform heap      */
  long   csnd_lastCvt;      /*   index to last CSTF_CVT element     */
  CS_TOSOUND *csnd_nextToSound; / *Pointer to next transform struct. */
} CS_TOSOUND;
```

Figure 12:
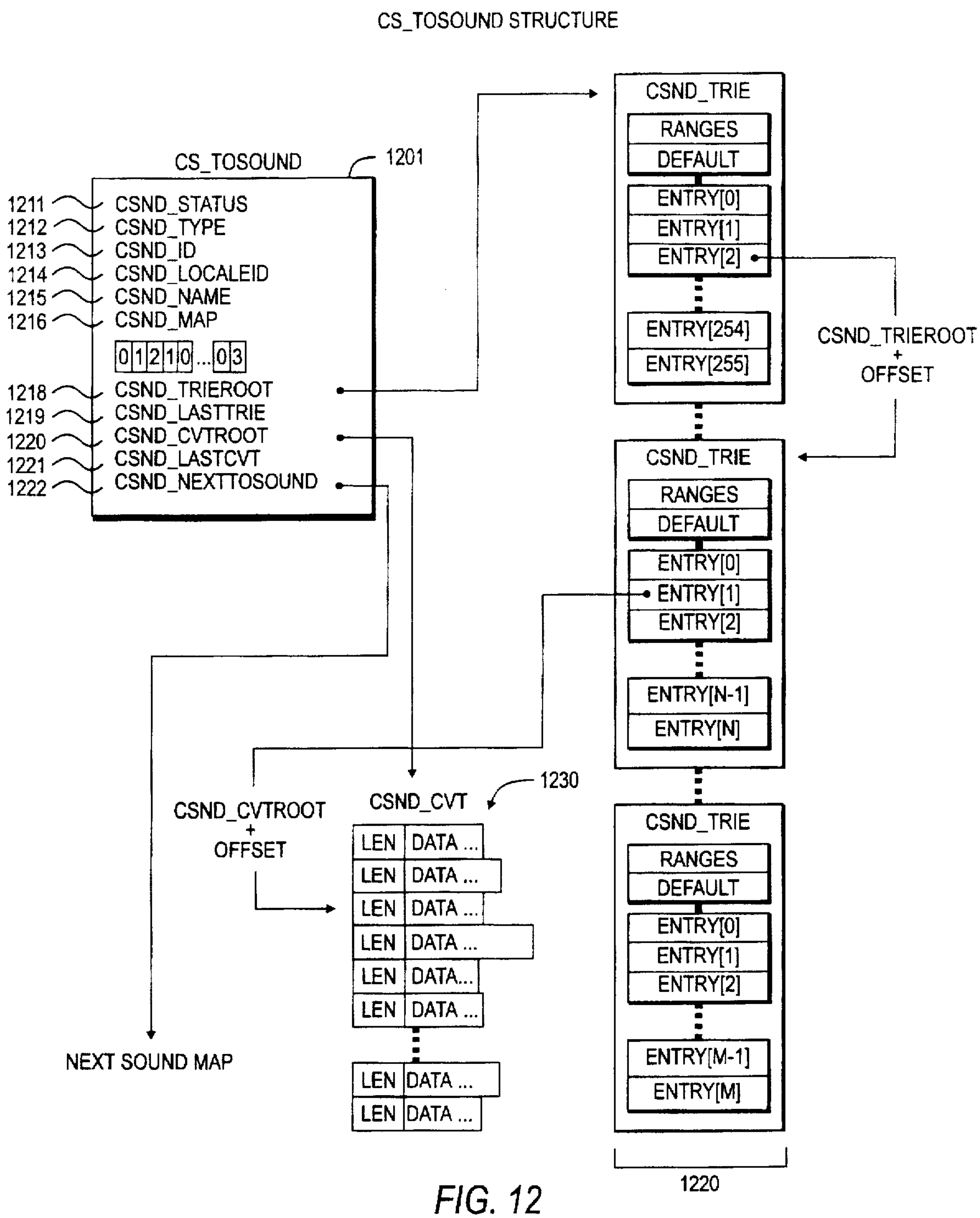
FIG. 12 illustrates diagramatically the detailed layout of a Soundex "to-sound" structure.

FIG. 12 illustrates a Soundex transform structure 1201, cs_tosound, for providing Soundex support in a generalized, localizable manner. The structure includes a Soundex map 1216, csnd_map, comprising a 26-byte array, where each entry in the array stores a numeric quantity between 0 and 9. The system takes the alphabetic character (regardless of what script it is in), based on context and locale ID, and traverses a linked list of trie structures 1220 (i.e., Soundex trie structures), for transform processing similar to that previously described. If need be, the system will drop into a conversion heap, shown at 1230. At the conclusion of the transform operation for Soundex, the system will have determined a single letter between A through Z, or a sequence of letters each of which is between A through Z. This yields an acceptable phonetic value which then can be used to map back to the standard Soundex algorithm.

The status field 1211, csnd_status, indicates whether the transform entails a straight character to sound (i.e., no string expansion). Valid status flags, based on an enumerated value, are as follows.

- CSNDSTAT_BASIC: Straight character to sound. No string expansion.
- CSNDSTAT STRINGS: Character to string mapping (some characters, such as Japanese kana or Korean hangul, map to Roman phonetic multi-character strings).

The type field 1212, csnd_type, stores a value indicating valid type. In the currently preferred embodiment, a single type is stored: 5003—class 3 Soundex table. The ID field 1213 , csnd_id, type stores a Soundex ID together with a character set ID. The character set employed in a preferred embodiment is Unicode. However, the Soundex support can be implemented for other character sets, as desired. The locale ID field 1214, csnd_localeid, indicates the default locale. The name field 1215, csnd_name, stores name which is used for diagnostic and status messages; it also uniquely identifies the sound map. The sound map field 1216, csnd_map, itself holds a small array of 26 Unicode characters which represent integer values from 0 to 9, from which a Soundex numerical component is derived.

The remaining Soundex fields function in a manner similar to that previously described. Trie root 1218, csnd_trieRoot, is a physical pointer to a linked list of trie structures, from which indirect addressing to transform entities takes place. Each index to another trie is indexed from this route. The last trie is indicated by csnd_lasttrie 1219. Conversion root 1220, csnd_cvtRoot, stores a pointer to the root of a conversion heap for Soundex; it stores variable length conversion strings. The csnd_cvtroot member stores a pointer to the last one of the conversion entries. The Soundex structure includes no support for calling out to an algorithmic Soundex function, unlike the cstf_structure. A callback function can be added if desired, however. The "next to-sound" field 1222, csnd_nextToSound, stores a pointer to the next Soundex transform structure in a linked list of such structures. This provides extensibility to other locales in a manner as previously described.

Figure 13:
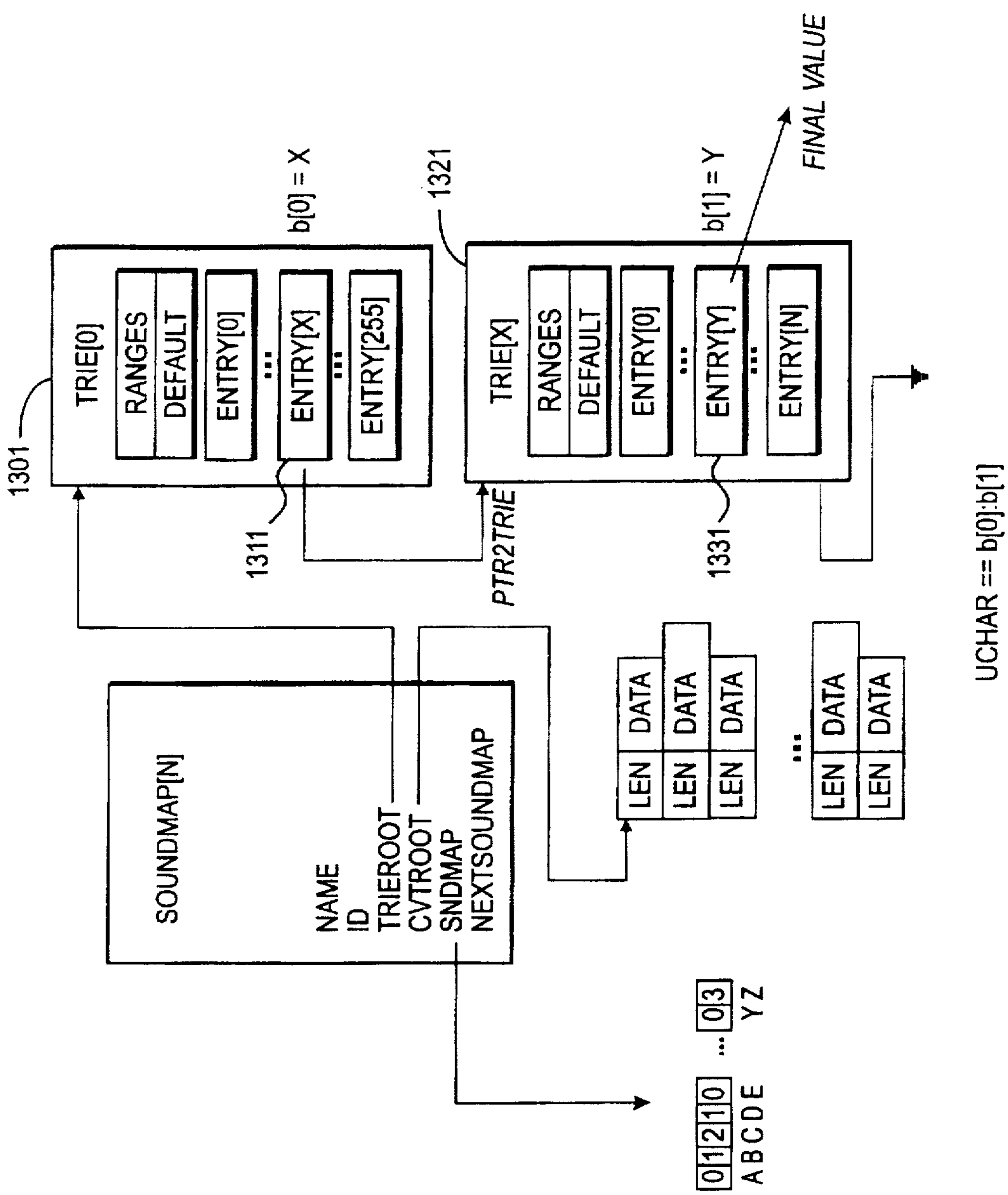
FIG. 13 is a block diagram illustrating a Soundex transformation performed in accordance with the present invention.

FIG. 13 illustrates a Soundex transformation in accordance with the present invention. Given a Unicode value (i.e., character) and a root trie 1301, the system first indexes through the most significant byte of the character; here, this is indicated to be the value of x. Before performing the actual indexing, the system checks whether x is within the range: greater than the start of the range and less than the end of the range. If it is within the range, the start of the range is subtracted from x. The resultant is employed to index into the array of entries, for resolving a particular entry. For this example, the entry is entry[x], shown at 1311.

At entry x, the system examines the flag stored thereat. If the flag stores a negative value (i.e., high bit set to "high"), then a pointer is stored by the entry (i.e., the remaining 3 bytes). These bytes can be masked off using bitwise operations for extracting the pointer. The 3-byte pointer is expanded out to a 4-byte quantity (integer) to point to another trie. The system at this point "drops into" that next trie—trie[x], shown at 1321. Now, the system takes the second byte of the 2-byte Unicode value (i.e.,b[1 ]), checks the ranges, and indexes into the corresponding entry—entry [y], shown at 1331. For this example, the status mask stored thereat is non-negative, thereby indicating a final value. From the status mask, the system determines the particular bytes to extract out of the trie entry, for reaching the final value.

Appended herewith are Appendix A & B providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

Appendix A

The Unicode® Consortium

Seventh
International Unicode Conference

San Jose, California
September 14-15, 1995

A6: Using Locales with Unicode-based Data Structures

*by*

Michael G. McKenna
Sybase, Inc.

© Copyright 1995, Unicode™, Inc.
and Sybase, Inc.

Locales and Unicode-based Data Structures

Using Locales with Unicode-based Data Structures

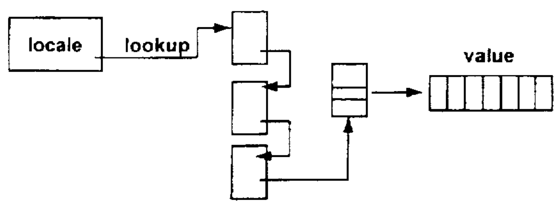

Michael G. McKenna
Globalization Architect
Global Products Group
Sybase, Inc.

Abstract:

In a multi-platform, multi-system world, there is not, as yet, any one standard for internationalization or representation of data. For a multinational company that must produce software on a wide range of environments, ranging from Microsoft Windows to DEC VMS, a system of normalization of international data is needed.

This presentation discusses a Unicode-based set of data structures used to keep track of character attributes and locale-sensitive data attributes in a portable, extensible manner.

The first part of the presentation then shows how normalized locale-sensitive processing can take place using a set of nested structures and overlays to normalize data into Unicode, and layer various locale specific character transformations such as transliterations, case-mapping, formatting rules, and Soundex into a multi-user client/server environment.

The second part of the presentation shows the use of trie structures to compactly store character attributes and transformation information.

The key topic areas covered will be:

- Unicode Attribute Structures
- Locale profile structures
- Use of locale caching in multi-user, multi-lingual applications
- Compact transformation structures
- Locale extensibility and customization

Locales and Unicode-based Data Structures

Current Problems

- Global vs thread-oriented
- Single-process orientation
  - one locale for all
  - no conversions
  - no multi-users
- Not Unicode oriented
  - not universal
  - extra work for each region
- Vendor specific solutions
  - not portable
  - not interoperable The software developer today, if s/he desires to develop a portable solution that works in a heterogeneous global environment is severely hampered right out of the shute.

The current implementation of the C-language and POSIX provides for locales, but only one to a process. It is not multi-threaded, and you cannot change locale attributes for different data streams without a lot of environment accounting. There are solutions in Microsoft Windows and Macintosh, but they are not portable between each other and Unix.

What is needed is a solution that is

- portable
- flexible
- thread-safe
- can handle multiple languages simultaneously

Locales and Unicode-based Data Structures

Conversion Envelope

Solution to solve many of the problems

- Normalize the data into Unicode
- Normalize the environment with one character set
- Portable
- Easy to maintain
- Easy to upgrade
- Easy to add new languages or regions

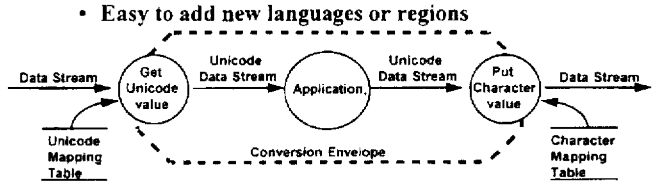

A solution to solve many of these problems is to take applications and wrap them inside of a "conversion envelope" and only allow normalized data to be processed inside the envelope. The most likely candidate for the encoding format of the data is Unicode.

This solution allows a new application to be portable to a wide range of vendor environments by merely changing the filters into and out of the envelope.

For a software vendor supplying world-wide solutions, this solution creates a consistency for

- maintenance
- upgrading
- debugging
- customer support

An added benefit is that the application or system can enter new market regions by just changing the "conversion filter packs". If designed right, this could be done in the field without having to get the development organization involved.

Locales and Unicode-based Data Structures

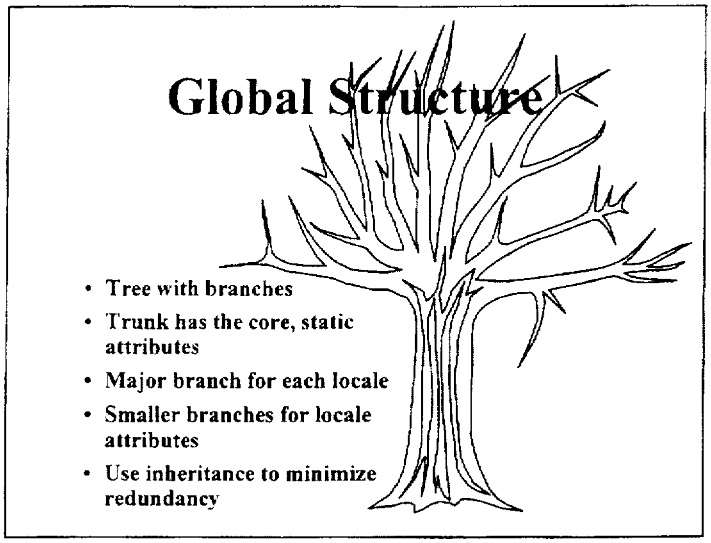

Anything that deals with language or culture is inherently object-oriented in that cultures, languages, and scripts are evolutionary entities, having evolved over the millennia from earlier core forms.

In the same way, designing for a multilingual system requires a concept of inheritance and sharing of common attributes.

Using the analogy of a tree, you can conceive of the trunk as holding the key, core attributes that everyone shares, the larger branches as language or culture groupings, and the smaller branches as territories, or regional specific items.

Locales and Unicode-based Data Structures

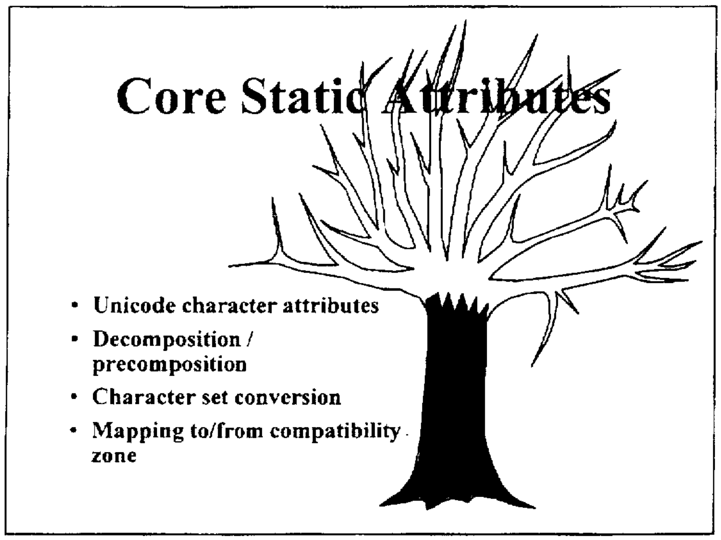

When dealing with lexical and cultural attributes of text, the character attributes of Unicode could be considered a core property. Also relatively invariant items such as decomposition mappings, and mapping to and from the Compatibility Zone.

Usually, a default locale is established, with all, or as many as possible, attributes defined with respect to cultural string formatting, sort orders, and character set definitions. This then becomes the parent object from which all the child locales inherit their properties.

Locales and Unicode-based Data Structures

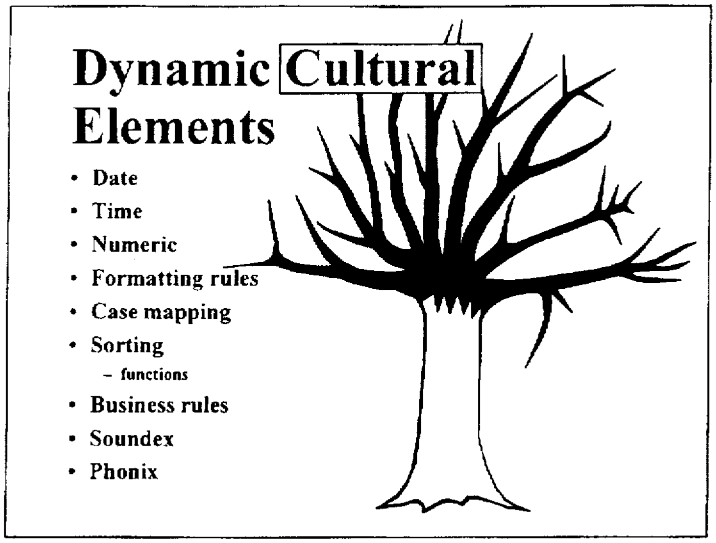

In a multilingual system, any data stream, data item, thread, or process may need to operate with its own locale. Take, for example, an example of a global parts service for big-ticket machinery.

A customer speaking Arabic calls their local distributor and orders a part. In Arabic. The system then electronically sends the order off to the manufacturer for processing. In Japanese. It receives notice that the part is back-ordered and is in the factory in America. The manufacturing order goes to the shop floor in a California border town. In Spanish. The final bill-of-lading, shipping label, and order confirmation is printed out in California. In English, French, and Arabic for transit and delivery in North Africa.

A little far-fetched? Maybe not.

For locales, there needs to be a mechanism to separate only those parts that are different from the core default locale. The slide above states a few examples of commonly encountered items with respect to cultural string formatting, locale-sensitive processing of text, and display and input of chronological and numeric data.

This problem can be expanded further by including user interfaces (GUI's) and all that is associated with them (keyboard mappings, input methods, and display drivers). But for the purposes of simplicity, we will stick with what is inside the "envelope".

Locales and Unicode-based Data Structures

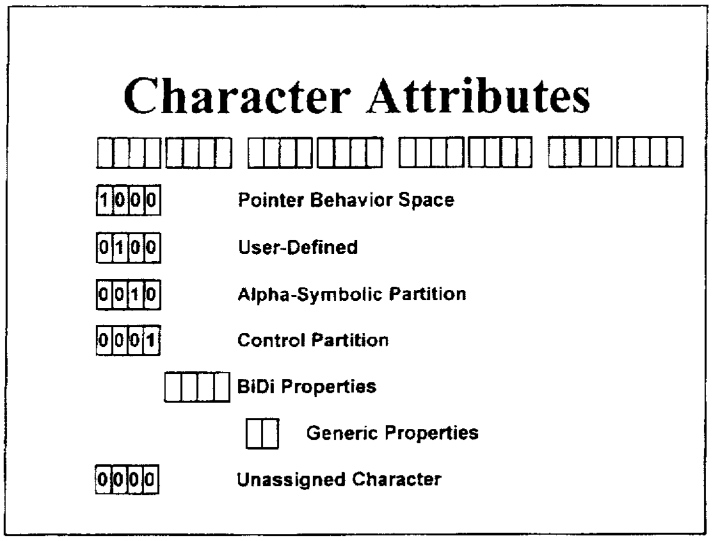

In order to lexically handle text, you need to know the attributes of the data passing through your system. At Sybase, we have taken the published database of Unicode character attributes and created a simple structure to contain and pull up character attributes.

Every Unicode character is assigned a 32-bit quantity that describes its attributes and lexical function. We have taken the 32-bit space and split it up into four partitions for Pointer Behavior Space > If the high bit is set, then this entity is
>
> actually a pointer to another attributes entry somewhere else User Defined Partition > This area is set aside for proprietary characters and future expansion Alpha-Symbolics Partition > This is the largest area, covering all defined non-control characters Control Partition > This area is set aside for whitespace and control characters Unassigned Character > If all zeros - then this character has not yet been assigned.

Locales and Unicode-based Data Structures

Locale Attributes

- Locale request
  - Environment context
  - Program request
  - Data store

Lang_Terr.codeset@mod
- Locale attributes resolution
  - Hunt locally first
  - if not found, then root defaults toupper("français") → FRANCAIS
- Virtual view
  - attributes defaults
  - simple inheritance
  - locale overlays ç —fr_FR→ C
  ç —default→ Ç

Locale attributes can be requested from a number of areas.

The operating system may indicate that a certain locale is in use at the time of invocation.

The application may get a dynamic request or programmatic request for a locale change or setting.

The data being accessed or sent may be tagged with one or more locales (e.g., MIME e-mail or HTML web pages)

When resolving the attributes, the software should first hunt through the current locale structures, and then, if not found, hunt throughout the default locale structures.

The idea is to end up with a virtual view of the locale-sensitive data by putting on a pair of culturally filtered glasses in the shape of a set of data structures.

Locales and Unicode-based Data Structures

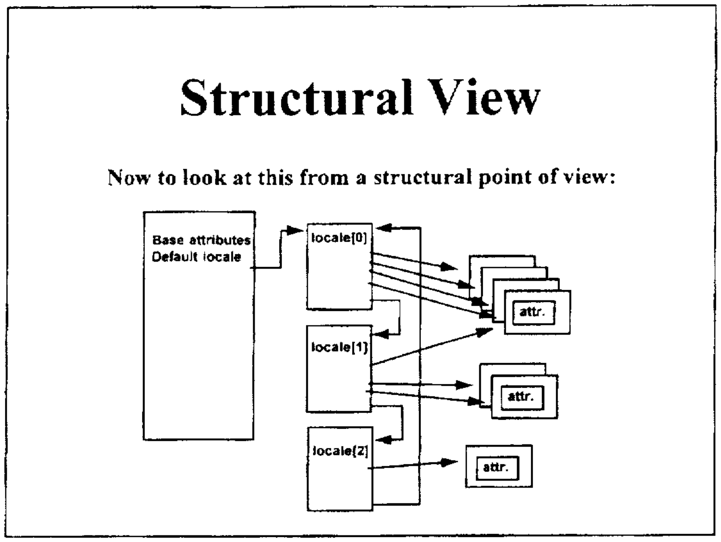

This slide shows a base default locale, with a number of specific, sparsely populated locale structures hanging off of it.

One key feature is that sub-attributes structures can be shared or omitted as need be to preserve space and time when processing. If an attribute structure is not represented, then it is assumed that the attributes should come from the default.

There is no reason why attributes structures cannot be shared, and indeed, it is encouraged that they share the space (e.g., fr_CA and fr_FR).

Locales and Unicode-based Data Structures

Locale Overlays

- Linked list of attributes, in MRU chain
- Each process can have its own locale
- Each data stream can have its own locale

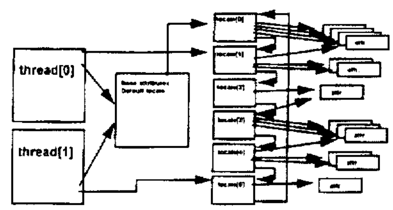

This shows a slightly more complex environment, where the locales structures are residing in a linked list in Most Recently Used ( MRU) order. When caching locale attributes, the newly requested locales would move to the head of the list, and the least used would be aged out. This would require a caching engine of some sort.

This also shows individual threads requesting specific locale attributes for different parts of each thread's processing as might be encountered in a multilingual server-based application.

Locales and Unicode-based Data Structures

Transforms

Method to transform one set of characters into another set. Useful for:

- attributes retrieval
- case mapping
- kana mapping
- simple transliteration
- quote matching
- decomposition
- character set conversion
- precomposed -> decomposed
- decomposed -> precomposed

The key to most all locale-sensitive attributes is the concept of *transformations* where a set of characters gets transformed into a different entity. The list above gives a good start as the usefulness of transforms. Hence, much of the rest of this talk will concentrate on the use, design, and structure of transforms.

Locales and Unicode-based Data Structures

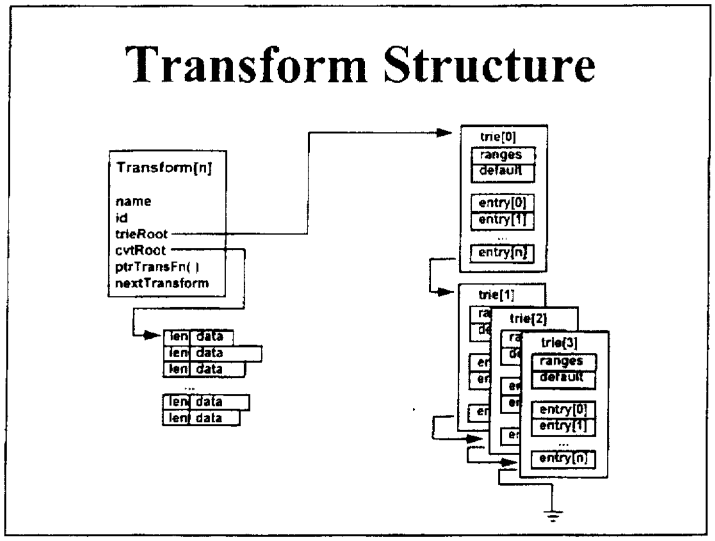

This shows a generic structure to transform from a Unicode value to new (not necessarily Unicode) value It is space efficient, flexible, and extensible It can be used for codeset conversion For each locale, there may be many transforms, as indicated in the list on the previous slide. The idea here is to use a single, efficient, generic mechanism for all transformations so as to reduce design time, and keep maintenance fairly simple. It also allows a single paradigm to be followed when building up transform tables in the field for new regions or languages.

The transform structure contains a name, information about what it is transforming FROM and what it is transforming TO. It also contains the name and ID of the locale it is associated with.

It has a pointer to a trie structure for space-efficient lookup of attributes or transform values, and a pointer to a conversion "heap" for longer string results.

Finally, there is a provision for a pointer to a named conversion function so that algorithmic processing can be used where a table-driven mechanism won't work.

Locales and Unicode-based Data Structures

Trie Structure

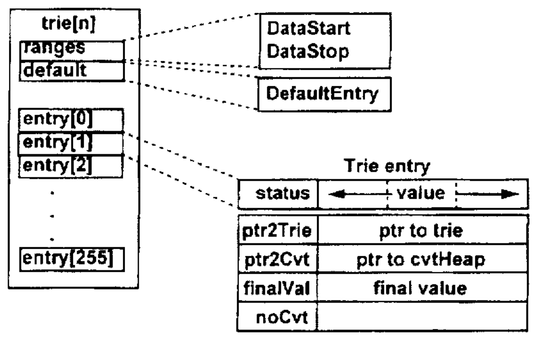

The Trie structure is based on papers by Lloyd Honomichl of Novel. The idea is to only assign attributes or values where necessary, and avoid unused, redundant, or non-applicable space.

The Tries in this talk refer to 256 element ranges. When using Unicode, the MSB would be used to find the first entry, then the contents of that entry would then be used to decide what to do with the LSB.

The Trie starts with a RANGE to indicate if the byte being analysed is even worth considering any further. If the byte is outside of the range, then the DEFAULT entry is used and acted upon accordingly.

Once an entry is found, its STATUS is checked to see if it is a pointer to another Trie or Conversion Heap (described later), or has no value (noCvt) or is the final value.

If it is the final value, then use that value, even if the LSB has never been checked (e.g., ideographics most all have the same lexical properties).

A Final Value is limited to three bytes in length, and therefore can handle UTF-8.

Locales and Unicode-based Data Structures

Trie - using Trie Pointers

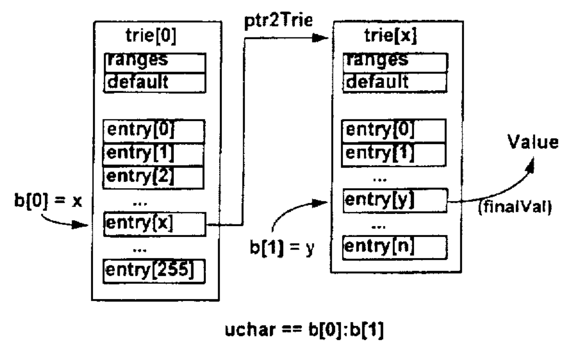

When walking down a Trie list, each entry can contain a pointer to another Trie and so on.

The data stream is analysed byte-by-byte, with each byte being used as an index into the next Trie pointed to, until a Final Value is reached. For practical reasons, when using Unicode, this should stop after two jumps (one for each byte), but could, conceivably continue on with decomposed characters, when using look-ahead algorithms, until the first spacing character is found.

Due to the possibility of thrashing or circular loops, an exception handling mechanism needs to be integrated into the transform software.

Locales and Unicode-based Data Structures

Transform Heap

Use for final values greater than 3 bytes in length

E.g.

- Upper case of ß to SS
- Character decomposition of é to e◌́

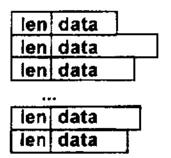

For transforms where the results may be longer than three bytes, a Conversion Heap is supplied. As shown above, this can occur when doing upper case mapping with characters like <ess-zet> or character decomposition.

The Conversion Heap is also useful when doing simple transliteration, e.g., of Japanese Kana into Roman characters, etc.

As shown below, this can be very useful when doing phonetic comparisons using SOUNDEX or other phoneme tools.

Locales and Unicode-based Data Structures

Trie - using Transform Heap

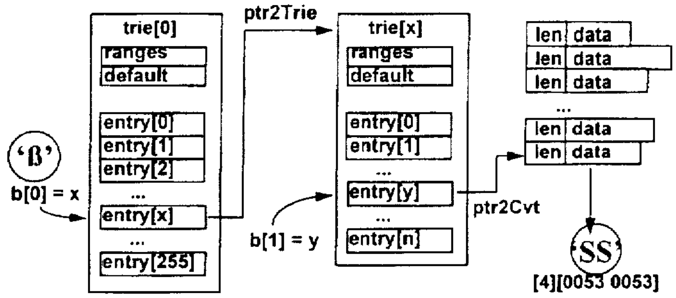

This shows an example of doing the upper-case mapping of the German <ess-zet> to <SS>.

The MSB is first used to look up in the master array.

A ptr2Trie is found, and the pointer used to get the next Trie.

The LSB is then used to index into the new Trie.

A ptr2Cvt is found, and the pointer used to get a conversion element.

The cvtElement shows a length of 4, with four subsequent bytes following, comprising the Unicode 'SS'

Locales and Unicode-based Data Structures

Transform - using pointer to function (E.g. - UCS-2 to UTF-8)

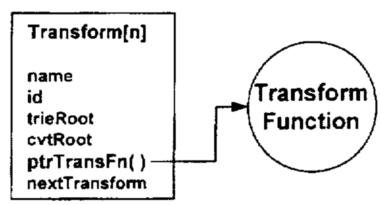

When all else fails, use a function to do the work.

This mode would be useful, e.g., when converting

- between UTF-8 and UCS-2
- between EUC-JIS and Shift-JIS (or other JIS-based encodings)
- converting to an ISO 2022 data stream (this may be best done as a two-step process In the design stage, the structure should be built so that it can use a NAMED function, in case it needs to be accessed through a DLL, through loadable microcode, or loadable overlays.

Locales and Unicode-based Data Structures

Soundex

- Four digit alphanumeric Soundex code
  - e.g., Soundex("Unicode") = U523
- Modified transform structure
  - Add SOUNDEX map for letters [A-Z]
- Non-roman alphabets
  - simple transliteration, e.g., kana to romaji
  - can map single characters to strings
  - normalize using generic transforms to upper case [A-Z]
- Accent stripping
- Language-sensitive
  - within limits of SOUNDEX restrictions
  - SOUNDEX is originally English-based Soundex is a method for coding words, mainly surnames in English, so that names that sound alike have the same code. According to Don Knuth in The Art of Computer Programming - Vol 3 : Sorting and Searching, the Soundex method was originally developed by Margaret Odell and Robert Russell and was patented [U.S. Patents 1261167 (1918), 1435663 (1922)]. It is also outlined on page 655 of Database Design by Gio Wiederhold. The method is described as:

Retain the first letter of the name.

Drop all occurrences of A, E, H, I, O, U, W, and Y in other positions.

Assign the following numbers to the remaining letters after the first:

| | | |
|---|---|---|
| Labials | B, F, P, V | 1 |
| Gutterals and sibilants | C, G, J, K, Q, S, X, Z | 2 |
| Dentals | D, T | 3 |
| Long liquids | L | 4 |
| Nasals | M, N | 5 |
| Short liquids | R | 6 |

Soundex has been applied, with some success, to other languages as well. Of course, some minor changes are required to the weighting scheme used for English.

Locales and Unicode-based Data Structures
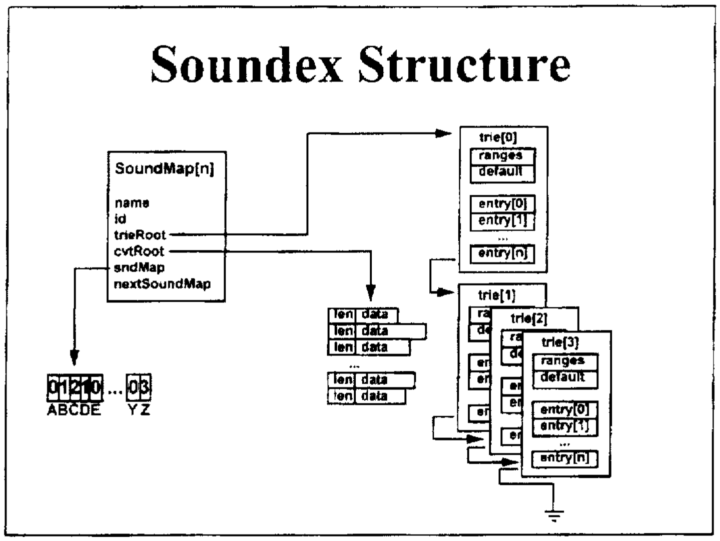
This shows how the same generic transform mechanism can be used to support Soundex. By merely adding the locale-sensitive sound-weighting template to the structure, you then have a flexible Soundex map.
Multiple Soundex maps could be linked together, each one for a different language.

Locales and Unicode-based Data Structures

Conclusion

Use of normalized Unicode data allows

- Use of generic transformation structures
- Locale overlays and flexibility
- Extensibility
- Portability
- Reduced maintenance Bibliography available on request:

Mike McKenna
Globalization Architect
Sybase, Inc.
Global Products Group
1650-65th Street
Emeryville, CA 94608
U.S.A.

E-mail: mgm@sybase.com

Appendix B

Title: Unicode for SCG Products Design Specs

Author: Mike McKenna (email mgm, ext. 256/7125)

Doc. Location:/calm/gpg/project/unicode/doc/design/GPGENG-SCG-Unicode-DS3/uni_charsetTOC.doc Doc. ID: GPGENG-SCG-Unicode-DS-3-1.0

Rev. Date: April 4, 1996

Abstract:

*This document describes the high-level design for implementation of Class-3 character sets and Unicode in the SQL Server, and Open Client products.*

Copyright ©1995, Sybase Inc. All Rights Reserved
Printed Copy is Uncontrolled Unless Distributed with a Controlled Distribution List

Table of Contents

Chapter 1: Class-3 Character Set Design .......... 1-1

1. Overview .......... 1-1
   1.1 Reference Documents .......... 1-1
   1.2 Definitions .......... 1-1
   1.3 Introduction .......... 1-2
2. Design Overview .......... 1-2
   2.1 Strategy .......... 1-2
      2.1.1 Limitations/Constraints .......... 1-3
      2.1.2 Dependencies .......... 1-3
      2.1.3 Security Considerations .......... 1-3
      2.1.4 Performance Considerations .......... 1-4
      2.1.5 Quality Focus Area(s) .......... 1-6
      2.1.6 Testing .......... 1-6
   2.2 Alternative Strategies .......... 1-6
3. High Level Design .......... 1-6
   3.1 Design Assumptions .......... 1-7
   3.2 Modules .......... 1-7
      3.2.1 Data Structure Access Modules .......... 1-9
         com_GetTransform .......... 1-9
         com_GetChatr .......... 1-11
      3.2.2 Data Normalization Modules .......... 1-13
         com_GetUCS2 .......... 1-13
         com_StrToUCS2 .......... 1-15
         COM_TO_LCASCII .......... 1-17
         COM_STR_TO_LCASCII .......... 1-18
      3.2.3 Unicode Character Attributes Modules .......... 1-19
         com_GetLex .......... 1-21
         COM_IS_ALPHA .......... 1-22
         COM_IS_TSQLID .......... 1-23
         COM_IS_DIGIT .......... 1-24
         COM_IS_XDIGIT .......... 1-25
         COM_IS_SPACE .......... 1-26
         COM_IS_PUNCT .......... 1-27
      3.2.4 String Transformation Modules .......... 1-28
         com_Transform .......... 1-28
         COM_TO_UPPER .......... 1-30
         COM_STR_TO_UPPER .......... 1-31
         COM_TO_LOWER .......... 1-32
         COM_STR_TO_LOWER .......... 1-33
         COM_IS_UPPER .......... 1-34
         COM_IS_LOWER .......... 1-35
         com_CharToUTF8 .......... 1-36
         com_StrToUTF8 .......... 1-37
         com_ToSound .......... 1-38
         com_GetRightOfPair .......... 1-39
      3.2.5 Data Naturalization Modules .......... 1-40
         com_UCS2ToChar .......... 1-40
         com_UnistrToChar .......... 1-41

Copyright ©1995, Sybase Inc. All Rights Reserved Rev. Date: April 4, 1996
Printed Copy is Uncontrolled Unless Distributed with a Controlled Distribution List 3.2.6 Character Width Modules ........ 1-42
3.3 Feature Flow ........ 1-42
3.4 Shared Data Structures ........ 1-44
3.4.1 Character Properties ........ 1-44
3.4.2 Class-3 Specific Character Properties ........ 1-49
3.4.3 Class-3 Pointer Properties ........ 1-54
3.4.4 Transact SQL Character Types ........ 1-56
3.4.5 Data Structure Overview ........ 1-58
3.4.6 The CHAR_ATTRIB Structure ........ 1-58
3.4.7 Character Types Structure ........ 1-62
3.4.8 Generic Transform Structure ........ 1-62
3.4.9 CSTF_TRIE Structure ........ 1-66
3.4.10 CSTF_CVT Structure ........ 1-70
3.4.11 Soundex Transform Structure ........ 1-71
3.4.12 TO_ASCII Transforms Structure ........ 1-75
3.4.13 Width Map ........ 1-75
3.4.14 Case-Map Transforms ........ 1-75
3.4.15 Character Pairs Transforms ........ 1-75
3.4.16 UCS-2 Transforms ........ 1-75
3.5 Upgrade ........ 1-75
3.6 Diagnostics ........ 1-75

4. Low Level Design ........ 1-75
4.1 Assumptions ........ 1-75
4.2 API ........ 1-75
4.3 Special Considerations ........ 1-76
4.4 Pseudocode ........ 1-76

5. Character Attributes Study ........ 1-76

Copyright ©1995, Sybase Inc. All Rights Reserved 
Printed Copy is Uncontrolled Unless Distributed with a Controlled Distribution List

Chapter 1: Class-3 Character Set Design

Author: Mike McKenna (email mgm, ext. 256/7125)

Doc. Location:/calm/gpg/project/unicode/doc/design/GPGENG-SCG-Unicode-DS3/uni_charset.fm Doc. ID: GPGENG-SCG-Unicode-DS-3-1.0

Rev. Date: April 4, 1996

| Date | Revision ID | Name | Section | Reviewers |
|---|---|---|---|---|
| 21 Jun 95 | 1.0 | M. McKenna | Document Created | |
| 31 Mar 96 | 1.1 | M. McKenna | 3.4.1, 3.4.2, 3.4.3, 3.4.4 - Moved these sections here from the Functional Specs (GPGENG-SCG-Unicode-FS-2.2)<br>3.2 - changed module names to com_* from intl_* based on OCS standards<br>3.4.9 - added GOBACK for many-to-many transforms | Jim Macklow<br>Roger Meunier<br>Sara Gu<br>Ken Whistler<br>Dave Hung |

1. Overview

1.1 Reference Documents

MRD - Unicode SQL Server MRD.

Performance Specification - None required. Addressed in the Functional Specifications.

Functional Specification - GPGENG-SCG-Unicode-FS-x.x in *code/doc/func/GPGENG-SCG-Unicode-FS/00_unifuncTOC.doc* and *picasso:/calm/gpg/project/unicode/doc/func/GPGENG-SCG-Unicode-FS/01_unicommon.fm*

1.2 Definitions

Refer to <http://www-gpg/gpg/glossary.html> for internationalization keywords. Other words will be added here as deemed appropriate.

Sybase Proprietary and Confidential Copyright ©1995, Sybase Inc. All Rights Reserved
Printed Copy is Uncontrolled Unless Distributed with a Controlled Distribution List

| | |
|---|---|
| API | Application Programming Interface. The set of function calls needed to access and utilize an encapsulated set of features |
| directed pair | A combination of characters always found in pairs, e.g., "(" and ")" |
| left-of-pair | A left half of a directed pair, e.g., "(" or "{" |
| MAITS | Multilingual Application Interface for Telematic Services - a joint globalization project with the European Union and Sybase. See <http://www.dkuug.dk/maits> |
| UIL | Unicode Infrastructure Library |
| Unicode Infrastructure Library | Stand-alone library, based on Unicode, for character manipulation, message handling, and future internationalization |

1.3 Introduction

This chapter describes the design for the Class-3 character set, the underlying set of data structures, macros, and functions needed to support ISO 10646-1 UTF-8 data in the SQL Server and Open Client/Server.

For a detailed description of the functionality addressed by this design, please refer to the functional specifications.

2. Design Overview

This section describes the design at a high level laying out the design strategy that was chosen and alternatives that were considered.

2.1 Strategy

The concept of using Class-3 character sets is based on historical usage at Sybase of Class-1 and Class-2 character sets. The concept is to allow a SQL Server or Open Client to be independent of the underlying Operating System or GUI environment. An application or SQL Server can be configured by loading an external character set definition, thereby allowing expansion into new markets without having to rebuild any binaries.

The Class-3 character set was designed taking into consideration needs from SQL Server, Open Client, Open Server, and Unicode Infrastructure Library. Consulting between the groups, the result is applicable for all, and is intended to be used as a generic character set definition for all future products.

Copyright ©1995, Sybase Inc. All Rights Reserved

Printed Copy is Uncontrolled Unless Distributed with a Controlled Distribution List Basic points of the strategy:

- Use Unicode wherever possible. This helps to generalize important functions, make them maintainable, and conform to an accepted international standard.
- Use common code and architecture with the Unicode Infrastructure Library features wherever possible.
- Make all attributes modular. This allows dynamic, locale-sensitive modifications to be made to parts of a character set definition. Examples of items that are modularized are case-mapping, soundex, and transliteration tables.
- Use a common data structure approach throughout. This reduces maintenance overhead for a highly complex (or esoteric) subject.
- Keep data structure sizes to a minimum. Using Unicode as a base can significantly increase the size needed for basic definition information. By using various folding and trie schemes, we can reduce the memory footprint needed in smaller client machines.
- Critical attributes functions must operate as fast as possible. Functions that are used regularly at run-time in the SQL Server must operate at lightning speed. The TO_ASCII() macro in particular is used to a considerable degree in the LIKE function.
- Existing applications must be able to use their old databases or data files.

2.1.1 Limitations/Constraints

Every attempt has been made to reduce the amount of changes to the SQL Server and Open Client code. There is also a constraint in that this functionality must be usable by applications that intend to use the Unicode Infrastructure Library. We hope that it will also be usable by Powersoft.

2.1.2 Dependencies

This work is dependent on

- Open Client codeset conversion. Once in the SQL Server, the data is unusable if it can't get out.
- Character Set Compiler. Without the character set compiler, you can't create a character set to install.

2.1.3 Security Considerations

None.

The user documentation should state that passwords should be chosen from characters that are representable on all client machines. For a global system, this is limited to 7-bit ASCII. Otherwise, they may not be able to enter their password from a remote client.

Copyright ©1995, Sybase Inc. All Rights Reserved 
Printed Copy is Uncontrolled Unless Distributed with a Controlled Distribution List

2.1.4 Performance Considerations

There are three areas where the character set definition and how it is used impacts performance in the SQL Server. They are the Parser, LIKE optimization, and String Functions. Since the actual server design issues are addressed in a separate document, I will only discuss the issues related to the character set definition itself.

Codeset conversion has been found to have almost no affect on performance in the SQL Server. Transmission of data in larger packets (growth of UTF-8 data from 8-bit or Asian data) can have some affect on performance, but the discussion of this is beyond the scope of this document.

2.1.4.1 Parser

The parser is the first place the server does any lexical analysis of data, in this case a query coming from a client. In the Class-3 character set, each character is first converted to Unicode (UCS-2), then looked up in a table to get its proper lexical attributes to aid in parsing. This adds an extra step for EVERY character of converting to Unicode first.

We thought of converting to UCS-2 straight from the input buffer, and keeping it there until dropped into a constant node or identifier, but that requires two conversions on most characters.

To keep things as efficient as possible conversion from the base character to UCS-2 is a simple table lookup, except when converting from UTF-8 to UCS-2, when it is algoritmic.

Therefore, the process has changed from:

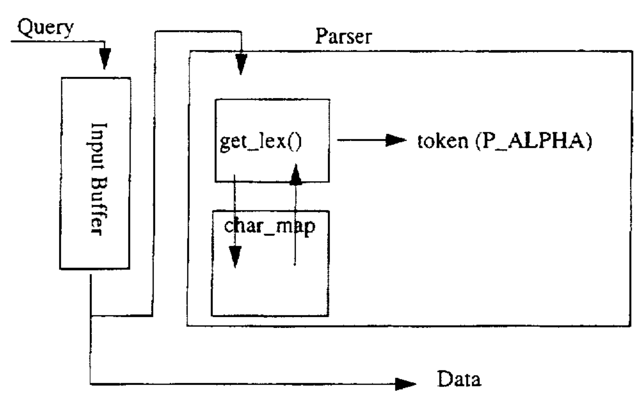

Copyright ©1995, Sybase Inc. All Rights Reserved 
Printed Copy is Uncontrolled Unless Distributed with a Controlled Distribution List to:

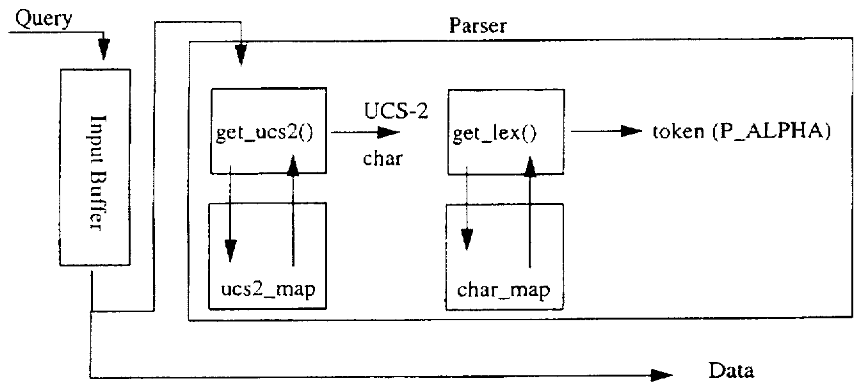

This extra step should have a minimal impact on overall performance since the parser is practically in the noise level as far as performance overhead is concerned. The conversion to UCS-2 provides a powerful portability feature in that only the mapping to UCS-2 needs to change to install additional character sets, and the behavior is consistent across all platforms and environments.

Note that the parser does not convert the actual data to UCS-2 format. Once a token is found that delimits data, the existing parser mechanisms are used to grab the data. An alternative approach is to have the whole input buffer converted to Unicode (UCS-2) on input, regardless of the client character set, then converted as need be to the Server default character set for manifest constants and textual data items. This will be explored more thoroughly in the Unicode Server design specs.

2.1.4.2 TO_ASCII

The TO_ASCII macro is used to normalize textual data to lower-case ASCII for keyword and operator lookup. This is used as well in determining where pattern match characters are in LIKE optimization and query resolution. Since this normalization can occur in the SQL Server Sequencer and at run-time, it is a performance-critical operation. Therefore, this routine, and this one alone, will be optimized on a per-character set basis to eliminate as many levels of indirection as possible. The structures and interface to those structures are designed so that no knowledge of character length is needed from a separate width table.

The normalization flow is described in more detail in the data structures section below.

Copyright ©1995, Sybase Inc. All Rights Reserved 
Printed Copy is Uncontrolled Unless Distributed with a Controlled Distribution List

2.1.5 Quality Focus Area(s)

Of particular importance will be the assurance that the conversion to and from character set data, and its lexical usage is accurate. We will also need to be sure that there is minimal breaking of existing applications.

2.1.6 Testing

The High Level Testing strategies should aim to:

- Test the codepaths rather than the text encoding.
- Test all transformation and attribute tables in SQL Server.
- Use the character set compiler to create character sets that exercise the multibyte natures of the Class-3 definitions.
- Create sample programs that exercise architecture not included in SQL Server, such as the linked list of transformation tries for transformations other than char_to_upper, char_to_lower, char_to_lex, char_to_attrib, char_to_soundex, char_to_ucs2, and ucs2_to_char.
- Test tokenization in the parser, once the parser uses Class-3 character sets. Check that the parser accurately identifies delimiters, keywords, etc.

2.2 Alternative Strategies

A number of alternate strategies were contemplated, and are described in detail in the Functional Specs. Among them were:

- One alternative is to put all character attributes in each character set (don't use UCS-2 as an intermediary). This is not general enough in that it requires special-case attributes tables for each character set. But it does provide some minor performance advantage in that the lexical analyzer only needs to index off one set of tables instead of two.
- A second alternative is to not allow extra transformation tables. I.e., don't allow for future expansion - but this is too limited if the hooks are readily available now.
- A third alternative is to just add *to_upper*, *to_lower*, and *to_soundex* as extensions of the Class-2 character sets. This is too limiting in that there is no ability to have modular locale-sensitive case-mapping and soundex. Also, Class-2 doesn't support case-mapping when the mapped character is more than 256 bytes away, hence you can't use UTF-8 or Unicode.

3. High Level Design

This section includes a description of data structures that will be added or affected by this design and the high level design for each module that will be added or changed. A module is generally either a C routine or a source code file (or stored procedure). However, if the author feels that a Copyright ©1995, Sybase Inc. All Rights Reserved 
Printed Copy is Uncontrolled Unless Distributed with a Controlled Distribution List different breakdown of the code into modules will facilitate the audience's understanding of the feature, a different module breakdown can be used if clearly specified.

3.1 Design Assumptions

The design is based upon the following assumptions:

- That the data structures and Unicode C-type and transformation functions developed for the Unicode Infrastructure Library are available, and contain the agreed upon functionality. This functionality lives in /remote/globalize/unicode-iss.
- That Unicode 1.1 will be the base character set upon which character attributes will be based.
- Areas related to pattern matching, trailing spaces, and ASCII normalization are performance-critical

3.2 Modules

For the Class-3 character set interface, there are only five basic modules areas. They can be split into logical categories of data structures, data normalization, Unicode character attribute determination, Unicode string transformations, and data naturalization (or returning data into the environment's contextualized expectations). You could actually reduce it all down to only two areas - determining character attributes, and transforming characters from one form to another. There is a special function created to replace the TO_ASCII() macro, designed to maintain optimized performance, since this function is used in LIKE clauses at run-time.

Unless otherwise noted, all entities are intended to be user-visible, at least for Sybase development staff.

The data structures are described in Section 3.4, *Shared Data Structures* below.

Each module is laid out in the following format (Based on ANSI/IEEE Std 1016-1987)

Module: "Module Identity"

This is the *name* of the module or software design entity.

TYPE

A description of the *kind* of module or entity. This may be a macro, a function, a stored procedure, or data file.

Purpose: A description of *why* the entity exists. This will provide the specific functional or performance requirements for why this entity is being created or changed, or explains it support of a parent module.

Function: A statement of *what* the entity does. What transformation is applied to the inputs to get the desired outputs. Or how the data structure or file fulfills the requirements.

Copyright ©1995, Sybase Inc. All Rights Reserved 
Printed Copy is Uncontrolled Unless Distributed with a Controlled Distribution List

Subordinates: The identification of all the entities *composing* this entity. This is a list of all the called functions, macros, or procedures needed to allow this entity to operate.

Dependencies: A description of the *relationships* of this entity with other entities. This shall identify the *uses* or *requires the presence of* relationship for an entity. For the common code this, of course, will be an incomplete list since the scope is limited to only the common shared code itself.

Interfaces: A description of how other entities *interact* with this entity. This will basically be a 'C' function prototype, with parameters and return values described.

Resources: A description of the *elements used* by the entity that are *external* to the design. This may be physical devices, operating system calls, or other libraries or software services.

Processing: A description of the *rules used* by the entity to achieve its function. This includes the algorithm used to achieve a specific task, and shall include contingencies. For this design specification, the Processing description is the same as the detailed design, and is covered in Section 4, *Low Level Design*.

Data: A description of the *data elements* internal to the entity. Shared data structures will be described in Section 3.4, *Shared Data Structures*. Data that is internal to the entity will be described at a high level, if needed, in the High Level Design, and in detail in each entity's detailed design.

Copyright ©1995, Sybase Inc. All Rights Reserved 
Printed Copy is Uncontrolled Unless Distributed with a Controlled Distribution List

3.2.1 Data Structure Access Modules

These modules are newly created and will be built to access the shared data structures and trie structures.

Module: com_GetTransform

FUNCTION

Purpose: Given either a transform ID[1] or a transform name, and a pointer to a character attributes structure[2], from which hangs a linked list of transform structures, *com_GetTransform* will return a pointer to an appropriate transform structure, or error condition otherwise.

Function: This module does not load a transform structure into memory, but expects it to have already been previously loaded and hanging off a root node of a linked list of transforms. It is the responsibility of the application library to load the structure off of a flat file or an SQL data table. The utilities chapter goes into more detail on the actual creation of a transform structure, the creation and normalization of transform binary files, and the loading of transforms into a SQL Server; the SQL Server design chapter goes into detail on the loading of transforms from the *syscharsets* system table.

This module works by walking down the given linked list of transform structures, looking for an ID match (based on the two byte integer created by combining ID (msb) and CSID (lsb).

If transName is NULL, then look for transID. If transID is NULL, then look for transName. If both are NULL, then return NULL. If both transName and transID are set, then look for transName first, then transID.

Both name and ID are included to assist an application developer whol is using a named interface for user choice of conversion options.

Subordinates: none

Dependencies: OpenClient initialization routines

SQL Server PSS initialization routines

Locale initialization routines

Interfaces:

```
(INTLTRANSFORM *) com_GetTransform ( CHAR_ATTRIB *chatr,
        BYTE * transName, int transID );
```

---

1. The transform name and transform ID are defined in the Functional Specs and are available in the linked list of character attributes structures. The design specifications for this structure are in Section 3.4.8, *Generic Transform Structure*

2. The character attributes structure, or "chatr" is described in Section 3.4.6, *The CHAR_ATTRIB Structure*

Copyright ©1995, Sybase Inc. All Rights Reserved

Printed Copy is Uncontrolled Unless Distributed with a Controlled Distribution List

```
chatr           Character Attributes Structure
transName       Transform Name
transID         Transform ID

RETURNS:
        Pointer to (static) Transform Structure
        NULL if none found

        If both transName and transID are set, will search
        first for transName, then for transID.

        No error conditions exist for this module. Either
        the transform is found or its not.
```

Resources: none

Copyright ©1995, Sybase Inc. All Rights Reserved 
Printed Copy is Uncontrolled Unless Distributed with a Controlled Distribution List

Module: com_GetChatr

FUNCTION

Purpose: Return a pointer to a requested CHAR_ATTRIB structure.

Function: Given either a character set ID or a character set name, and a pointer to a linked list of character set attributes structures, *com_GetChatr* will return a pointer to an appropriate CHAR_ATTRIB structure.

Subordinates: none

Dependencies: OpenClient locale initialization - will need to utilize the OpenClient caching mechanism to load default character set information and additional character set information using the cs_locale code.

SQL Server locale initialization - the linked list of character attribute structures will depend on the Server's caching mechanism and initialization of default character set.

The calling application is responsible to initialize and keep track of chatrRoot in the same manner as existing OpenClient and Server code initializes and keeps track of *chatr* for calls to IS_M_UPPER, etc.

Interfaces:

```
(CHAR_ATTRIB *) com_GetChatr ( CHAR_ATTRIB * chatrRoot,
        BYTE * csName, int csID );

chatrRoot        Root Character Attributes Structure
csName           Name of desired character set. If NULL,
                 then use csID.
csID             ID of desired character set. If NULL, then
                 use csName.

RETURNS:
        Pointer to requested character attributes struc-
        ture

        If csName is NULL, then look for csID. If csID is
        NULL, then look for csName.
        If both csName and csID are given, then hunts
        first for csName, then csID.

        NULL if none found or neither csNAME or csID is
        set.
```

Copyright ©1995, Sybase Inc. All Rights Reserved 
Printed Copy is Uncontrolled Unless Distributed with a Controlled Distribution List No error conditions exist for this module. Either the chatr is found or its not.

Resources: none

Copyright ©1995, Sybase Inc. All Rights Reserved

Printed Copy is Uncontrolled Unless Distributed with a Controlled Distribution List

3.2.2 Data Normalization Modules

The data normalization module is used to convert characters or strings into 2-byte UCS-2 Unicode which can then be manipulated with the Unicode Infrastructure Library API[3] function calls.

Module: com_GetUCS2

FUNCTION

Purpose: Convert a single non-Unicode character to a Unicode value

Function: Given a pointer to a character attributes structure and a pointer to a character, *com_GetUCS2*() returns a single Unicode or ISO-10646, UCS-2 character in a destination buffer. It returns the length of the source character so that *com_GetUCS2*() can be used to walk down a string of characters. If it can't convert, it returns an error.

The character attributes structure contains a pointer to a Unicode mapping table, which is used to do the conversion. If the source character is in UTF-8 format, as indicated by the character attributes structure, then a function is called to convert to UCS-2. If the character attributes structure indicates that the character set is hard-coded in the Unicode Infrastructure Library (UIL), then the UIL routines will be used instead of the Class-3 transform structures.

This function is multibyte enabled, contrary to *uniconv_unicodeFromC( )*, which is not.

*Subordinates:* *uniutf8_unicodeFromUTF8( )*

*uniconv_unicodeFromC( )*

*com_Transform*( )

Dependencies: This list will be compiled as the design progresses, but, basically, every transformation and attributes function relies on this module.

Interfaces:

```
int com_GetUCS2 ( unichar *dest, BYTE *cp, CHAR_ATTRIB
        *chatr );
```

| | |
|---|---|
| dest | pointer to a unicode character buffer |
| cp | pointer to a stream of characters in any type |
| chatr | pointer to a character attributes structure |
| RETURNS | len of source character just converted<br>-1 if conversion not possible |

3. Refer to babel:/remote/globalize/unicode-iss/docs/uilintro.txt for a description of the Unicode Infrastructure Library (UIL)

Copyright ©1995, Sybase Inc. All Rights Reserved 
Printed Copy is Uncontrolled Unless Distributed with a Controlled Distribution List

Resources: Unicode Infrastructure Library

Copyright ©1995, Sybase Inc. All Rights Reserved 
Printed Copy is Uncontrolled Unless Distributed with a Controlled Distribution List

Module: com_StrToUCS2

FUNCTION

Purpose: Converts a string of non-Unicode characters to a null-terminated Unicode string.

Function: Given a pointer to a string of characters, a destination buffer, a pointer to a character attributes structure, and a length for the string, *com_StrToUCS2* converts the string to Unicode, stopping either a) at a null terminator in the source string, b) when the length of the source string has been reached (partial characters will not be converted), c) when the length of the destination buffer is reached.

Uses the character to Unicode mapping table pointed to by the character attributes structure, or a function from the Unicode Infrastructure Library API, if the source character set is UTF-8, or is indicated as being present in the UIL based on status in the character attributes structure. Note that this function has no transliteration facilities and does not replace inconvertible characters with any fall-back characters other than the replacement character..

Subordinates: *uniutf8_unistrFromUTF8()*

*uniconv_unistrFromS( )*

From the Unicode Infrastructure Library API

Dependencies: This list will be compiled as the design progresses.

The SQL CONVERT to UCS2 is dependent on this.

Interfaces:

```
int com_StrToUCS2 ( unistring dest, int destlen, int
        *resultlen, BYTE *source, int srclen, CHAR_ATTRIB
        *chatr, BYTE **errorPoint );
```

| | |
|---|---|
| dest | pointer to a unicode character buffer |
| destlen | length of the destination buffer |
| resultlen | length, in UCS2 characters, of converted string in dest |
| source | pointer to a stream of characters of any type |
| srclen | length of the source buffer |
| chatr | pointer to a character attributes structure |
| errorPoint | points to last attempted character to convert or partial character. |
| RETURNS | len in bytes of source string just converted - 0 is a valid length<br>-1 if conversion not possible. A single partial character at the end of the source buffer is not considered an error, and is indicated by the difference between srclen and the returned length. |

Copyright ©1995, Sybase Inc. All Rights Reserved 
Printed Copy is Uncontrolled Unless Distributed with a Controlled Distribution List -2 if the destination buffer fills up. errorPoint points to the last unconverted source character.

Resources: Unicode Infrastructure Library

Copyright ©1995, Sybase Inc. All Rights Reserved 
Printed Copy is Uncontrolled Unless Distributed with a Controlled Distribution List

Module: COM_TO_LCASCII

MACRO

Purpose: Normalizes the referenced character to lower-case, single-byte ASCII. Used for keyword lookup. Replaces the TO_ASCII macro.

Function: Uses the normalization map pointed to in the character attributes structure to convert, or transform, to a single character. This is the only character-based function that uses direct mapping, primarily for performance reasons.

If the character is not, or cannot be converted to lower case ASCII, then a zero is returned. A return type of *int* is used to be compatible with ANSI-C string functions.

Subordinates: none

Dependencies: SQL Server parser, LIKE optimization, keyword lookup

Connectivity utilities for command-line parsing

*comn_to_ascii*( ) in Common Library

Interfaces:

```
int      COM_TO_LCASCII ( BYTE *cp, CHAR_ATTRIB *chatr );

cp       Pointer to the character to normalize
chatr    Pointer to a character attributes structure

RETURNS:
         lower case ASCII character if source is or has an
         equivalent
         0        If there is no equivalent ASCII character
```

Resources: none

Copyright ©1995, Sybase Inc. All Rights Reserved 
Printed Copy is Uncontrolled Unless Distributed with a Controlled Distribution List

Module: COM_STR_TO_LCASCII

MACRO

Purpose: Normalizes a string to lower case ASCII. Replaces the STR_TO_ASCII macro.

Function: Uses the normalization map pointed to in the character attributes structure to convert, or transform, a string of characters. This function uses direct mapping, primarily for performance reasons.

Characters that do not have lower-case ASCII equivalents are passed through unchanged.

The destination, or transformed string is guaranteed to be equal or shorter in length than the source string. Therefore the same pointers and length variables may be passed in for source AND destination. The result length is returned as the length of the converted string.

Subordinates: COM_TO_LCASCII

*unictfrm_ToLower( )*

Dependencies: SQL Server parser and keyword lookup routines

*comn_str_to_ascii( )* in Common Library

Interfaces:

```
int     COM_STR_TO_LCASCII ( BYTE * src, int srclen, BYTE
        *dest, int destlen, CHAR_ATTRIB *chatr )

src             Pointer to the string to convert
srclen          Length, in bytes, of the source string
dest            Pointer to a buffer to place the converted
                string in
destlen         Length of the target buffer. Must be at
                least equal to src_len
chatr           Pointer to a character attributes struc-
                ture
RETURNS
        length, in bytes, of the converted string in the
                destination buffer
        -1 illegal character found
        -2 destination buffer overflow
```

Resources: none

Copyright ©1995, Sybase Inc. All Rights Reserved 
Printed Copy is Uncontrolled Unless Distributed with a Controlled Distribution List

3.2.3 Unicode Character Attributes Modules

The Unicode character attribute checking will use the functions defined in the Unicode Infrastructure Library API for basic attributes. The Unicode Infrastructure Library API functions most applicable to OpenClient/Server and SQL Server parser and data handling needs are

3.2.3.1 Unicode Infrastructure Library API

The following are modules from the Unicode Infrastructure Library API that will be exercised most heavily. Detailed designs are not included in this specification, as they are the responsibility of the Unicode Infrastructure Library team.

| | |
|---|---|
| `unictype_IsDigit()` | Returns TRUE or FALSE depending on whether the indicated Unicode Character is a digit or not |
| `unictype_IsDecimalDigit()` | Returns TRUE or FALSE depending on whether the indicated Unicode Character is a decimal digit or not |
| `unictype_IsHexDigit()` | Returns TRUE or FALSE depending on whether the indicated Unicode Character is a hexadecimal digit or not |
| `unictype_IsLeftOfPair()` | Returns TRUE or FALSE depending on whether the indicated Unicode Character is the left half of a "directed pair" |
| `unictype_IsQuote()` | Returns TRUE or FALSE depending on whether the indicated Unicode Character is a quote character or not |
| `unictype_IsCurrency()` | Returns TRUE or FALSE depending on whether the indicated Unicode Character is a currency character or not |
| `unictype_IsSQLIDStart()` | Returns TRUE or FALSE depending on whether the indicated Unicode Character is a valid start of a T*SQL Identifier Character or not |
| `unictype_IsSQLIDPart` | Returns TRUE or FALSE depending on whether the indicated Unicode Character is a valid T*SQL identifier body character or not |
| `unictype_Span()` | Returns the length of the Unicode string pointed to that contains characters with the indicated attributes |

Copyright ©1995, Sybase Inc. All Rights Reserved 
Printed Copy is Uncontrolled Unless Distributed with a Controlled Distribution List

| | |
|---|---|
| `unictype_CSpan()` | Returns the length of the Unicode string pointed to that does not contain characters with the indicated attributes |

Please refer to the appendix at the end for full details on the Unicode Infrastructure Library API, gleaned from available header files at the time of this writing.

3.2.3.2 Class-3 Character Attribute Modules

To remain compatible with existing OpenClient and SQL Server code bases, the following modules will be modified to use the above Unicode API calls internally. The functions in this module each expect the following parameters:

- *Pointer to a Character-* Where the character is in the default character set
- *Pointer to a Character Attributes Structure*

Each function returns an integer value - either a parser lexical token in the case of *com_GetLex*, and TRUE or FALSE for the *IS_** macros. They are presented on separate pages below.

Copyright ©1995, Sybase Inc. All Rights Reserved 
Printed Copy is Uncontrolled Unless Distributed with a Controlled Distribution List

Module: com_GetLex

FUNCTION

Purpose: *com_GetLex* is used to retrieve parser-specific lexical attributes.

Function: It will take a single application-specific character, convert it to Unicode, lookup the Ctype attributes, and then convert the results to a unique token to be used by the parser switch. The valid values that are actually used by the SQL Server parser are the following.

- P_ALPHA From CHARPROP_TSQLID
- P_NUMB From CHARPROP_DECIMAL_DIGIT
- P_IGSPACE From CHARPROP_CONTROL
- P_STRNG From CHARPROP_QUOTE and checking for functional equivalent to single- or double-quote, and if not straight quotes, then CHARPROP_LEFT_OF_PAIR must also be set
- P_MONEE From CHARPROP_CURRENCY Once a valid identifier prefix has been determined in the SQL Server parser, it will then use the COM_IS_TSQLID macro to the end of the identifier.

If the character is not lexically one of the above, then the actual 32bit character property bit mask is returned for special-case processing.

This function replaces the Class-2 GET_LEX macro.

Subordinates: *com_GetUCS2( )*

*unictype_GetProperty( )*

Dependencies: Various lexical parsers - The SQL Server parslex function in particular.

*comn_get_lex( )* in Common Library

Interfaces:

```
long    com_GetLex ( BYTE *cp, CHAR_ATTRIB *chatr );
```

cp pointer to a character chatr pointer to a character attributes structure

RETURNS P_nnn lexical attribute or 32-bit character property bit mask.

-1 - conversion to Unicode not possible

Resources: Unicode Infrastructure Library

Copyright ©1995, Sybase Inc. All Rights Reserved

Printed Copy is Uncontrolled Unless Distributed with a Controlled Distribution List

Module: COM_IS_ALPHA

MACRO

Purpose: Determines if a given character is alphabetic or not.

Function: Returns TRUE or FALSE depending on whether the given character is alphabetic or not. For the purposes of SQL identifier parsing and backward compatibility, alphabetic, ideographic, and syllabic characters all cause a TRUE condition to be set. This replaces the existing IS_M_ALPHA macro, but will retain a similar calling structure to maintain portability. This is not the same as the T*SQL identifier attribute checking.

This common macro will use the Unicode Infrastructure Library unictype API internally, given a non-Unicode character. The character will first be converted to Unicode using *com_GetUCS2*, then the attribute determined using *unictype_GetProperty*() ANDed with the CHARPROP_ALPHABETIC and CHARPROP_IDEOGRAPHIC attributes.

Subordinates: *unictype_GetProperty*()

*com_GetUCS2*()

Dependencies: *comn_isalpha*() in Common Library

Interfaces:

```
int COM_IS_ALPHA( BYTE *cp, CHAR_ATTRIB *chatr );
```

cp — pointer to a character chatr — pointer to a character attributes structure

```
RETURNS TRUE     1     cp is an "alpha" character
        FALSE    0     cp is not an "alpha" character
        ERROR   -1     Error converting to Unicode
```

Resources: Unicode Infrastructure Library

Copyright ©1995, Sybase Inc. All Rights Reserved 
Printed Copy is Uncontrolled Unless Distributed with a Controlled Distribution List

Module: COM_IS_TSQLID

MACRO

Purpose: Determines if a given character is a valid T*SQL Id character or not.

Function: This function will be used to determine if a character is part of a valid T*SQL identifier and will replace occurrences of IS_M_ALPHA in the SQL Server parser as necessary. Returns TRUE or FALSE depending on whether the given character is a valid identifier character (ALPHA, IDEOGRAPHIC, plus '#', "@", and '_') or not. A single parameter is set depending if you are looking for the start of an identifier or not.

This shared macro will use the Unicode Infrastructure Library unictype API internally, given a non-Unicode character. The character will first be converted to Unicode using *com_GetUCS2*, then the attribute determined using *unictype_IsSQLIDStart( )* or *unictype_IsSQLIDPart( )*, depending on the setting of *idstart*.

Subordinates: *unictype_IsTSQLID()*

*com_GetUCS2()*

Dependencies: parslex.c in SQL Server parser code

Interfaces:

```
int COM_IS_TSQLID( BYTE *cp, CHAR_ATTRIB *chatr, int
        idstart);
```

| | |
|---|---|
| cp | pointer to a character |
| chatr | pointer to a character attributes structure |
| idstart | TRUE - looking for start of an identifeir - uses *unictype_IsSQLIDStart( )* |
| | FALSE - looking for body of an identifier - uses *unictype_IsSQLIDPart( )* |

```
RETURNS
        TRUE     1     cp is a T*SQL ID character
        FALSE    0     cp is not a T*SQL ID character
        ERROR   -1     Error converting to Unicode
```

Resources: Unicode Infrastructure Library

Copyright ©1995, Sybase Inc. All Rights Reserved 
Printed Copy is Uncontrolled Unless Distributed with a Controlled Distribution List

Module: COM_IS_DIGIT

MACRO

Purpose: Determines if a given character is a valid decimal digit or not.

Function: Returns TRUE or FALSE depending on whether the given character is a decimal digit or not. This replaces the existing IS_M_DIGIT macro, but will retain a similar calling structure to maintain portability.

This shared macro will use the Unicode Infrastructure Library unictype API internally, given a non-Unicode character. The character will first be converted to Unicode using *com_GetUCS2*, then the attribute determined using *unictype_IsDecimalDigit*().

Subordinates: *unictype_IsDecimalDigit*()

*com_GetUCS2*()

Dependencies: SQL Server parsing code

*comn_isdigit( )* in Common Library

Interfaces:

```
int COM_IS_DIGIT( BYTE *cp, CHAR_ATTRIB *chatr );
```

| | |
|---|---|
| cp | pointer to a character |
| chatr | pointer to a character attributes structure |

```
RETURNS
        TRUE     1     cp is a decimal digit
        FALSE    0     cp is not a decimal digit
        ERROR   -1     Error converting to Unicode
```

Resources: Unicode Infrastructure Library

Copyright ©1995, Sybase Inc. All Rights Reserved 
Printed Copy is Uncontrolled Unless Distributed with a Controlled Distribution List

Module: COM_IS_XDIGIT

MACRO

Purpose: Determines if a given character is a valid hexadecimal digit or not.

Function: Returns TRUE or FALSE depending on whether the given character is a hexadecimal digit or not. This replaces the existing IS_M_XDIGIT macro, but will retain a similar calling structure to maintain portability.

This shared macro will use the Unicode Infrastructure Library unictype API internally, given a non-Unicode character. The character will first be converted to Unicode using *com_GetUCS2*, then the attribute determined using *unictype_IsHexDigit*().

Subordinates: *unictype_IsHexDigit*()

*com_GetUCS2*()

Dependencies: SQL Server parsing code

*comn_isxdigit( )* in Common Library

Interfaces:

```
int COM_IS_XDIGIT( BYTE *cp, CHAR_ATTRIB *chatr );
```

| | |
|---|---|
| cp | pointer to a character |
| chatr | pointer to a character attributes structure |

RETURNS

```
TRUE     1     cp is a hexadecimal digit
FALSE    0     cp is not a hexadecimal digit
ERROR   -1     Error converting to Unicode
```

Resources: Unicode Infrastructure Library

Copyright ©1995, Sybase Inc. All Rights Reserved 
Printed Copy is Uncontrolled Unless Distributed with a Controlled Distribution List

Module: COM_IS_SPACE

MACRO

Purpose: Determines if a given character is a valid whitespace character or not.

Function: Returns TRUE or FALSE depending on whether the given character is a whitespace character or not. This replaces the existing IS_M_SPACE macro, but will retain a similar calling structure to maintain portability.

This shared macro will use the Unicode Infrastructure Library unictype API internally, given a non-Unicode character. The character will first be converted to Unicode using *com_GetUCS2*, then the attribute determined using *unictype_IsWhiteSpace*().

Subordinates: *unictype_IsWhiteSpace*()

*com_GetUCS2*()

Dependencies: SQL Server parsing code

*comn_isspace( )* in Common Library

Interfaces:

```
int COM_IS_SPACE( BYTE *cp, CHAR_ATTRIB *chatr );
```

| | |
|---|---|
| cp | pointer to a character |
| chatr | pointer to a character attributes structure |

```
RETURNS
        TRUE     1     cp is a whitespace character
        FALSE    0     cp is not a whitespace character
        ERROR   -1     Error converting to Unicode
```

Resources: Unicode Infrastructure Library

Copyright ©1995, Sybase Inc. All Rights Reserved

Printed Copy is Uncontrolled Unless Distributed with a Controlled Distribution List

Module: COM_IS_PUNCT

MACRO

Purpose: Determines if a given character is a valid punctuation character or not.

Function: Returns TRUE or FALSE depending on whether the given character is a punctuation character or not. This replaces the existing IS_M_PUNCT macro, but will retain a similar calling structure to maintain portability.

This shared macro will use the Unicode Infrastructure Library unictype API internally, given a non-Unicode character. The character will first be converted to Unicode using *com_GetUCS2*, then the attribute determined using *unictype_IsPunctuation*().

Subordinates: *unictype_IsPunctuation*()

*com_GetUCS2*()

Dependencies: *comn_ispunct*() in Common Library, which is not currently used anywhere that I could find.

Interfaces:

```
int COM_IS_PUNCT( BYTE *cp, CHAR_ATTRIB *chatr );
```

| | |
|---|---|
| cp | pointer to a character |
| chatr | pointer to a character attributes structure |

```
RETURNS
        TRUE     1     cp is a punctuation character
        FALSE    0     cp is not a punctuation character
        ERROR   -1     Error converting to Unicode
```

Resources: Unicode Infrastructure Library

3.2.3.3 Modules Removed

The following modules or macros are being removed due to being replaced by the above Class-3 modules, or due to non-use in the rest of the code-base.

- All IS_M_* and IS* macros in <intl_nls.h>, except ISPRINT( )
- GET_LEX( ) in <intl_nls.h>

Copyright ©1995, Sybase Inc. All Rights Reserved 
Printed Copy is Uncontrolled Unless Distributed with a Controlled Distribution List

3.2.4 String Transformation Modules

The string transformation functions use the generic transformation trie to convert a character from one form to another, For instance from lower case to upper case, or hiragana to katakana.

Module: com_Transform

FUNCTION

Purpose: Generic transformation of a character to another character string of one or more characters. Used to convert characters to upper case, lower case, and to other character sets in a simplistic fashion. It is nowhere near as robust as the OpenClient codeset conversion engine in that it does not provide any intelligent fall-backs for rudimentary user-friendly conversions. Allows locale-sensitive character transformations by using loadable transform tables as documented in the *Unicode Character Set and Locales Features* functional specifications (Doc ID: GPGENG-SCG-Unicode-FS-x.x).

Function: The generic transformation takes as its parameters, a pointer to the character, a pointer to a receiving buffer, the length of the buffer, a pointer to a character attributes structure, and the ID of the desired transform[4]. It places the transformed character in the receiving buffer and returns either the length of the transformed character in the chosen character set if all goes well or an error otherwise. If the character set of the source character and the character set of the transformed character are the same, and no transform exists, then the original source character is returned. If the charsets are different and no transform exists, then an error is raised.

Subordinates: *com_GetUCS2( )*

*uniconv_unicodeFromC( )*

*com_Transform( )* - recursively called

*unictfrm_XXX( )* - as needed, if indicated in the transform structure

*uniutf8_unicodeToUTF8( )* - if pointed to by the transform

*uniutf8_unicodeFromUTF8( )* - if pointed to by the transform

Dependencies: All the COM_TO_* macros

Interfaces:

```
int com_Transform( BYTE *dest, int destlen, int
        *resultlen, BYTE *src, int srclen, CHAR_ATTRIB
        *chatr, int transformID );
dest            pointer to the destination buffer
destlen         length of the destination buffer
```

4. See Section 3.4.8, *Generic Transform Structure* for more information about the structure.

Copyright ©1995, Sybase Inc. All Rights Reserved 
Printed Copy is Uncontrolled Unless Distributed with a Controlled Distribution List

| | |
|---|---|
| resultlen | length of converted string placed in dest |
| src | pointer to the source character |
| srclen | length of the source string. Will end transforms at a null character |
| chatr | character sets attribute structure for src |
| transformID | ID of the transformation to use based on the transform and characterset ID as specified in Section 3.4.8.3, *cstf_id* |

RETURNS length of source string successfully converted, in bytes error conditions are:

- -1 no transformation possible (only seen if used to convert from one charset to another)
- -2 no room in the destination buffer to do the transformation
- -3 no transform available with the indicated character set and transform IDs

Resources: Unicode Infrastructure Library

Copyright ©1995, Sybase Inc. All Rights Reserved 
Printed Copy is Uncontrolled Unless Distributed with a Controlled Distribution List

Module: COM_TO_UPPER

MACRO

Purpose: Transforms the indicated character to upper-case in the default character set.

Function: Takes a character, converts it to Unicode, does a generic, locale-sensitive transformation based on the default upper case map pointed to in the character attributes structure. Only does 1-to-1 transformation if the character attributes structure indicates that changing width is not allowed (I.e, ess-zet 'ß' won't be converted to "SS").

Subordinates: *com_GetUCS2( )*

*com_CharFromUCS2( )*

*unictfrm_ToUpper( )*

Dependencies: SQL Server upper( ) function

*comn_toupper( )* in Common Library

Interfaces:

```
int      COM_TO_UPPER( void *dest, int destlen, void *src,
         int srclen, CHAR_ATTRIB *chatr, int localeID );

dest     destination buffer to put results in
destlen  length, in bytes, of the destination buffer
src      pointer to the character to convert
srclen   length, in bytes, of the source string
chatr    character attributes structure
localeID- The locale to use for the transform. If set, use
         a type 4003 casemap. Otherwise, use the default
         from unictfrm_ToUpper( ), after first converting to
         Unicode

RETURNS
         length, in bytes, of the converted character in
         the destination buffer
         -1 if can't convert source character to Unicode
         -2 no room in the destination buffer
         -3 if transformed character not in the target
            character set
```

Resources: Unicode Infrastructure Library

Copyright ©1995, Sybase Inc. All Rights Reserved 
Printed Copy is Uncontrolled Unless Distributed with a Controlled Distribution List

Module: COM_STR_TO_UPPER

MACRO

Purpose: Transforms the indicated character string to upper-case in the default character set.

Function: Takes a character string, converts it to Unicode, does a generic, locale-sensitive transformation based on the upper case map pointed to in the character attributes structure and the localeID. Does only 1-to-1 transformation if the character attributes structure indicates that changing width is not allowed (I.e. ess-zet 'ß' won't be converted to "SS") .

Subordinates: *com_GetUCS2( )*

*com_CharFromUCS2( )*

*unictfrm_StrToUpper( )*

Dependencies: SQL Server upper( ) function

Interfaces:

```
int     COM_STR_TO_UPPER( void *dest, int destlen, int
        *resultlen, void *src, int srclen, CHAR_ATTRIB
        *chatr, int localeID );

dest        destination buffer to put results in
destlen     length, in bytes, of the destination buffer
resultlen   length of converted string in dest
src         pointer to the character string to convert
srclen      length of the source string
chatr       character attributes structure
localeID    The locale to use for the transform. If set,
            use a type 4003 casemap. Otherwise, use the de-
            fault from unictfrm_StrToUpper( ), after first con-
            verting to Unicode.

RETURNS
        length, in bytes, of the src string converted
        -1 if can't convert source character to Unicode
        -2 no room in the destination buffer
        -3 if transformed character not in the target
           character set
```

Resources: Unicode Infrastructure Library

Copyright ©1995, Sybase Inc. All Rights Reserved 
Printed Copy is Uncontrolled Unless Distributed with a Controlled Distribution List

Module: COM_TO_LOWER

MACRO

Purpose: Transforms the indicated character to lower-case in the default character set.

Function: Takes a character, converts it to Unicode, does a generic, locale-sensitive transformation based on the default lower case map pointed to in the character attributes structure. Only does 1-to-1 transformation if the character attributes structure indicates that changing width is not allowed (I.e, UTF-8 <I-dot> (2 bytes) won't be converted to <i-dot> (1 byte) in Turkish.). Many-to-one is not supported.

Subordinates: *com_GetUCS2( )*

*com_CharFromUCS2( )*

*unictfrm_ToLower( )*

Dependencies: SQL Server lower( ) function

*comn_tolower( )* in Common Library

Interfaces:

```
int      COM_TO_LOWER( void *dest, int destlen, void *cp,
         CHAR_ATTRIB *chatr, int localeID );

dest     destination buffer to put results in
destlen  length, in bytes, of the destination buffer
cp       pointer to the character to convert
chatr    character attributes structure
localeID- The locale to use for the transform. If set, use
         a type 4003 casemap. Otherwise, use the default
         from unictfrm_ToLower( ), after first converting to
         Unicode

RETURNS
         length, in bytes, of the converted character in
         the destination buffer
         -1 if can't convert source character to Unicode
         -2 no room in the destination buffer
         -3 if transformed character not in the target
            character set
```

Resources: Unicode Infrastructure Library

Copyright ©1995, Sybase Inc. All Rights Reserved

Printed Copy is Uncontrolled Unless Distributed with a Controlled Distribution List

Module: COM_STR_TO_LOWER

MACRO

Purpose: Transforms the indicated character string to lower-case in the default character set.

Function: Takes a character string, converts it to Unicode, does a generic, locale-sensitive transformation based on the lower case map pointed to in the character attributes structure and the localeID. Does only 1-to-1 transformation if the character attributes structure indicates that changing width is not allowed.

Subordinates: *com_GetUCS2( )*

*com_CharFromUCS2( )*

*unictfrm_StrToLower( )*

Dependencies: SQL Server lower( ) function

Interfaces:

```
int     COM_STR_TO_LOWER( void *dest, int destlen, int
        *resultlen, void *src, int srclen, CHAR_ATTRIB
        *chatr, int localeID );

dest        destination buffer to put results in
destlen     length, in bytes, of the destination buffer
resultlen   length of converted string in dest
src         pointer to the character string to convert
srclen      length of the source string
chatr       character attributes structure
localeID    The locale to use for the transform. If set,
            use a type 4003 casemap. Otherwise, use the de-
            fault from unictfrm_StrToLower( ), after first con-
            verting to Unicode.

RETURNS
        length, in bytes, of the src string converted
        -1 if can't convert source character to Unicode
        -2 no room in the destination buffer
        -3 if transformed character not in the target
           character set
```

Resources: Unicode Infrastructure Library

Copyright ©1995, Sybase Inc. All Rights Reserved 
Printed Copy is Uncontrolled Unless Distributed with a Controlled Distribution List

Module: COM_IS_UPPER

MACRO

Purpose: Indicates if the character pointed to is upper case or not.

Function: This is in the transformations module because the character is first attempted to be transformed to lower case, and if the result is different from the initial value, then the initial value was upper case. There is no dependency on locale.

Characters that inherently have no case (e.g., ideographic, syllabic, or arabic characters, etc.) will return FALSE.

Subordinates: *com_GetUCS2( )*

*unictfrm_ToUpper( )*

Dependencies: *com_isupper( )* in comnlib

Interfaces:

```
int      COM_IS_UPPER( void *cp, CHAR_ATTRIB chatr );

cp       Pointer to the character to check
chatr    Pointer to a character attributes structure

RETURNS
         TRUE    1      The source character is UPPER case
         FALSE   0      The source character is not upper
                        case
         ERROR   -1     Cannot convert cp to Unicode
```

Resources: Unicode Infrastructure Library

Copyright ©1995, Sybase Inc. All Rights Reserved 
Printed Copy is Uncontrolled Unless Distributed with a Controlled Distribution List

Module: COM_IS_LOWER

MACRO

Purpose: Indicates if the character pointed to is lower case or not.

Function: This is in the transformations module because the character is first attempted to be transformed to upper case, and if the result is different from the initial value, then the initial value was lower case. There is no dependency on locale.

Characters that inherently have no case (e.g., ideographic, syllabic, or arabic characters, etc.) will return FALSE.

Subordinates: *com_GetUCS2( )*

*unictfrm_ToLower( )*

Dependencies: *com_islower( )* in comnlib

Interfaces:

```
int     COM_IS_LOWER( void *cp, CHAR_ATTRIB chatr );

cp      Pointer to the character to check
chatr   Pointer to a character attributes structure

RETURNS
        TRUE     1     The source character is lower case
        FALSE    0     The source character is not LOWER
                       case
        ERROR   -1     Cannot convert cp to Unicode
```

Resources: Unicode Infrastructure Library

Copyright ©1995, Sybase Inc. All Rights Reserved 
Printed Copy is Uncontrolled Unless Distributed with a Controlled Distribution List

Module: com_CharToUTF8

FUNCTION

Purpose: Converts a character in the default character set, as indicated by the character attributes structure, and converts it to UTF8 format.

Function: Given the character attributes structure, uses the reverse UCS-2 mapping and UCS2 to UTF8 algorithm to convert the character to UTF8. Returns length of UTF8 value if O.K., negative values if an error occurred.

Is this a redundant replacement for the the cs_convert functions? I don't think so - cs_convert has intelligent fallbacks, where this one doesn't. But is this faster? Or should I just use the UIL code (ch to UCS2 to UTF8)?

Subordinates: *com_GetUCS2( )*

*uniutf8_unicodeToUTF8( )*

*uniconv_unicodeFromC( )*

*uniconv_unicodeToC( )*

Dependencies: T*SQL CONVERT functionality

Interfaces:

```
int com_CharToUTF8( UChar8 *dest, int destlen, BYTE *cp,
        CHAR_ATTRIB *chatr);
dest    pointer to the destination buffer
destlen length of the destination buffer, in bytes
cp      pointer to the source character
chatr   character sets attribute structure for cp

RETURNS
                length of transformed character,in bytes,
                in dest
        error conditions are:
                -1 no transformation possible
                -2 no room in the destination buffer to do
                   the transformation
```

Resources: Unicode Infrastructure Library

Copyright ©1995, Sybase Inc. All Rights Reserved 
Printed Copy is Uncontrolled Unless Distributed with a Controlled Distribution List

Module: com_StrToUTF8

FUNCTION

Purpose: Converts a string of characters in the default character set, as indicated by the character attributes structure, and converts them to UTF8 format.

Function: Given the character attributes structure, uses the reverse UCS-2 mapping and UCS2 to UTF8 algorithm to convert the character string to UTF8. Returns length of UTF8 string if O.K., negative values if an error occurred.

Subordinates: *com_StrToUCS2( )*

*uniutf8_unistrToUTF8( )*

Dependencies: T*SQL CONVERT functionality

Is this a redundant replacement for the the cs_convert functions? I don't think so - cs_convert has intelligent fallbacks, where this one doesn't. But is this faster? Or should I just use the UIL code (str to unistr to UTF8)?

Interfaces:

```
int com_StrToUTF8( UChar8 *dest, int destlen, int
        *resultlen, BYTE *src, int srclen, CHAR_ATTRIB
        *chatr);
dest         pointer to the destination buffer
destlen      length of the destination buffer, in bytes
resultlen    length, in bytes, of the resulting string in
             dest
src          pointer to the source character string
srclen       length of the source character string, in
             bytes
chatr        character sets attribute structure for cp
RETURNS
        length of string converted from src, in bytes.
error conditions are:
        -1 no transformation possible
        -2 no room in the destination buffer to do the
           transformation
```

Resources: Unicode Infrastructure Library

Copyright ©1995, Sybase Inc. All Rights Reserved 
Printed Copy is Uncontrolled Unless Distributed with a Controlled Distribution List

Module: com_ToSound

FUNCTION

Purpose: Retrieves Soundex Value for a character.

Function: Converts a character in the default character set to either an upper case letter in the range from A-Z, an ASCII digit in the range 0-9, or null, depending on whether the character is the first alphabetic character, a following alphabetic character, or a character with no valid soundex value to it. Uses locale-specific mapping tables, if available.

Subordinates: *com_Transform( )*

Dependencies: T*SQL SOUNDEX

Interfaces:

```
BYTE      com_ToSound(void *cp, CHAR_ATTRIB *chatr, int ini-
          tial, int localeID );

cp        pointer to the character to convert. Incremented
          to point to the next character.
chatr     character attributes structure
initial   if set (not zero), indicates that this is the
          first character in a Soundex string
localeID- The locale to use for the transform. If set, use
          a type 5003 soundex map. Otherwise, use the de-
          fault from the character attributes structure.

RETURNS
          If initial is set, returns an Upper Case roman
          character in the range A-Z.
          If initial is not set, then returns an ASCII digit
          in the range 0-9 (hexadecimal 0x30-0x39).
          If no valid SOUNDEX value is found, it returns
          zero (0x00), whether initial is set or not.
How do I do Soundex of Strings? com StrToSound? I.e., Jap-
          anese kana can be stored in string values of mul-
          tiple U+Chars.
```

Resources: Unicode Infrastructure Library

Copyright ©1995, Sybase Inc. All Rights Reserved

Printed Copy is Uncontrolled Unless Distributed with a Controlled Distribution List

Module: com_GetRightOfPair

FUNCTION

Purpose: Given an opening (LeftOfPair) character, returns a match list of possible UCS-2 values for proper closing (RightOfPair) characters.

Function: Given a pointer to a Unicode UCS2 character, find a matching closing character of a character pair, if one exists. May return more than one, in prioritized order based on Programming Language Syntax, Common SmartQuotes, Cultural Exceptions.

This is in the character transformations category because it *transforms* an opening, or left-of-pair character to a closing, or right-of-pair character.

Subordinates: *unictype_IsLeftOfPair( )*

*unictype_IsPaired( )*

*unictype_IsQuote( )*

Dependencies: T*SQL parser for P_STRNG case

Interfaces:

```
int      com_GetRightOfPair ( unichar source, unistring
         *dest, int destlen, CHAR_ATTRIB chatr );

source   Unicode UCS2 character to find match for
dest     Location to put results
destlen  Length of destination buffer, in unichars
chatr    character attributes structure

RETURNS
         length of match list, in unichars
          0 no matches found (source is not a valid Left-
            Of-Pair)
         -2 Buffer overflow
```

Resources: Unicode Infrastructure Library

Copyright ©1995, Sybase Inc. All Rights Reserved 
Printed Copy is Uncontrolled Unless Distributed with a Controlled Distribution List

3.2.5 Data Naturalization Modules

The Data Naturalization Modules are used to convert data in various formats back to the system defaults.

Module: com_UCS2ToChar

FUNCTION

Purpose: Converts a single UCS-2 character to one or more characters in the default character set.

Function: Given a pointer to a UCS2 Unicode character and a character attributes structure, transform the UCS-2 character into one *or more* characters in the character set indicated by the character attributes structure.

Subordinates: none

Dependencies: T*SQL CONVERT

Interfaces:

```
int      com_UCS2ToChar( BYTE *dest, int destlen, unichar
         source, CHAR_ATTRIB, chatr );

dest     pointer to the destination character buffer
destlen  length of the destination buffer, in bytes
source   the UCS2 Unicode character to convert
chatr    character attributes structure

RETURNS:
         length of the converted character in dest, in
         bytes
         -1 cannot be converted (E.g., Chinese to cp850)
         -2 destination buffer overflow
```

Resources: none

Copyright ©1995, Sybase Inc. All Rights Reserved 
Printed Copy is Uncontrolled Unless Distributed with a Controlled Distribution List

Module: com_UnistrToChar

FUNCTION

Purpose: Converts a UCS-2 string to a character string in the default character set.

Function: Given a pointer to a UCS2 Unicode character string and a character attributes structure, transform the UCS-2 string into characters in the character set indicated by the character attributes structure.

Subordinates: none

Dependencies: T*SQL CONVERT

Interfaces:

```
int      com_UCS2ToChar( BYTE *dest, int destlen, unistring
         src, int srclen, CHAR_ATTRIB, chatr, unistring
         **errorPoint );

dest        pointer to the destination character buffer
destlen     length of the destination buffer, in bytes
resultlen   length of the converted string in dest
src         the UCS2 Unicode character to convert
srclen      length of the Unicode string, in
chatr       character attributes structure
errorPoint  points to the last attempted Unichar

RETURNS:
         length of string converted from src
error conditions are:
         -1 a character cannot be converted (E.g., Chinese
            to cp850). Character replaced with question
            mark '?'.
         -2 destination buffer overflow, errorPoint points
            to last Unichar conversion attempted before
            overflow.
         -4 one or characters could not be converted AND
            buffer overflow. Allows for higher-level error
            handling.
```

Note: use OpenClient conversions if robust codeset conversion is desired. I.e., fuzzy matches and "best-guessing" for user-friendly interfaces (but loss of data integrity).

Resources: none

Copyright ©1995, Sybase Inc. All Rights Reserved 
Printed Copy is Uncontrolled Unless Distributed with a Controlled Distribution List

3.2.6 Character Width Modules

The current character width macros will not change in any way. These macros are:

```
INC_CHAR
DISP_WIDTH
DATA_WIDTH
WHOLE_CHARS
```

3.3 Feature Flow

As these are building blocks for larger applications, the feature flow shown here is at a very rudimentary level. There are only two basic processes: determining an attribute, or doing a transformation.

For determining an attribute, the source character is first transformed to Unicode, if it is not already in that format, then the attribute is looked up from a Unicode-indexed table.

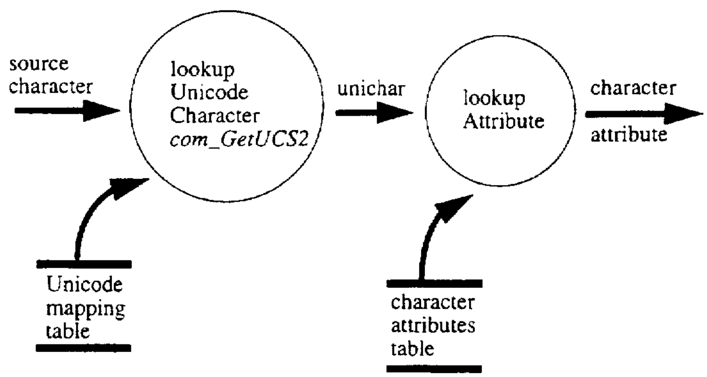

This is true for all character attributes modules except *COM_IS_UPPER* and *COM_IS_LOWER* which first check to see if a transform to the opposite case returns a value different from the source character; *COM_TO_LCASCII*, *INTL_STR_TO_LCASCII* which skip the Unicode intermediate step for performance reasons; and *DISP_WIDTH*, and *DATA_WIDTH* which use the raw source character as is to do a table lookup.

Copyright ©1995, Sybase Inc. All Rights Reserved 
Printed Copy is Uncontrolled Unless Distributed with a Controlled Distribution List For doing transforms, the process is almost exactly the same, with possibly one additional step to convert back to the source character set.
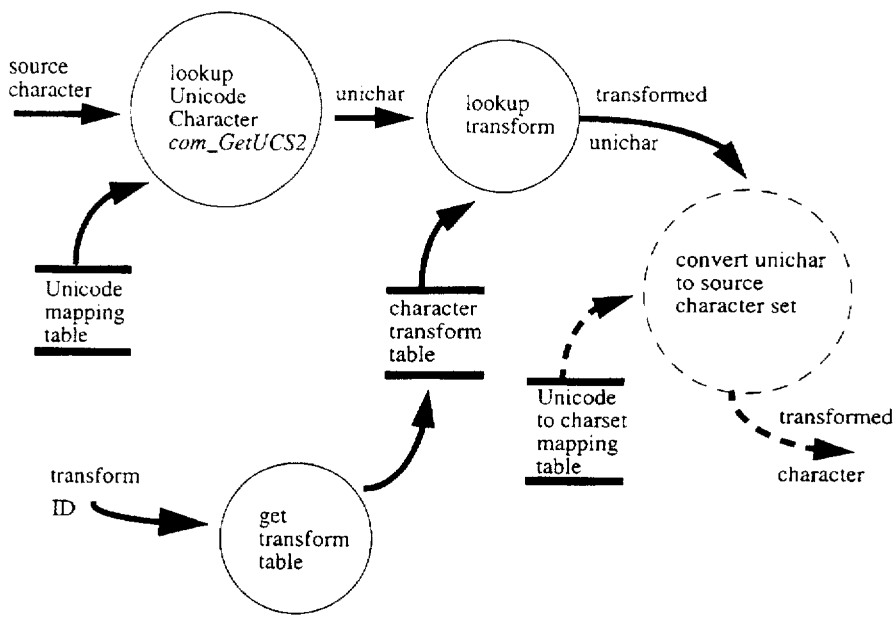
 Copyright ©1995, Sybase Inc. All Rights Reserved 
Printed Copy is Uncontrolled Unless Distributed with a Controlled Distribution List

3.4 Shared Data Structures

This section describes the data structures that are used as the common backbone for all the above modules.

3.4.1 Character Properties

The aspect of character attributes will be expanded significantly with the Unicode SQL Server to allow for the use of a generalized approach that is applicable in the OpenClient, as well as GUI-based applications. This allows us to use one technology with a minimum amount of maintenance and education needed. All aspects of the previous character type and lexical attributes will be retained, with the added attributes to allow for future expansion with multilingual textually aware applications.

The primary change for the ctype (Character Type) information, from an external point of view, is that individual character properties can be specified for three and four byte quantities.

The most apparent external change is that character properties can be specified in an external definition file. See Section 3.3.2, *Character Set Definition Files*, for more information on the installation of the character type definition file.

As in previous releases, character attributes can be defined, but they are done so in the context of Unicode. In a future, post-System 11 release, a Unicode definition file will be provided, so that the default set of properties can be tinkered with, but this is not recommended unless absolutely necessary to support a certain set of proprietary characters not in the Unicode Standard.

The following description is based on work done by Ken Whistler for a unified Unicode handling scheme. It has been edited by myself to reflect discussions we have had, and the SQL Server's need to work on a generic character set. Please excuse this level of detail in a Functional Specification, but these properties need to be known by developers, testers, and, to some degree, technical writers, to have a full understanding of the issues involved.

Character properties will be defined as bit values in an unsigned long (32-bit) integer. The entire set of properties associated with any particular Unicode character can then be stored efficiently as an unsigned long in a table.

Some properties (e.g. ideographic) can be calculated via range tests rather than by storing separate values for the properties of all of the ideographs defined in Unicode.

The table of Unicode character properties will be sparse, to reflect the actual structure of Unicode character space. The actual implementation of a sparse table of properties will be hidden behind the interface.

Note that one important characteristic of some scripts which has generally been treated as a character property, namely *case*, is not coded here as a character property. Instead, case- Copyright ©1995, Sybase Inc. All Rights Reserved 
Printed Copy is Uncontrolled Unless Distributed with a Controlled Distribution List mapping and case-folding is treated as one of a general set of mapping transforms required for handling a large character set. Among these transforms are:

- Uppercase <--> lowercase[Latin, Cyrillic, Greek scripts]
- Original form --> normalized ASCII equivalent
- Character Sequence -> Soundex value
- Katakana <--> Hiragana <--> Romaji [Japanese writing system]
- Hankaku <--> Zenkaku [Japanese writing system]
- Composed <--> composite sequence [Latin & other scripts]
- Composite with accent --> baseform [Latin, etc. for normalization]
- Hangul <--> Jamo sequence [Korean script]
- Numeric character <--> numeric value [Numerous scripts]
- Horizontal form <--> vertical form [Japanese & Chinese]
- Compatibility form --> preferred Unicode character This release of the SQL Server will only offer the first three, but the transform mechanism will be generalized to allow addition of others, or to allow customized transforms in the future. The normalization to ASCII is a subset of the Compatibility --> preferred Unicode character.

Character properties per se focus on those attributes of characters which are useful in parsing text to find units and boundaries (e.g. for lexical parsing, or for line breaking and layout).

While case folding and accent removal are also implicated in text parsers for "normalizing" text, they must be handled via a separate mechanism from pure character properties, because they may have language-specific special cases.

The bit usage for the character property definition can be found in the design specifications.

3.4.1.1 Exclusive Partitioning Properties

The character space is divided into two exclusive major types: *controls* (with no visible glyph associated) and *alphasymbolics* (including punctuation, with some visible glyph associated). Because controls and alphasymbolics tend to have exclusive properties, this allows overloading part of the bit usage of the character property, so that more than 32 properties can be stored efficiently in one 32-bit space. In addition, to allow the character table to be efficiently compressed, an exclusive property of *pointer* is allocated as well.

Copyright ©1995, Sybase Inc. All Rights Reserved 
Printed Copy is Uncontrolled Unless Distributed with a Controlled Distribution List Based on a 32-bit model, the exclusive properties are diagrammatically represented according to the following diagram.:

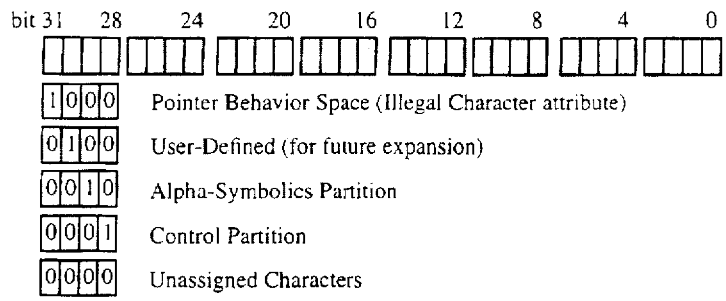

The exclusive property spaces are explained as follows

- Unassigned
  unassigned, but legal values, e.g. U+093A
  illegal values, e.g. U+FFFF, U+FFFE
- Control
  ISO controls proper, e.g. U+001B (ESC)
  Unicode sentinels, e.g. U+FEFF
  Unicode substitute, i.e. U+FFFD
  Formatter characters, e.g. U+200D (ZWJ), U+200E (L-R Mark)
  Block separators, e.g. U+2028 (Line Separator)
  White space characters, e.g. various spaces
  Zero-width space characters.
  All controls except Line-Feed are considered to be ignored white space as far as the SQL Server parser is concerned.
- Alphasymbolic
  Letters and digits
  Various syllabics, include Hangul syllables
  Han ideographs
  Punctuation
  Other symbols of all types
  Transact SQL "special" characters allowed in identifiers
- Pointer Behavior Space
  This is an indicator that the character attribute element has not character property attributes at all, but rather is an indication that this element is to be used as a pointer to another block of attributes. Used for compression schemes.
- User-Defined
  This is an indication that the character is in the user-defined space.

Copyright ©1995, Sybase Inc. All Rights Reserved 
Printed Copy is Uncontrolled Unless Distributed with a Controlled Distribution List

3.4.1.2 Bidirectional Properties

The bidi properties are treated as an independent multi-value exclusive partitioning of the entire Unicode space. These 4 bits are not given individual significance, but instead are used to define an enumerated set of up to 16 classes relevant to the bidirectional text handling algorithm.

The Bidirectional properties can affect either control or alphasymbolics, and therefore are treated as generic properties. The SQL Server does not need to handle bidirectional properties, but they are included here for generality and completeness, and to allow their attributes to be made available to OpenClient applications.

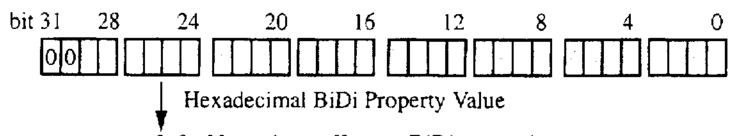

0x0 - Neutral: no affect on BiDi properties
0x1 - Strong Left to Right
0x2 - Strong Right to Left
0x3 - European Digit, weak directionality
0x4 - European Numeric Separator, weak left to right
0x5 - European Numeric Terminator, weak left to right
0x6 - Arabic Number, weak right to left
0x7 - Common Number Separator, weak type
0x8 - Block Separator, neutral, weak type
0x9 - Segment Separator, neutral
0xA - Bi-Directional Whitespace: Neutral whitespace
0xB to 0xF - Unassigned Bidirectional text-handling properties, an explanation.

The Unicode bidi algorithm divides all Unicode characters into one of a group of directional classes. These include strongly directional characters (left-to-right or right-to-left), weakly directional characters (i.e. numerals and format characters associated with numerals), and neutrals (which inherit their direction algorithmically from their neighbors).

The bidi algorithm introduces some very specific character properties not otherwise needed, and certainly not needed by the SQL Server, which only operates on the serially encoded backing store. Also, since it depends on a complete partitioning of characters by type, there are some instances where a bidi-related property is not semantically identical to general usage. For example, the Unicode line separator has the bidi class of *block separator* rather than *white space*, even though line separators in general contexts have a *white space* property. Because of this, and because the bidi properties must completely partition Unicode encoding space among themselves, they are represented by an enumerated value (0..15) encoded in 4 bits in the Character Properties Table. The properties are explained as follows:

Copyright ©1995, Sybase Inc. All Rights Reserved 
Printed Copy is Uncontrolled Unless Distributed with a Controlled Distribution List

- Strong Direction Left-to-right
  Used in the bidi algorithm: A property of the letters of most scripts, plus U+200E.
- Strong Direction Right-to-left
  Used in the bidi algorithm: A property of Arabic and Hebrew letters, plus U+200F.
- European Number Digit
  Used in the bidi algorithm: Weakly left-to-right directional digits (European digits U+0030 - U+0039, Eastern Arabic digits U+06F0 - U+06F9, plus superscript and subscript digits)
- European Number Separator
  Used in the bidi algorithm; includes U+2007 FIGURE SPACE, and U+00A0 NON-BREAKING SPACE, which are used in some European number formats, as well as U+002E PERIOD and U+002F SLASH.
- European Number Terminator
  Used in the bidi algorithm: Punctuation or currency symbols which can be a terminal element in a formatted European number.
- Arabic Number
  Used in the bidi algorithm: Weakly right-to-left directional Arabic-based digits (U+0660 - U+0669) plus Arabic script-based decimal and thousands separators (U+066B, U+066C)
- Common Separator
  Used in the bidi algorithm: Separators used in common in either Arabic- or European-formatted numbers. U+002C COMMA and U+003A COLON.
- Block Separator
  Used in the bidi algorithm; includes U+2028 LINE SEPARATOR, U+2029 PARAGRAPH SEPARATOR, as well as U+000D CARRIAGE RETURN and U+000A LINE FEED, which have generally served the same functions. Delimits a directional text span. Could also be applied to the tape-oriented segment controls, i.e. U+001C FILE SEPARATOR, U+001D GROUP SEPARATOR, and U+001E RECORD SEPARATOR.
- Segment Separator
  Used in the bidi algorithm; U+0009 TAB. Could also be applied to the tape-oriented segment controls, i.e. U+001F UNIT SEPARATOR.
- Bidi White Space
  Used in the bidi algorithm. Includes various spaces, but not the block or segment separators.
- Neutral
  All other characters, punctuation and symbols. Has no affect on directionality and takes on the direction of it context. Used in the BiDi algorithm.

Copyright ©1995, Sybase Inc. All Rights Reserved 
Printed Copy is Uncontrolled Unless Distributed with a Controlled Distribution List

3.4.1.3 Generic Properties

The generic properties apply to both controls and to alphasymbolics. These bits are used for the *non-break* and *delimiter* properties.

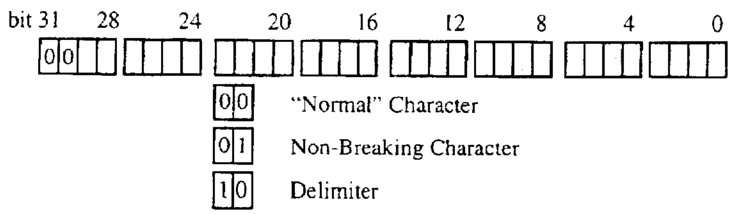

Generic properties, explained

These property bits are not overloaded, so bitwise operations involving characters from both the controls partition and the alphasymbolic partition are valid.

- Normal
  This indicates that the character is neither a non-breaking character or a delimiter.
- Non-Break
  Blocks line-breaking; a property of U+00A0 NO-BREAK SPACE, of U+2011 NON-BREAKING HYPHEN, and of U+FEFF ZERO WIDTH NO-BREAK SPACE
- Delimiter
  Separators, white-space and various punctuation. These generally mark the edges of textual units.

3.4.2 Class-3 Specific Character Properties

The specific properties apply to either controls or to alphasymbolics but not to both. Pointer values have no character properties associated with them, but instead, reside in a different behavior space. The values defined for these properties below set the appropriate exclusive partitioning property bit, as well as the specific property bit. Examples include *white-space* as a controls property or *hex digit* as an alphasymbolic property.

Copyright ©1995, Sybase Inc. All Rights Reserved 
Printed Copy is Uncontrolled Unless Distributed with a Controlled Distribution List

3.4.2.1 Specific Properties of Class-3 Controls

The controls are primarily whitespace, control characters, and other non-printing characters.

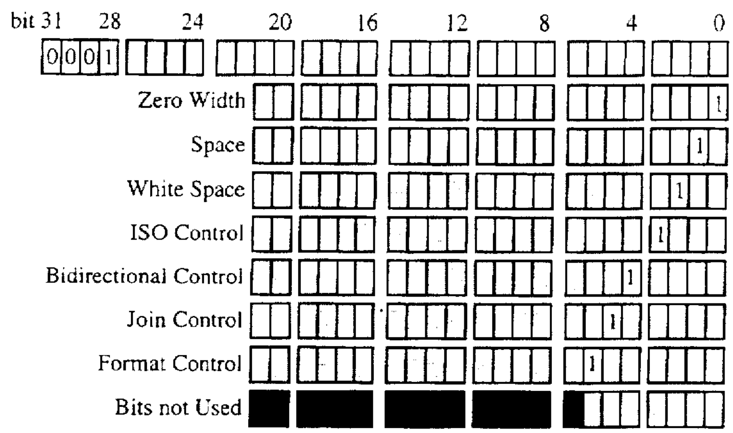

- Zero-Width
  Specific property of a number of spaces and other Unicode controls (ZWJ, ZWNJ, etc.)
- Space
  Space characters, zero-width, unspecified width, or with specified widths
- White-Space
  Spaces, but also other characters traditionally given this property, i.e. TAB, CR, LF, etc.
- ISO Control
  16-bit analogues of the ISO 8-bit control codes: U+0000 - U+001F, U+007F - U+009F
- BiDi Control
  Unicode-specific bidi control codes: U+200E LEFT-TO-RIGHT MARK, U+200F RIGHT-TO-LEFT MARK, U+202A LEFT-TO-RIGHT EMBEDDING, etc.
- Join Control
  Unicode-specific joining control codes: U+200C ZERO WIDTH NON-JOINER, U+200D ZERO WIDTH JOINER.
- Format Control
  Unicode-specific (and generally denigrated) formatting control codes: U+206A INHIBIT SYMMETRIC SWAPPING, U+206C INHIBIT ARABIC FORM SHAPING, etc.

Copyright ©1995, Sybase Inc. All Rights Reserved 
Printed Copy is Uncontrolled Unless Distributed with a Controlled Distribution List

3.4.2.2 Specific Properties of Class-3 Alphasymbolics

Alphasymbolics encompass all printable characters.

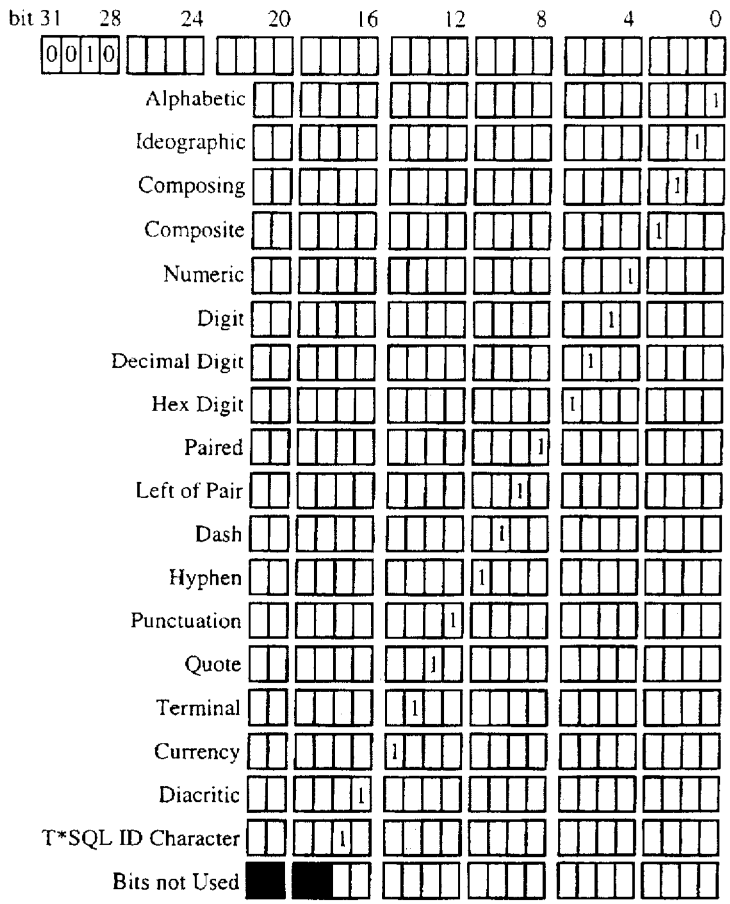

- Alphabetic
  Most letters and syllabic elements of normal scripts.
- Ideographic
  Characters in the Unified Han Character Set (for Chinese, Japanese, Korean, and Vietnamese).

Copyright ©1995, Sybase Inc. All Rights Reserved 
Printed Copy is Uncontrolled Unless Distributed with a Controlled Distribution List

- Composing
  Non-spacing marks which can be combined with a preceding baseform to form a composite letter. Note that *composing* characters should be "kept" with their baseform in most operations. Distinguished from *diacritic*, q.v. below.

- Composite
  Composite letter which can be decomposed into a baseform character plus one or more non-spacing marks.

- Numeric
  Characters to which a numeric value can be attached, including non-digits such as fractions, encircled numbers, Roman numerals, etc.

- Digit
  Numerics which can combine in sequence to form numbers. Includes parenthesized or circled single digit forms.

- Decimal Digit
  Digits which can be used to form decimal-radix numbers, including superscript and subscript forms of single digits.

- Hex Digit
  Digits and letters which can be used to form hexadecimal- radix numbers.

Note that:

*digit*'s form a proper subset of *numeric*'s. *decimal digit*'s form a proper subset of *digit*'s But that:

Not all *hex digit*'s are *digit*'s (i.e. 'A', 'B', etc.), and are not classified as *numerics* because the letters cannot be associated with a canonical numeric value outside the context of their usage in formatted hexadecimal numerals.

- Paired
  Property of directed pairs of punctuation, e.g. "(..)", "{..}", etc.

- Left-of-pair
  A left half of a directed pair, e.g. "(" or "{". Note that all *left-of-pair*'s are also *paired*. In parsing for line-breaks, for example, *left-of-pair*'s should generally be kept with a following line, and non-*left-of-pair*'s should be kept with a preceding line.

- Dash
  Property of various length dash-like characters.

- Hyphen
  The specific *dash*'s which are used as indicators of word- or line-continuation: U+002D HYPHEN-MINUS (or "hyphus"), U+00AD SOFT HYPHEN, U+2010 HYPHEN, and U+2011 NON-BREAKING HYPHEN. All *hyphen*'s are also *dash*'s.

Copyright ©1995, Sybase Inc. All Rights Reserved 
Printed Copy is Uncontrolled Unless Distributed with a Controlled Distribution List

- Punctuation
  A broad group of symbols typically used in delimiting various kinds of text units.
- Quote
  A subset of *punctuation* primarily used for demarcating quoted material. Most *quote*'s are also *paired*, but note that the non-directional U+0022 QUOTATION MARK, while used in pairs to mark quoted material, is not *paired* as a character property. Also, U+0027 APOSTROPHE also has the *quote* property because of its frequent use as a non-directional single quote.
- Terminal
  A subset of *punctuation* which is typically used in terminating text units. For example, U+003F QUESTION MARK is *terminal*. U+00BF INVERTED QUESTION MARK, while also used in demarcating questions, is not *terminal*.
- Currency
  Symbols which are typically used as prefixes or suffixes in formatted numerical amounts to indicate specific currencies. For example, U+0024 DOLLAR SIGN and U+00A3 POUND SIGN.
- Diacritic
  A mark which can be applied to a baseform letter, usually to modify it in some way. This property is approximately equivalent to "accent" in the Latin, Greek, and Cyrillic scripts, but also applies to some marks in other scripts as well. Distinguished from *composing*, which refers to the non-spacing property, and may apply to non-alphabetic non-spacing marks used to compose characters. *diacritic* is more closely tied to the *alphabetic* property. For text the appropriate "alpha" set may consist of the union of *alphabetic* and *diacritic* characters, whereas for formal languages (e.g. program text), *diacritic*'s probably should not count as "alpha"s, whether non-spacing or spacing.
- Transact SQL ID Character
  Characters that can be used in any object name, and include all alphasymbolic that are not *digits, numeric* or *punctuation* characters. For parsing purposes, this also includes *currency, diacritic*, '_', '#', and '@'. *numeric, digit*, and *decimal digit* may be in an identifier after the first position.

Properties specified for a match should not be mixed from different exclusive partitions. (I.e., do not try to OR together specific properties for control characters and for alphasymbolic characters.)

3.4.2.3 Specific Properties of Class-3 Unassigned Characters

Unassigned characters have only two values: unassigned, but legal; and unassigned and illegal. The former are for characters that may occur in a data stream that are in the valid range of the character set, but have not been explicitly assigned. These are considered to be whitespace to the SQL Server parser. The latter would occur in a data stream that may have dropped bits or bytes along the way, causing corrupt data to be Copyright ©1995, Sybase Inc. All Rights Reserved 
Printed Copy is Uncontrolled Unless Distributed with a Controlled Distribution List presented. This case will always flag a syntax error from SQL Server, with the hexadecimal encoding of the culprit character presented in the error message.

The bit mask for unassigned characters are as follows:

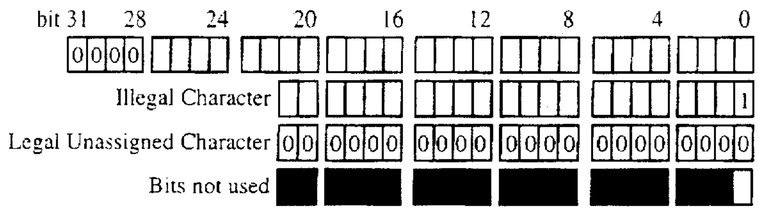

Therefore, the character attributes value for a legal, unassigned character would be 0x00000000, and an illegal character would be 0x00000001. So, if a final character attribute is zero, then it is referring to an unassigned quantity. If it is illegal, appropriate exception conditions should be raised.

Note to designer - if !charprop then illegal; if !(charprop xor 0x01) then unassigned, use as whitespace.

3.4.3 Class-3 Pointer Properties

In order to allow compaction of the Unicode tables, the character properties table has a different behavior space with the classification of "pointer". This is actually an index into another array of classification elements to allow the unique determination of a character based on the most-significant portions of the character. For instance, an ideographic character in UTF-8 will be a three byte character, which can be uniquely determined based on the first byte. A zenkaku punctuation character in the compatibility zone would be a three byte character, but you would need all three bytes to determine its unique attributes. Based on the designs already in progress, there are basically two types of array pointers: those that point to 256 element arrays that use an 8-bit quantity for indexing; and those that point to 16 element arrays that use a 4-bit quantity for indexing. There is room for more pointer types to allow for future expansion. There are up to fourteen more different variations possible by using bits 24 - 27 as flags for the type of processing taking place. Perhaps in the future, these could be used for context shifts or (Bob Forbid!) ISO-2022 character set shifting? For now, only one character set per array is allowed, with the stated goal of Copyright ©1995, Sybase Inc. All Rights Reserved 
Printed Copy is Uncontrolled Unless Distributed with a Controlled Distribution List full Unicode migration in the future. The pointer types are shown diagrammatically below, and explained underneath the diagram.

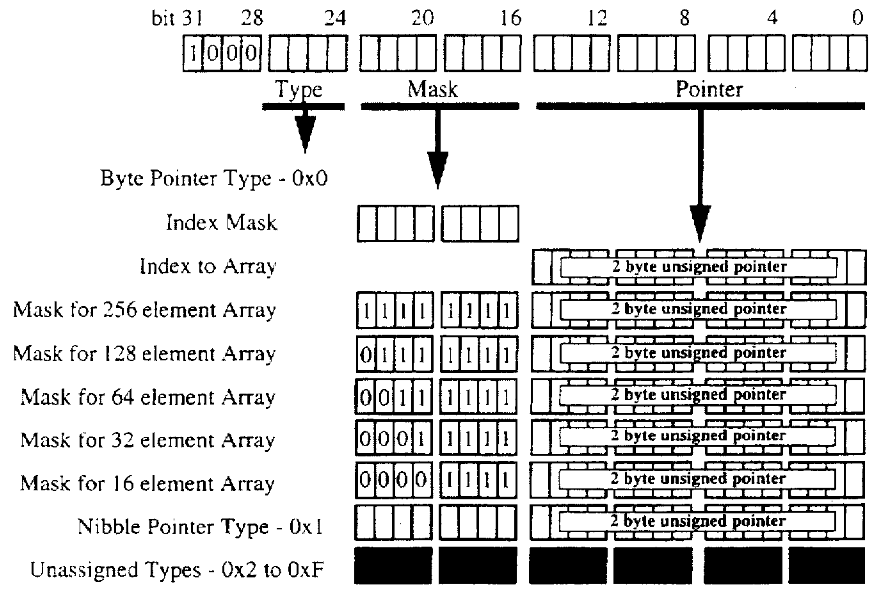

The exclusive partition flag of 0x8nnnnnnn must be set to indicate that a type of pointer has been found.

The next nibble indicates the type of pointer or index to use. 0x80nnnnnn indicates that an index into an array of 256 elements is to be used, and the least significant two bytes are to be used as the pointer to the 256 element array. If the *mask* is not 0xff, i.e., 0x80FFnnnn, then use the mask to limit the number of elements in the array pointed to. Arrays of 16, 32, 64, 128, and 256 elements will be possible, which has particular application to deciphering UTF-8 and EUC character sets.

If the *type* is a nibble-pointer, i.e., 0x81nnnnnn, then use the next nibble of the character in question to index into the indicated 16 element array. The *mask* field is not used with nibble arithmetic.

The complete workings of the pointer field are explained in detail in the Design Specifications are not intended to be visible to the end-user or developer. The pointer types are generated by the character set definition compiler. Note that since the pointer is a physical offset, in elements, from the beginning of the character attributes array, there can be no more than 65,535 characters uniquely defined. This should not cause any problems due to the large ranges of ideographic characters that can be defined based on only their first byte.

Copyright ©1995, Sybase Inc. All Rights Reserved 
Printed Copy is Uncontrolled Unless Distributed with a Controlled Distribution List The ALPHABET and NIBBLE concepts are described a bit more below in Section 3.2.10, *intl_nls.h Macros Interface Changes*

3.4.4 Transact SQL Character Types

To remain consistent with the expected character types and attributes expected by the SQL Server lexical parser (and applications based on the same parsing engine), a synchronization of the Class-3 Character Attributes will be undertaken.

3.4.4.1 T*SQL Lexical Types

Lexical types are used by parsers and keyword lookup engines to decipher queries and other programming language constructs. The lexical types are *exclusive*, in that a character can have only *one* lexical type at a time. This is to allow use in optimized case statements. To get an exclusive lexical type adequate for Transact SQL query parsing, the character attribute needs to be bit AND'ed a bit-mask. The values for lexical types are as follows:

- P_ALPHA - Alpha characters can be used in any object name, and include all alphabetic, ideographic, and syllabic characters. For parsing purposes, this also includes '_', '#', and '@'. This is equivalent to the *Alphasymbolic T*SQL ID Character* attribute, 0x20020000.
- P_NUMB - Numbers are any valid numeric quantity between 0 and 9. They can be single or multibyte. There is no restriction as to what script a decimal number is from. Therefore, Arabic, Hebrew, and Indic decimal numbers will work just as well as ASCII 0-9. This is equivalent to the *Alphasymbolic Decimal Digit* character attribute, 0x20000040.
- ~~P_SPEC~~ - Special characters that can appear in identifiers, except as the first character. Currently, there are none defined other than numbers. This is currently not used anywhere in any of the SQL Server or OpenClient code, so it will be phased out completely.
- P_IGSPACE - Characters that can be ignored in parsing. Usually control characters and whitespace, including undefined characters. This is equivalent to all controls, 0x10000000.
- P_STRNG - String delimiters. These are usually the single quote and the double quote. With the 4.9 release and the TO_ASCII function, double-byte equivalents were included. Currently both single and double byte string delimiters are supported, and a Class-3 character set will extend this to support characters of any length. This is equivalent to the *Alphasymbolic Quote* character attribute, 0x20002000.

We ran into a problem with the 4.9 release by allowing double-byte quote marks, which ended up confusing some developers as they started a quoted string with a single-byte quote and got a syntax error when the same string contained a double-byte quote. This will be solved in Class-3 character sets by keeping track of opening and closing quotation mark *pairs*. The pairs should match lexically, i.e., a sin- Copyright ©1995, Sybase Inc. All Rights Reserved 
Printed Copy is Uncontrolled Unless Distributed with a Controlled Distribution List gle-byte opening single quote should match a single-byte closing single quote.

The P_STRNG lexical type will only be used to indicate neutral or opening quotation marks. Closing quotation marks are found indirectly via the same mechanism that upper and lower case values are found.

- ~~P_OPER~~ - Transact SQL operator. This value is also used to indicate characters that should not be used in identifiers. When parsing, if it is not an identifier, and is not a valid operator or delimiter, then it is a syntax error. In this way, a "happy face" can be indicated as an OPER character, and therefore is not valid to be used as part of an identifier. Since it is not actually a valid operator (the "don't worry - be happy" function has not yet been implemented), a syntax error would be generated. The P_OPER bit mask is not used anywhere in the code, so it will be phased out in this release.
- P_MONEE - a valid single character prefix monetary indicator. This will be defined for all valid money symbols such as dollar, pound sterling, lira, etc. Refer to the PUBLIC.ENG *i18n_db..t_unicode* database for all values where *is_currency* = 1. Money symbols can be used as part of a valid identifier. This is equivalent to the *Alphasymbolic Currency* character attribute, 0x20008000.
- IDCHAR - An identifier character. This is the union of P_ALPHA, P_NUMB, and P_MONEE (sic).

3.4.4.2 T*SQL Character Types

In addition to the lexical types needed for parsing, we need character types for string processing. The types are:

- P_UPPER - Indicates an upper-case value. This value is used for all ideographic and other non-alphabetic characters that are valid in identifiers. All occurrences in *i18n_db..t_unicode where sybtype like "%UPPER%"*. Those places in the code that incorrectly use upper-case as a mapping to alphabetic will be changed to used *Alphasymbolic Alphabetic* and *Alphasymbolic Ideographic* character attributes. For those very few places that actually need to know if a character is upper case, a test will be made to see if the character can be mapped to lower case. If true, then it was an upper-case character. As a result, the IS_M_UPPER() macro will change its interface slightly.
- ~~P_LOWER~~ - Indicates a lower-case value, with a potential upper-case equivalent. All occurrences in *i18n_db..t_unicode where is_lower = 1*. For those very few places that actually need to know if a character is lower case, a test will be made to see if the character can be mapped to upper case. If true, then it was an lower-case character. As a result, the IS_M_LOWER() macro will change its interface slightly. This is not actually used anywhere in the code, so it will be phased out.
- P_DIGIT - A valid decimal digit in the range from 0-9. There is no restriction on what script this is from. All occurrences in *i18n_db..t_unicode where is_digit = 1*. This is equivalent to P_NUMB, above, which maps to the *Alphasymbolic Decimal Digit* character attribute, 0x20000040.

Copyright ©1995, Sybase Inc. All Rights Reserved 
Printed Copy is Uncontrolled Unless Distributed with a Controlled Distribution List

- P_SPACE - Whitespace - space, tab, carriage return, newline, vertical tab, etc. All occurrences in *i18n_db..t_unicode where is_whitespc* = 1. This is equivalent to the *Controls White Space* character attribute, 0x10000004.
- P_HEX - Valid character in a hexadecimal number. All occurrences in *i18n_db..t_unicode where is_hex* = 1. This is equivalent to the *Alphasymbolic Hex Digit* character attribute, 0x20000080.
- ~~P_PUNCT~~ - Punctuation characters. Also used for all fill-in which are not any of the above but are still valid characters. This is not actually used anywhere in the code, so it will be phased out.

3.4.5 Data Structure Overview

The data structures are all referenced from within a Character Attributes structure, which then points to all the relevant character set specific information to determine size, mapping to Unicode, character attributes, and pertinent transformations. It is assumed that the modules above co-exist with the single set of Unicode structures that are part of the Unicode Infrastructure Library API.

3.4.6 The CHAR_ATTRIB Structure

To keep track of the full set of attributes for each character set, the structure *CHAR_ATTRIB* will be modified. It will be the central repository of character set information relating to character width, attributes, case-mapping, soundex, SQL Language character normalization, other transformations, and conversion to and from other character sets. The base *CHAR_ATTRIB* structure will hang off the global `Resource` structure in the SQL Server, with session-specific structures in each Pss.

It will contain the following:

- a status field: `cs_status`. This element will be stored in a two byte short. It will have the following values:
  - 0x00 *CSTAT_DEFAULT* - no bits set indicates 8-bit data from a "Type 1001" character set.
  - 0x01 *CSTAT_MULTIBYTE* - set if data can contain multi-byte characters.
  - 0x02 *CSTAT_SPACELAST* - set if the last byte of any character is equal to ASCII 0x20.
  - 0x04 *CSTAT_NONASCIISP* - set if there are any values other than ASCII 0x20 that can be equal to a space character when passed through the *COM_TO_LCASCII* macro.
  - 0x08 *CSTAT_ASCII_NOTSUBSET* - set if 7-bit ASCII is not a subset of the character set
  - 0x10 *CSTAT_MACHINE_TYPE* - zero if big-endian (MSB first - normalized form), one if little-endian (LSB first (Intel/DEC)) This structure should always be stored in file form in the normalized big-endian form.
- the class of character set: `cs_class`. This will be stored in a single byte. Class 3 character sets have a class == 3.

Copyright ©1995, Sybase Inc. All Rights Reserved 
Printed Copy is Uncontrolled Unless Distributed with a Controlled Distribution List

- the character set id: cs_id. This element will be stored in a single byte. The character set IDs for UTF8 and UCS2 are 190 and 191 respectively, as already defined in <include/charset.h>.
- the character set name (cs_name) and length (cs_namelen).
- the maximum possible length, in bytes, of any character: cs_maxcharlen. This element will be stored in a single byte.
- a single byte field indicating the average length of "National Characters": cs_ncharsize. For UTF8, it will be 3 (for Asian characters).
- a pointer to a 256 byte array used to store character width information: *cs_width_map.
- a pointer to a contiguous array of *CS_NORM_MAP* structures, and a field indicating how many structures there are: (CS_NORM_MAP *) cs_norm_map and cs_nnorm. The *CS_NORM_MAP* structure is used to normalize input text to 8-bit lowercase ASCII to aid in keyword lookups in a case-insensitive and width-insensitive manner. This will stay the same for Class 3 character sets, the difference being that indirection can go down multiple levels, instead of just one as in Class 2 character sets.
- a pointer to a contiguous array of *CS_TYPE_MAP* structures, and a field indicating how many structures there are: (CS_TYPE_MAP *)cs_type_map and cs_ntype. The *CS_TYPE_MAP* structure is used to get lexical information, and do case-mapping of characters. This is only used for Class 1 and 2 character sets, and is NULL for Class 3 character sets.
- a pointer to a contiguous array of *CS_SOUNDEX* structures, and a field indicating how many structures there are: (CS_SOUNDEX *)cs_soundex and cs_nsoundex. The *CS_SOUNDEX* structure is used to gather soundex information for character strings. This is only used for Class 1 and 2 character sets, and is NULL for Class 3 character sets.
- After the existing Class 1 and 2 character set fields, the Class 3 specific fields start to appear, starting with a pointer to a CS_TRANSFORM structure for converting the default character set to 2-byte UCS2 format ISO 10646 data. There is also a reverse mapping transform to convert from Unicode back to the default character set. These two entries are *cs_toUCS2* and *cs_UCS2toChar*. There is a field to indicate what the equivalent Unicode Infrastructure LIbrary (UIL) character set id (*cs_uniconv_cid*) is so that UIL built-in conversions to and from Unicode can be used instead of those supplied by the Class-3 tables.
- For SOUNDEX mapping, a new structure type will be created, CS_SOUNDMAP, for which two entries will be supplied - *cs_toSound*, and the localized variant, *cs_locToSound*.
- To allow for future expansion, there will be a linked list of CS_TRANSFORM structures hanging off the end, which can be used to convert between katakana and hiragana, or to add pointers to conversion routines or transliteration tables.

Note that for the localized versions of the mapping tables, they point to linked lists of Unicode-based locale-sensitive conversion tables. All Unicode-based tables will be stored in a globally accessible location to facilitate multi-threaded operation and reduce memory Copyright ©1995, Sybase Inc. All Rights Reserved 
Printed Copy is Uncontrolled Unless Distributed with a Controlled Distribution List overhead. If the conversion is not available in the core tables, or those supplied in the *uniconvxxx* functions of the UIL, then the sparse, localized structures are searched.

The data structure will have a form as follows in the *comloc.h* header file that is shared by the Server and the OpenClient shared library.

CHAR_ATTRIB Structure

```
typedef struct char attrib
{
        short           cs_status;       /* Status flags                            */
        BYTE            cs_class;        /* Type of character set                   */
        BYTE            cs_id;           /* Character set ID                        */
        short           cs_namelen;      /* Length of the name                      */
        BYTE            cs_name[MAXNAME];/* Name of character set                   */
        BYTE            cs_maxcharlen;   /* Max char length                         */
        BYTE            cs_ncharsize;    /* Average nchar len                       */
        BYTE            cs_nnorm;        /* No. of Class 2 norm maps                */
        BYTE            cs_ntype;        /* No. of Class 1 or 2 type maps           */
        BYTE            cs_nsoundex;     /* No. of Class 1 or 2 soundex maps        */
☞       short           cs_uniconv_cid;  /* UIL Cabaracter Set ID for conversion    */
☞                                        /*     UNICONV_CID_UNKNOWN if not in       */
☞                                        /*     UIL core set                        */
☞       BYTE            spare[1];        /* Word boundry padding                    */
        BYTE            *cs_width_map;   /* Width of chars                          */
        CS_NORM_MAP     *cs_norm_map;    /* Class 2 Normalization maps              */
        CS_TYPE_MAP     *cs_type_map;    /* Class 1 or 2 Type maps                  */
        CS_SOUNDEX      *cs_soundex;     /* Class 1 or 2 Soundex maps               */
☞       /* Class3 specific structure starts here to allow for backward compat.     */
☞       CS_TRANSFORM    *cs_CharToUCS2;  /* Mapping to Unicode                      */
☞       CS_TRANSFORM    *cs_UCS2toChar;  /* Mapping from Unicode back               */
☞       CS_SOUNDMAP     *cs_toSound;     /* Class 3 Soundex Mapping                 */
☞       CS_TRANSFORM    *cs_toQtMatch;   /* Right-of-Pair match quote               */
☞       CS_TRANSFORM    *cs_locToUpper;  /* Localized Upper Case Mapping            */
☞       CS_TRANSFORM    *cs_locToLower;  /* Localized Lower Case Mapping            */
☞       CS_SOUNDMAP     *cs_locToSound;  /* Localized Soundex Mapping               */
☞       CS_TRANSFORM    *cs_transNext;   /* Pointer to more Transforms              */
} CHAR_ATTRIB;
```

A graphical representation of the *modified CHAR_ATTRIB* structure is presented below in Figure 0.1, *The CHAR_ATTRIB Structure*.

The thin solid lines (————►) represent existing Class 2 structure components, the thicker solid lines (————►) represent new Class 3 mandatory structure elements. The dashed lines (– – – ►) represents optional Class 3 structure elements that are dependent on locales and future extensions.

Copyright ©1995, Sybase Inc. All Rights Reserved 
Printed Copy is Uncontrolled Unless Distributed with a Controlled Distribution List FIGURE 0.1: The CHAR_ATTRIB Structure
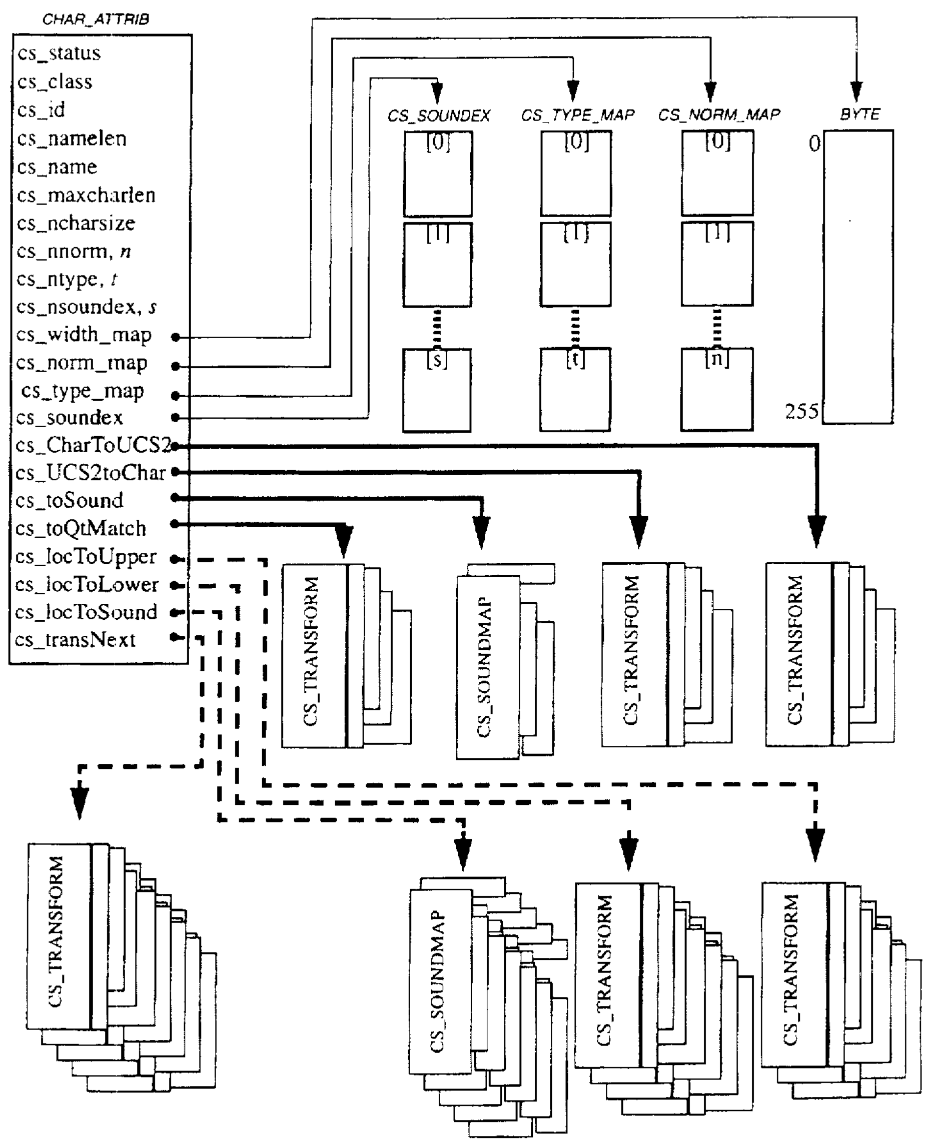
 Copyright ©1995, Sybase Inc. All Rights Reserved 
Printed Copy is Uncontrolled Unless Distributed with a Controlled Distribution List

3.4.7 Character Types Structure

In looking at what character attributes will be most important, in priority, for SQL Server, Open Client, Open Server, and Open-Client based applications, I first looked through all the code to find out how the current functionality is used. A table itemizes the bitmasks, and associated macros and functions in existence to support them, and is presented as an appendix at the end of this chapter.

The final list of attributes that are needed becomes:

- P_ALPHA For alphabetic characters
- P_UPPER For historical reasons
- P_LOWER For historical reasons, to preserve macro calls
- P_DIGIT For decimal digits
- P_HEX For hexadecimal
- P_MONEE For prefix currency identifiers
- P_STRNG For opening quotes
- P_IDEO For ideographic characters
- P_SPEC for special characters now labelled as P_ALPHA: '#', '@', '_'

All of these are covered quite adequately by the Unicode Infrastructure Library API and the available status bits from the character attributes structure.

Therefore, no new Class 3 attributes structure is needed, since the atomic attributes listed above are invariant with respect to locale and can be acquired through an existing shared library.

3.4.8 Generic Transform Structure

To minimize maintenance, and maximize reusability, a generic character transformation structure is being created. This is a simplified form with respect to the robust conversion mechanism being created for the System 11 Open Client architecture.

The Transformation Structure provides the ability to specify either a set of pointers to transformation tables, or a reference to a named conversion function with a known calling interface, based on the documented interface used by OpenClient. In that way, registered OpenClient conversion functions can then be used to do transformations as well.

Note that the transform structure is not user-visible and uses the SQL Server's preferred format of including the lengths with the strings for performance reasons (don't need to read to null termination to determine length packet).

The CS_TRANSFORM structure is the root for every transformation. It contains:

- The name of the transform.

Copyright ©1995, Sybase Inc. All Rights Reserved 
Printed Copy is Uncontrolled Unless Distributed with a Controlled Distribution List

- A name for the "from" state.
- A name for the "to" state.
- Type, taken from the definition file or *syscharsets* when loaded.
- ID (id plus csid) taken from the definition file, or *syscharsets* when loaded.
- Locale ID. Initially zero for this release.
- Status flag, used to indicate specific properties of the structure. This is used to help set up the pointer to the transform function for optimization purposes.
- A pointer to the root CSTF_TRIE structure from which offsets are calculated. May be NULL if transforms are made via a function.
- A pointer to the root CSTF_CVT element, from which final transform element offsets are calculated from. May be NULL if all transforms terminate either in a CSTF_TRIE, or are accomplished by a function. Supports one-to-many transformations, e.g., "ß" to "SS", in German.
- A pointer to the next transform structure in a linked list. A NULL indicate the end of the list
- A name of a conversion function to use. NULL if no conversion function being used.
- A pointer to the conversion function to use, set up by the module that first loads the transform into cache. This is ALWAYS set, and is used to boost performance by passing to a function, instead of multiple "if" statements when doing the transform.

Localized transforms may be very small - therefore we will try to use just Tries, with trie[0] being the first master.

CS_TRANSFORM Structure

```
typedef struct cs_transform
{
        short            cstf_status;           /* Status flags              */
        short            cstf_type;             /* Type of transform         */
        short            cstf_id;               /* Transform ID              */
        short            cstf_localeID;         /* ID for locale, zero is default */
        short            cstf_namelen;          /* Length of the name        */
        BYTE             cstf_name[MAXNAME];    /* Name of Transform, e.g. "CharToUCS2" */
        short            cstf_frommlen;         /* length of "from" name     */
        BYTE             cstf_fromname[MAXNAME]; /* name of "from" state     */
        short            cstf_tomlen;           /* length of "to" state name */
        BYTE             cstf_toname[MAXNAME];  /* name of "to" state        */
        CSTF_TRIE *      cstf_trieRoot;         /* Root trie structure       */
        CSTF_CVT*        cstf_cvtRoot;          /* Root of transform heap    */
        short            cstf_fouConvNameLen;   /* Length of name of cvt fn to use*/
        BYTE             cstf_fouConvName[MAXNAME];
        (CS_RESULT *)()  cstf_fouConv;          /* Conversion function to use */
        CS_TRANSFORM *   cstf_nextTransform;    /* Pointer to next transform struct. */
} CS_TRANSFORM;
```

A graphical representation is presented below

Copyright ©1995, Sybase Inc. All Rights Reserved

Printed Copy is Uncontrolled Unless Distributed with a Controlled Distribution List FIGURE 0.2: CS_TRANSFORM Structure.
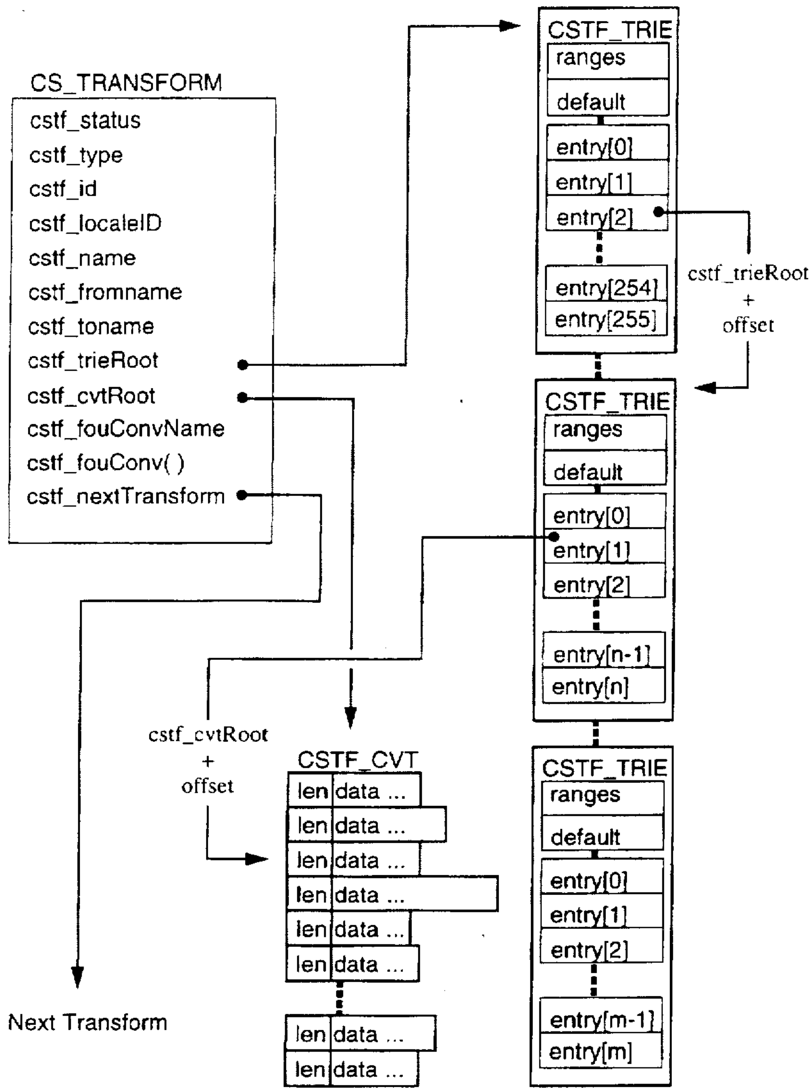
Below are itemized the structure contents along with explanations of valid contents.
 Copyright ©1995, Sybase Inc. All Rights Reserved 
Printed Copy is Uncontrolled Unless Distributed with a Controlled Distribution List

3.4.8.1 cstf_status

Valid status flags, based on an enumerated value, are:

- CSTFSTAT_8BIT - 1-to-1, 8-bit base, trie defaults to 256 byte array holding 8-bit characters in byte[0] of each entry.
- CSTFSTAT_256ROOT - 256 byte master trie, with indirection through a second level of tries
- CSTFSTAT_VARROOT - Variable length master trie, with pointers to more tries
- CSTFSTAT_CVTROOT - cvtRoot is used to get variable length results
- CSTFSTAT_FNONLY - Use supplied function only, no tables (e.g., UTF8-to-UCS2)

3.4.8.2 cstf_type

Valid types, based on contents possible in *syscharsets*, are:

- 1003 - Class 1 8-bit to 8-bit conversion table
- 3003 - Class 3 multibyte to many conversion table
- 4003 - Case and quotes mapping tables
- 6003 - Miscellaneous transformation tables These values are taken either from the definition file or *syscharsets* when the transform is loaded.

3.4.8.3 cstf_id

The ID is a two byte quantity, composed of the ID and CSID from either the definition file or *syscharsets* when the transform is loaded.

3.4.8.4 cstf_localeID

The locale ID will not be used until implemented in OpenClient and SQL Server. Until then, the only valid value is zero (0), for default.

When it is implemented, it will coincide with the locale_id column in *syscharsets*, keyed to a column of the same name in the new *syslocales* table.

3.4.8.5 cstf_name, cstf_fromName, cstf_toName

These names are used for diagnostic and status messages.

Copyright ©1995, Sybase Inc. All Rights Reserved 
Printed Copy is Uncontrolled Unless Distributed with a Controlled Distribution List

3.4.8.6 cstf_trieRoot

The trieRoot is a physical pointer to a heap of trie structures, from which indirect addressing to transform entities takes place. Each index to another trie is indexed from this root as if it were an array of 32-bit longs. Tries are explained further below.

cstf_lastTrie is used for boundary checking to be sure we don't index off the end of the list.

3.4.8.7 cstf_cvtRoot

The cvtRoot points to the root of a heap of variable length conversion strings. Indirect addressing to cvtElements from tries are indexed from this root. cvtElements are explained further below.

cstf_lastCvt is used for boundary checking to be sure we don't index off the end of the list.

3.4.8.8 cstf_fouConv

The fouConv (Form Of Use Conversion) functions are set up by the module that installs this transform into cache. The module uses the status flags to decide which optimized (or user-supplied) function to use. It is an error if a function is named, but is not present in the list of function names.

3.4.8.9 cstf_nextTransform

A pointer to the next CS_TRANSFORM structure in a linked list.

3.4.9 CSTF_TRIE Structure

The CSTF_TRIE structure is based on the compressed tries used in the Unicode Infrastructure Library API, which in turn is based on contributions from participants to the Unicode Implementor's Workshops. It is a method of storing variable length arrays so as to only encode the portions of a character set which actually have any meaning or, in this case, have a valid transformation.

For optimization purposes, each entry in a trie array may contain

- the final target data
- a pointer to another trie to explore with the next byte of the character
- a CSTF_CVT element, which contains the final target data, if greater than three bytes in length (maximum UTF8 size).

Copyright ©1995, Sybase Inc. All Rights Reserved 
Printed Copy is Uncontrolled Unless Distributed with a Controlled Distribution List Each trie starts with a set of ranges for the trie, followed by a default value, and finally, an array of trie entries. Each entry is a signed 4-byte long, with the high nibble holding status information about the entry.

Similar to the Unicode Infrastructure Library API, there is a DataStart and DataEnd entry in the ranges, but there is also a ValidStart and ValidEnd entry, to indicate that values outside of these ranges are invalid. This is used for error checking and data validity checking. E.g., in Unicode, in UCS-2, there are only two invalid values - 0xFFFE and 0xFFFF, the latter being used as a signal that compressed data is being used. But in UTF8, any character that starts with 0x80 - 0xBF, or 0xF0 - 0xFF, or following bytes that start with 0x00-0x7F or 0xC0-0xFF are invalid. Hence the necessity of the validity range.

The trie method was also chosen because it proves to be the most compact for the large amounts of data needed for Unicode attributes.

To handle many-to-one and many-to many conversions as in ISO transliteration requirements and MAITS Level-1 transparent Language Processing support (see <http://www.dkuug.dk/maits>), a GOBACK flag is provided. An example of many to 1 is "<hankaku KA><voiced-sound>" to "<zenkaku GA>", in Japanese, or "th" to "θ" in roman -to-greek transliteration. An example of many to many is "τχ" to "t•h" in greek-to-roman transliteration.

The structure is as follows:

```
typedef structcstf_trie
(
        BYTE    validStart;     /* Start of Valid data                          */
        BYTE    validEnd;       /* Last valid data                              */
        BYTE    dataStart;      /* Start of specific data                       */
        BYTE    dataEnd;        /* Last of specific data                        */
        int32   default;        /* Default values for data between validStart an
                                        dataStart, and between dataEnd and validEnd */
        int32   entry[256];     /* Data between dataStart and dataEnd           */
) CSTF_TRIE;
```

A code fragment to get the entry would look as follows:

```
Where *cp is the character pointer for our search item,

if (*cp < cstf_trie->validStart || *cp > cstf_trie->validEnd) then process illegal
character
else
        entry = (*cp < cstf_trie->dataStart ||
                 *cp > cstf_trie->dataEnd )
                ? cstf_trie->default
                : cstf_trie->entry[*cp];
```

Based on the status above, each entry, including the default, is overlaid with one or a combination of the following flags, used to determine the sort of processing to use.

Bits 31-28: Status and type of entry.

0xF0 000000 - CSTRIE_STATMASK    Mask to be applied to get entry status

```
status = cstf_trie->entry[n] & CSTRIE_STATMASK
```

0x00 000000 - CSTRIE_ILLEGAL If no status, then this is an illegal or invalid character

```
if (status == CSTRIE_ILLEGAL) then illegal char
```

0x10 000000 - CSTRIE_CHARINCL Character Included. If equal to this, then the contents, AND'ed with CSTRIE_VALMASK gives the final null-terminated transformation value. The length is indicated in the second nibble, retrieved by AND'ing with 0x0F000000 (CSTRIE_VALEN)

```
if (status == CSTRIE_CHARINCL) then
        get transform value from this entry
```

0x20 000000 - CSTRIE_NOCVT Character is valid, but no transform exists

```
if (status == CSTRIE_NOCVT) then
        no transform exists
```

0x30 000000 - CSTRIE_GOBACK This will only occur for many-to-one or many-to-many conversions or transliteration. It means that the search code should go back to the previous valid trie structure for source length calculations. The final value is included here as in CSTRIE_CHARINCL.

```
if (status == CSTRIE_GOBACK) then
        get transform value from this entry
        decrement search string by one to go back
```

0x40 000000 - unassigned
to
0x70 000000 - unassigned

0x80 000000 - CSTRIE_PTR Entry is a pointer if negative

```
if (entry < 0) then
        this is an index to another structure
```

Copyright ©1995, Sybase Inc. All Rights Reserved
Printed Copy is Uncontrolled Unless Distributed with a Controlled Distribution List

```
(0x90 000000) - 0x10 000000 | CSTRIE_PTR
                   CSTRIE_PTR2TRIE Entry is a pointer (off-
                             set) to another CSTF_TRIE
```

```
if (status & CSTRIE_PTR2TRIE) then
      process next trie pointed to
```

```
(0xA0 000000) - 0x20 000000 | CSTRIE_PTR
                   CSTRIE_PTR2CVT  Entry is a pointer (off-
                             set)to a CSTF_CVT entry
```

```
if (status & CSTRIE_PTR2CVT) then
      process pointer to CSTF_CVT
```

```
0xB0 000000 - 0x30 000000 | CSTRIE_PTR
                   CSTRIE_GOBACK2CVT Entry is a pointer (off-
                             set)to a CSTF_CVT entry, but is
                             actually associated with the last
                             trie. This can be found in many-
                             to-one and many-to-many conver-
                             sions.
```

```
if (status & CSTRIE_GOBACK2CVT) then
      process pointer to CSTF_CVT to get final value
      decrement source for next index
```

```
0x40 000000 - CSTRIE_FINALATTR  Final Attribute. If set
                             with a pointer, then the contents
                             of the entry and'ed with
                             0x00FF0000 becomes the MSB of the
                             Unicode to look for for at-
                             tributes. No need to look farther.
                             This is particularly useful in re-
                             ducing the number of indirect ref-
                             erences for Asian character
                             lookup using com_getUCS2.
```

```
0xC0 000000 - illegal
0xD0 000000 - CSTRIE_PTR2TRIE | CSTRIE_FINALATTR
0xE0 000000 - CSTRIE_PTR2CVT | CSTRIE_FINALATTR
0xF0 000000 - unassigned
```

Bits 27-24: Miscellaneous Masks

```
0x0F 000000 - CSTRIE_VALEN      Length of Value, used if
                                status == CSTRIE_CHARINCL
```

Copyright ©1995, Sybase Inc. All Rights Reserved 
Printed Copy is Uncontrolled Unless Distributed with a Controlled Distribution List

```
0x01 000000 - CSTRIE_VALENDIV   Value Length Divisor.
                                Used to get the length of the val-
                                ue.
0x00 FF0000 - CSTRIE_UVALMASK   Mask to get high nibble of
                                MSB of Unicode if
                                CSTRIE_FINALATTR set and looking
                                for attributes only in
                                com_getUCS2( )
```

```
/* Create Unicode if looking for attributes */
if ((entry < 0) && (status & CSTRIE_FINALATTR))
        unichar = (entry & CSTRIE_UVALMASK) >> 12;
```

The CSTRIE_UVALMASK is useful primarily for limiting the search times for Hangul and Ideographic character attributes.

Bits 23-0: Entry value

```
0x00 FFFFFF - CSTRIE_VALMASK     Value Mask. Used if sta-
                                 tus == CSTRIE_CHARINCL
                                 to get the included
                                 transformation value.
```

```
/* Get value, if included */
if (status == CSTRIE_CHARINCL)
{
        i = 0;
        len = (entry & CSTRIE_VALEN) / CSTRIE_VALENDIV;
        while (i < len)
        {
                value[i] = ((BYTE *) entry)[i];
                i++;
        }
}
```

3.4.10 CSTF_CVT Structure

The CSTF_CVT structure elements are used to convert characters to variable length quantities or even strings. The maximum length of any transformation value is 255 bytes.

The CSTF_CVT elements are only accessible indirectly through a CS_TRANSFORM and CSTF_TRIE structure pair.

Each element is simply a single byte length component with an indication of whether it is encoded in multibyte or Unicode two-byte form, followed by the designated amount of data. Each entry is padded to four a byte boundary to aid in indexing time. To make this structure more usable with Unicode, it is a union with byte-ordered values.

Copyright ©1995, Sybase Inc. All Rights Reserved
Printed Copy is Uncontrolled Unless Distributed with a Controlled Distribution List The structure prototype looks like this:

```
typedef struct cstf_cvt
{
        BYTE    cvtlen
        BYTE    isUCS2
        union
        {
                BYTE    cvtCdata[254]
                unichar cvtUdata[127]
        {;
} CSTF_CVT;
```

Here are some example entries:

- Upper case German <ess-zet>, 'ß' -> "SS" in Unicode

```
cvtlen isUCS2  "S"      "S"  padding
[0x02] [0x01][0x0053] [0x0053][0x0000]
```

- Lowercase Turkish dotless 'I' -> 'ı' (U_0131) in Unicode

```
cvtlen isUCS2  "ı"
[0x01] [0x01][0x0131]
```

- Zenkaku Katakana Japanese "GA" to hankaku katakana "KA" + "voice-mark"

```
[0x02][0x01][0XFF67][0XFF9E][0x0000]
```

- Unicode Chinese U+60F8F to EUC-CNS codeplane 2 character 3B69

```
cvtlen isUCS2 SS2  plane2 ideograph    padding
[0x04] [0x00][0x8E][0xA2][0x3B][0x69][0x00][0x00]
```

3.4.11 Soundex Transform Structure

To handle soundex in a generalized, localizable manner, it needs to contain a flexible soundmap, and an ability to map certain characters to multiple roman characters. Hence, it needs a slightly different structure from a CS_TRANSFORM. The CS_TOSOUND structure has elements for the sound array - what integers to assign to each ASCII value from A-Z, and then pointers to CSTF_TRIE and CSTF_CVT structures for the actual lookup. Also included is a pointer to the next CS_TOSOUND structure, if one exists, to allow for locale-sensitive soundex mapping. Each final element may hold only upper case characters in the range from 'A' to 'Z', or status to indicate no soundex map.

The structure looks like this:

CS_TOSOUND Structure

```
typedef struct cs_tosound
{
        short           csnd_status;            /* Status flags                 */
        short           csnd_type;              /* Type of soundex map          */
        short           csnd_id;                /* Sound Map ID                 */
        short           csnd_localeID;          /* ID for locale, zero is default */
        short           csnd_namelen;           /* Length of the name           */
        BYTE            csnd_name[MAXNAME];     /* Name of character set        */
        unichar         csnd_map[26];           /* Soundex values for A-Z       */
        CSTF_TRIE *     csnd_trieRoot;          /* Root trie structure          */
        long            csnd_lastTrie;          /* index to last Trie structure */
        CSTF_CVT*       csnd_cvtRoot;           /* Root of transform heap       */
        long            csnd_lastCvt;           /* index to last CSTF_CVT element */
        CS_TOSOUND *    csnd_nextToSound;       /* Pointer to next transform struct. */
} CS_TOSOUND;
```

Copyright ©1995, Sybase Inc. All Rights Reserved

Printed Copy is Uncontrolled Unless Distributed with a Controlled Distribution List

3.4.11.1 csnd_status

Valid status flags, based on an enumerated value, are:

- CSNDSTAT_BASIC - Straight character to sound. No string expansion.
- CSNDSTAT_STRINGS - some characters (such as Japanese kana, or Korean hangul) map to Roman phonetic multi-character strings.

3.4.11.2 csnd_type

Valid types, based on contents possible in *syscharsets*, are:

- 5003 - Class 3 Soundex table

This value is taken either from the definition file or *syscharsets* when the transform is loaded.

3.4.11.3 csnd_id

The ID is a two byte quantity, composed of the ID and CSID from either the definition file or *syscharsets* when the transform is loaded.

3.4.11.4 csnd_localeID

The locale ID will not be used until implemented in OpenClient and SQL Server. Until then, the only valid value is zero (0), for default.

When it is implemented, it will coincide with the locale_id column in *syscharsets*, keyed to a column of the same name in the new *syslocales* table.

3.4.11.5 csnd_name

Name used for diagnostic and status messages. Uniquely identifies this Sound Map.

3.4.11.6 csnd_map

The csnd_map entry hold a small array of 26 Unicode characters representing integer values from '0' to '9' from which a Soundex numerical component is derived. ASCII can be retrieved by casting each entry to (BYTE).

3.4.11.7 csnd_trieRoot

The trieRoot is a physical pointer to a heap of trie structures, from which indirect addressing to transform entities takes place. Each index to another trie is indexed from Copyright ©1995, Sybase Inc. All Rights Reserved 
Printed Copy is Uncontrolled Unless Distributed with a Controlled Distribution List this root as if it were an array of 32-bit longs. Tries are explained further in *CSTF_TRIE Structure* (sec. 3.4.9).

csnd_lastTrie is used for boundary checking to be sure we don't index off the end of the list.

3.4.11.8 csnd_cvtRoot

The cvtRoot points to the root of a heap of variable length conversion strings. Indirect addressing to cvtElements from tries are indexed from this root. cvtElements are explained further in *CSTF_CVT Structure* (sec. 3.4.10).

csnd_lastCvt is used for boundary checking to be sure we don't index off the end of the list.

3.4.11.9 csnd_nextToSound

A pointer to the next CS_TOSOUND structure in a linked list. A NULL indicates the end of the list.

A graphical representation is presented below

Copyright ©1995, Sybase Inc. All Rights Reserved 
Printed Copy is Uncontrolled Unless Distributed with a Controlled Distribution List FIGURE 0.3: CS_TOSOUND Structure.
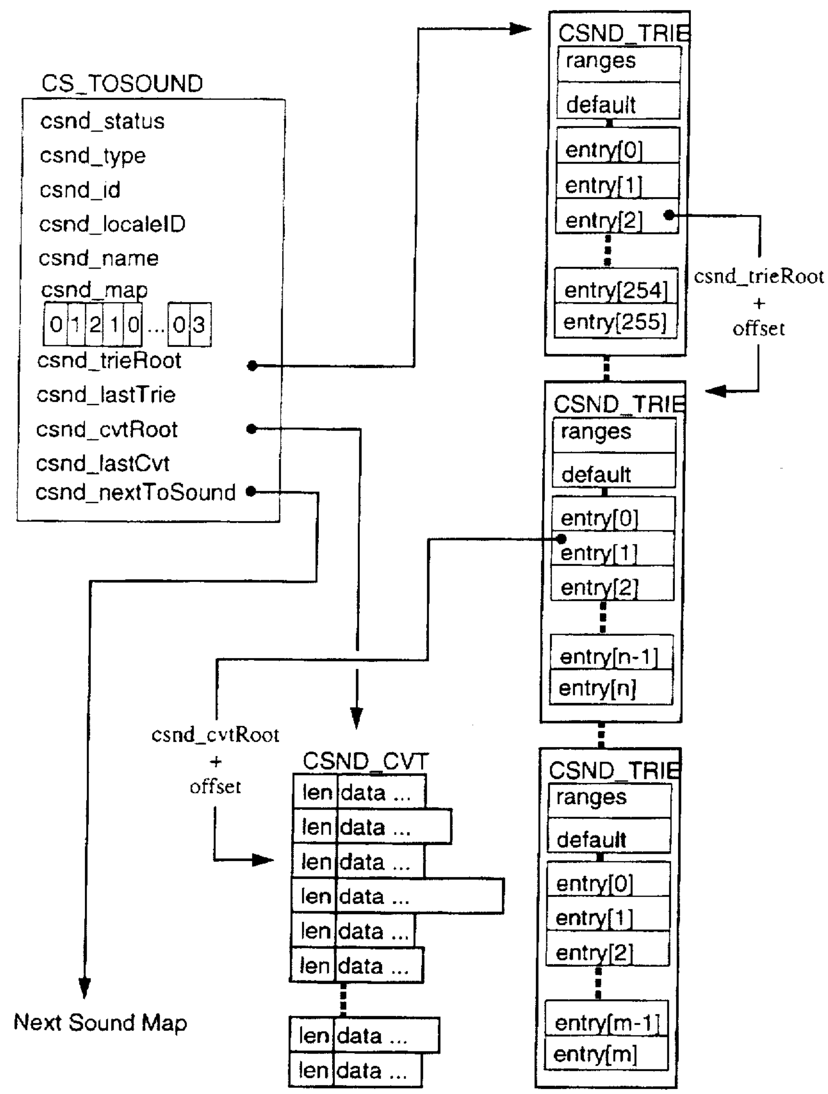
 Copyright ©1995, Sybase Inc. All Rights Reserved 
Printed Copy is Uncontrolled Unless Distributed with a Controlled Distribution List

3.4.12 TO ASCII Transforms Structure

3.4.13 Width Map

3.4.14 Case-Map Transforms

3.4.15 Character Pairs Transforms

3.4.16 UCS-2 Transforms

3.5 Upgrade

This design specification describes the character set and API itself. Applications which need to use Class-3 character sets must be modified to use this code.

The applications which use Class-3 character sets each have their own upgrade procedures, which are described in their respective documents.

3.6 Diagnostics

The character set and API do not provide any inherent diagnostic functionality. The utility which is used to compile the human-readable definition files should provide diagnostic output that describes, the lexical attributes, character by character.

4. Low Level Design

Design at the pseudo code level for each module. There should be one module described here for every module defined in the high level design.

4.1 Assumptions

Where appropriate, discuss assumptions that apply to each module.

4.2 API

Any new or changed API's should be specified in this section.

Note: If it makes the high level design easier to understand, this section can be included at the beginning of the high level design section rather than here.

Copyright ©1995, Sybase Inc. All Rights Reserved 
Printed Copy is Uncontrolled Unless Distributed with a Controlled Distribution List

4.3 Special Considerations

Describe any limits or constraints on this design. (e.g. Because this module relies on the blab-la locking API, it is not able to lock bla before processing xxx. This code can be simplified once the wizzy lock manager project has completed.)

Describe any special considerations for this design in the areas of:

- Security
- Performance and how they are addressed.

4.4 Pseudocode

Pseudocode should be detailed here for each module that will be added or changed. Particular information that should be specified:

- Data structures particular to a module should be introduced with the pseudocode for the module.
- Routine names and parameter lists should be specified as they are in the code.
- Monitor and error handling code should be included in the pseudocode description of each module.
- External function calls and/or assumed behavior (e.g. commonlib or system function calls) should be included in the pseudocode description of each module.

5. Character Attributes Study

I did a study of all the 10.0 SQL Server, Open Client, and Open Server and associated utility code to see what the actual use of Common Library functions was. The results are displayed below in tabular form. The items that have been ~~struck-out~~ are not used anywhere. The items with shaded boxes can be easily replaced with the Class-3 transform code.

Table 1.1: Use of Current BitMasks and Functions

| Defined in System 10 | syblex/ sybtypebit mask | SPG | CPG | REP SVR | Comments |
|---|---|---|---|---|---|
| P_UPPER | 0x0001 | [redacted] | | | |
| P_LOWER | 0x0002 | [redacted] | | | |
| P_DIGIT | 0x0004 | ✓ | | | |

Copyright ©1995, Sybase Inc. All Rights Reserved 
Printed Copy is Uncontrolled Unless Distributed with a Controlled Distribution List

Table 1.1: Use of Current BitMasks and Functions

| Defined in System 10 | syblex/ sybtypebit mask | SPG | CPG | REP SVR | Comments |
|---|---|---|---|---|---|
| P_SPACE | 0x0008 | ✓ | [illegible] | ✓ | Redundant with P_SPACE? |
| P_HEX | 0x0010 | ✓ | | ✓ | |
| ~~P_PUNCT~~ | ~~0x0020~~ | [illegible] | ✓ | [illegible] | For cdmn-ispunct() but never used? |
| ~~P_GRAPH~~ | 0x0040 | [illegible] | ✓ | [illegible] | Defined in comnlib/~/com_ctype.c but not used. |
| P_ALPHABET | 0x0080 | ✓ | | | Used for multibyte arrays |
| P_ALPHA | 0x0100 | ✓ | | ✓ | |
| P_NUMB | 0x0200 | ✓ | | ✓ | Redundant with P_DIGIT |
| ~~P_SPEC~~ | ~~0x0400~~ | [illegible] | [illegible] | [illegible] | [illegible] |
| P_IGSPACE | 0x0800 | ✓ | | | |
| P_STRNG | 0x1000 | ✓ | | | Keep track of endstr! |
| ~~P_OPER~~ | ~~0x2000~~ | [illegible] | [illegible] | [illegible] | Used as place holder only, never used |
| P_MONEE | 0x4000 | ✓ | | ✓ | |
| P_IDCHAR | 0x4700 | ✓ | | ✓ | Bit mask |
| ~~P_EOM~~ | ~~0x8000~~ | [illegible] | [illegible] | [illegible] | Not actually used |
| Macros being used | | | | | |
| Single Byte Macros | | | | | |
| ~~TOUPPER()~~ | | [illegible] | [illegible] | [illegible] | [illegible] |
| ~~TOLOWER()~~ | | [illegible] | [illegible] | ✓ | [illegible] |
| ~~ISALPHA()~~ | | [illegible] | [illegible] | [illegible] | [illegible] |
| ISUPPER() | | [illegible] | [illegible] | [illegible] | [illegible] |
| ~~ISLOWER()~~ | | [illegible] | [illegible] | [illegible] | [illegible] |
| ISDIGIT() | | ✓ | [illegible] | [illegible] | Used in parser exerciser, float check (rewrite) |
| ISXDIGIT() | | | | ✓ | |
| ISSPACE() | | ✓ | | ✓ | Used in parser exerciser |
| ISPRINT() | | ✓ | [illegible] | [illegible] | Used in hex dump printouts |

Copyright ©1995, Sybase Inc. All Rights Reserved
Printed Copy is Uncontrolled Unless Distributed with a Controlled Distribution List

Table 1.1: Use of Current BitMasks and Functions

| Defined in System 10 | syblex/ sybtypebit mask | SPG | CPG | REP SVR | Comments |
|---|---|---|---|---|---|
| Multi-Byte Macros | | | | | |
| TO_M_UPPER() | | ✓ | | | used in T*SQL UPPER() function |
| TO_M_LOWER() | | ✓ | | | used in T*SQL LOWER() function |
| IS_M_ALPHA() | | | ✓ | | Used with comn_isalpha() |
| IS_M_UPPER() | | | ✓ | | Can replace with Transform macros |
| IS_M_LOWER | | | ✓ | | Can replace with Transform macros |
| IS_M_DIGIT() | | ✓ | | | |
| IS_M_XDIGIT() | | ✓ | | | |
| IS_M_SPACE() | | ✓ | ✓ | | |
| ~~IS_M_PUNCT()~~ | | | | | |
| | | | | | |
| TO_ASCII() | | ✓ | ✓ | | comn_to_ascii() |
| STR_TO_ASCII() | | ✓ | | | comn_str_to_ascii() |
| GET_LEX() | | ✓ | | ✓ | comn_get_lex() |
| GET_SOUND() | | ✓ | | | |
| CHAR_WIDTH() | | ✓ | ✓ | | comn_char_width() |
| DISP_WIDTH() | | | | | comn_disp_width() |
| INC_CHAR() | | ✓ | ✓ | | comn_inc_char() |
| WHOLE_CHARS() | | | ✓ | | comn_whole_char() |
| STR_EQ() | | ✓ | | | |
| SQLSTR_EQ() | | ✓ | | | |
| STRNCMP() | | | ✓ | | |
| Comnlib com_ctyp.c Function calls.<br>Check out dblib/generic/src/db__ctyp.c<br>Check out comnlib/generic/src/com_ctyp.c, com_mtyp.c | | | | | |
| com_toupper(),<br>comn_toupper() | | | ✓ | | tutils.old/generic/src/octutils.c |

Copyright ©1995, Sybase Inc. All Rights Reserved 
Printed Copy is Uncontrolled Unless Distributed with a Controlled Distribution List

Table 1.1: Use of Current BitMasks and Functions

| Defined in System 10 | syblex/ sybtypebit mask | SPG | CPG | REP SVR | Comments |
|---|---|---|---|---|---|
| com_tolower(), comn_tolower() | | | ✓ | | Used with com_isalpha(). isql/getcmd.c |
| com_isalpha(), comn_isalpha() | | | ✓ | | comnlib/generic/src/charset.c - looking for letters in locales files. 8-bit only |
| com_isupper(), comn_isalpha() | | | ✓ | | programs/generic/isql/getcmd.c - just replace with com_tolower() |
| com_islower(), comn_islower() | | | ✓ | | utils/old/generic/src/ocutils.c - just replace with com_toupper() |
| com_isdigit(), comn_islower() | | | ✓ | | |
| ~~com_isxdigit(), comn_isxdigit()~~ | | | | | |
| com_isspace(), comn_isspace() | | | ✓ | | |
| ~~comn_ispunct()~~ | | | | | |
| ~~com_isgraph(), comn_isgraph()~~ | | | | | |
| comn_get_widthmap() | | | ✓ | | |
| com_get_charattrib() | | | ✓ | | |

The com_ and comn_ functions are not public outside of Sybase, so Class-3 character sets are free, if need be, to remove functionality, since it will not affect any customers. Research still needs to be done to see if any other Sybase applications use any of these functions.

I am 99% certain that the P_SPEC and P_EOM bits are never used in a character set definition. P_PUNCT, P_UPPER and P_LOWER have a higher chance of being in use somewhere. Ideally, P_UPPER and P_LOWER can be replaced by a single P_ALPHA for "alphabetic", and a P_IDEO for "ideographic". Then, for case-mapping, all that is needed is a check for P_ALPHA, then a character transform through the case-map table. The crossed-out items in the above table were not found anywhere except in the definition itself, i.e., they appear to be unused. The shaded items are either unused, or can be replaced with no loss of functionality The bits we need to track are:

Copyright ©1995, Sybase Inc. All Rights Reserved 
Printed Copy is Uncontrolled Unless Distributed with a Controlled Distribution List For SQL Server parsing:

P_OPER, is only used as a back-up definition for otherwise undefined characters, which are then dealt with in context. For actual operators, used in SQL, we need to know if a) it is an ASCII equivalent, and b) if it is a valid operator (see below)

switch(GET_LEX()) looks at:

- P_ALPHA — for keywords and identifiers (P_ALPHA + nn P_IDCHAR)
  Keywords - only ASCII (or equivalent)
  Identifiers - Any P_ALPHA + P_IDCHAR string
  (performance - don't bother with keyword if not ASCII)
  (bug - yylex() should use unsigned char for hashvals)
  xxSSSSSSSyy
  xx - '@' for variables, '#' for temporary tables
  yy - ':' for labels
  SSSS - ASCII for keywords, any P_IDCHAR for identifiers
- P_NUMB — for integer, numeric, real, hexadecimal values
  '.' for decimal point (hard-coded in parser)
  'e' for exponent (hard-coded in parser)
  '+/-' for sign values
  Result goes through ATOF(), *com__chtoi4_mb*(),
- P_HEX — Used in P_NUMB case for hexadecimal. Result must go through the ATOB() macro for conversion to a 4-bit hex value. Build IMAGE page chain if > 255 bytes.
- P_MONEE — for prefix currency values.
  <P_MONEE>[blanks][+/-
  ]<P_DIGIT>[<P_DIGIT>...][.<P_DIGIT>...]
  Result goes through *mnyfromchar_mb*()
- P_STRNG — for delimited strings. Looks for TO_ASCII() match of opening quote for end-of-quoted-string (*endstr*). Build TEXT page chain if > 255 bytes. Valid SQL string delimiters are ascii single and double quote: ' ", and no others.
- default — Special cases:
  asciichar - operators to look for
  **! % & ( ) * + , - . / : ; < = > ^ | ~ **
  ASCII characters not used:
  ' <spacing grave> { }

Replication Server (10.0) has defined char_lex to be a 2-byte value and uses the following:

- Same as SQL Server, PLUS:
- P_ID_DELIM — 0x0080 for Identifier delimiters <double quote> "
- P_VARSTART — 0x0200 for ':', '@' for start of Replication Server variables

- P_UNDEFINED 0x0400 for undefined characters
- P_IDCHAR (P_ALPHA | P_SPEC | P_NUMB | P_MONEE | P_VAR_START)

In addition, backend lexical processor will want to track combining characters for character-by-character processing. For combining characters, we need to know if they are prefix- or postfix- combining characters (e.g., ISO 6937 is postfix, ISO 10646, levels 2 and 3 are prefix). Bidirectional characters are dealt with as a serial stream, so need no character attribute.The final list of attributes that are needed becomes:

- P_ALPHA For alphabetic characters
- P_UPPER For historical reasons
- P_LOWER For historical reasons, to preserve macro calls
- P_DIGIT For decimal digits
- P_HEX For hexadecimal
- P_MONEE For prefix currency identifiers
- P_STRNG For opening quotes
- P_IDEO For ideographic characters
- P_SPEC for special characters now labelled as P_ALPHA: '#', '@', '_'

Copyright ©1995, Sybase Inc. All Rights Reserved 
Printed Copy is Uncontrolled Unless Distributed with a Controlled Distribution List pg.38

What is claimed is:

1. In a computer system, a method for performing a Soundex character transformation of textual information based on locale-specific information, the method comprising:

providing a Soundex transformation structure comprising a plurality of arrays storing locale-specific information for a Soundex character transformation;

receiving input requesting that the Soundex character transformation be performed on an input character, said input character comprising a non-Latin character having at least one byte value;

mapping said input character into a Unicode character using a Unicode mapping table, said Unicode character comprising a plurality of byte values; and transforming said Unicode character into a final Soundex transformation value for said input character, by performing the substeps of:

(i) using a most significant byte of said Unicode character to reference a particular entry of a particular one of said plurality of arrays, (ii) determining whether the entry being referenced stores said final Soundex transformation value or a reference to a another one of said plurality of arrays, (iii) if said entry stores said final transformation value, satisfying said request by returning said final Soundex transformation value stored at the entry being referenced and thereafter terminating the method, (iv) if said entry stores a reference to another one of said plurality of arrays, using a next most significant byte of said Unicode character to reference a particular entry of said another one of said plurality of arrays, and (v) repeating substeps (ii)–(iv) until said final Soundex transformation value is located.

* * * * *